US012667780B2

(12) United States Patent
Chiba et al.

(10) Patent No.: US 12,667,780 B2
(45) Date of Patent: Jun. 30, 2026

(54) CONTROL METHOD OF GAME APPARATUS, CONTROL METHOD OF SERVER APPARATUS, INFORMATION PROCESSING SYSTEM, AND RECORDING MEDIUM

(71) Applicant: Konami Digital Entertainment Co., Ltd., Tokyo (JP)

(72) Inventors: Shigeru Chiba, Tokyo (JP); Hiroshi Tanibuchi, Tokyo (JP); Junki Hirai, Tokyo (JP); Kai Inoue, Tokyo (JP); Tsuguo Shinpo, Tokyo (JP); Akira Sakai, Tokyo (JP); Toshiaki Kanahara, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 650 days.

(21) Appl. No.: 18/169,550

(22) Filed: Feb. 15, 2023

(65) Prior Publication Data

US 2023/0182015 A1 Jun. 15, 2023

Related U.S. Application Data

(63) Continuation of application No. PCT/JP2021/031172, filed on Aug. 25, 2021.

(30) Foreign Application Priority Data

Aug. 27, 2020 (JP) ................................. 2020-143121
Aug. 27, 2020 (JP) ................................. 2020-143122

(51) Int. Cl.
A63F 13/497 (2014.01)
A63F 13/60 (2014.01)
A63F 13/86 (2014.01)

(52) U.S. Cl.
CPC ............ *A63F 13/497* (2014.09); *A63F 13/60* (2014.09); *A63F 13/86* (2014.09)

(58) Field of Classification Search
CPC ..................................................... A63F 13/497
See application file for complete search history.

(56) References Cited

U.S. PATENT DOCUMENTS

| | | | |
|---|---|---|---|
| 2014/0045591 A1 | 2/2014 | Chen | |
| 2016/0236087 A1* | 8/2016 | McNeil | A63F 13/847 |
| 2024/0307788 A1* | 9/2024 | Benedetto | H04N 21/47217 |

FOREIGN PATENT DOCUMENTS

| | | |
|---|---|---|
| JP | 2014-33870 A | 2/2014 |
| JP | 2018-23409 A | 2/2018 |

(Continued)

OTHER PUBLICATIONS

Communication issued Oct. 8, 2024 in Japanese Application No. 2023-081580.
Communication issued Oct. 22, 2024 in Korean Application No. 10-2023-7009673.
Japanese Office Action dated Jul. 9, 2024 in Application No. 2023-081580.

(Continued)

*Primary Examiner* — Reginald A Renwick
(74) *Attorney, Agent, or Firm* — Sughrue Mion, PLLC

(57) ABSTRACT

A program recorded in a computer-readable recording medium causes a processor of a server apparatus communicable with a game apparatus that executes a video game and generates video information indicative of a video of the video game. The program causes a processor of the server apparatus to function as: a distribution information generator configured to generate distribution information indicative of a distributed video based on the video information; and a modifiable replaying information generator configured to generate modifiable replaying information that indicates a progress status of the video game in the game apparatus and that enables a modifiable replaying of a game, of the video game in which a user of a terminal apparatus plays the video game under the progress status of the video game, in the (Continued)

terminal apparatus configured to display the distributed video based on the distribution information generated by the distribution information generator.

19 Claims, 32 Drawing Sheets

(56)                References Cited

FOREIGN PATENT DOCUMENTS

| | | |
|---|---|---|
| JP | 2018-134409 A | 8/2018 |
| JP | 2018-534974 A | 11/2018 |
| JP | 2019-71960 A | 5/2019 |

OTHER PUBLICATIONS

Japanese Office Action dated Jun. 25, 2024 in Application No. 2020-143122.
Written Opinion dated Nov. 2, 2021 in International Application No. PCT/JP2021/031172.
International Search Report dated Nov. 2, 2021 in International Application No. PCT/JP2021/031172.
Japanese Notice of Reasons for Refusal dated Dec. 6, 2022 in Japanese Application No. 2020-143121.
Japanese Notice of Reasons for Refusal dated Dec. 6, 2022 in Japanese Application No. 2020-143122.
Japanese Decision of Refusal dated Mar. 7, 2023 in Japanese Application No. 2020-143122.
Chinese Office Action dated Jan. 15, 2026, issued in Chinese application No. 202180053231.7.

* cited by examiner

Figure 12:
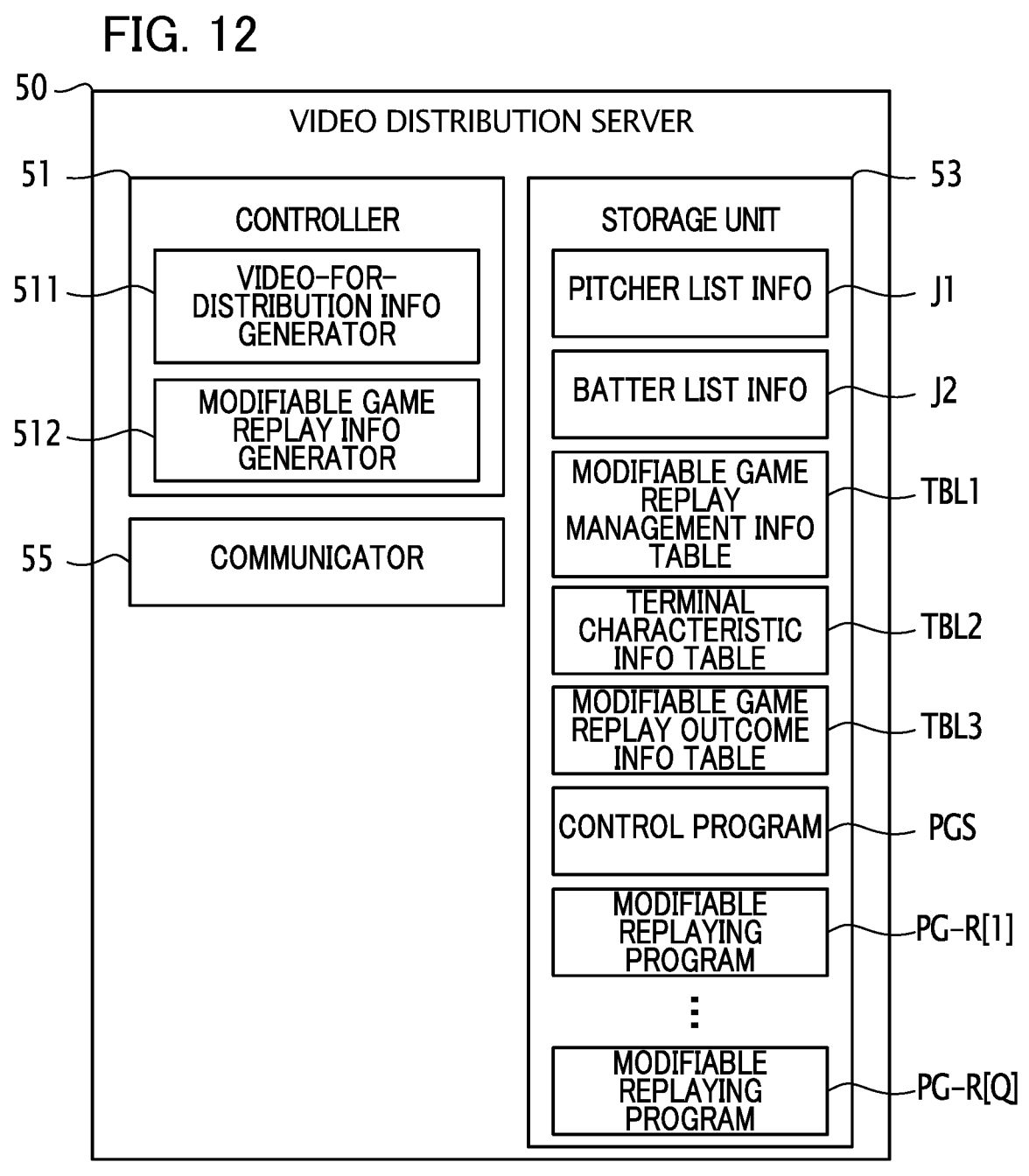

50 — VIDEO DISTRIBUTION SERVER

51 — CONTROLLER

511 — VIDEO-FOR-DISTRIBUTION INFO GENERATOR

512 — MODIFIABLE GAME REPLAY INFO GENERATOR

55 — COMMUNICATOR

53 — STORAGE UNIT

J1 — PITCHER LIST INFO

J2 — BATTER LIST INFO

TBL1 — MODIFIABLE GAME REPLAY MANAGEMENT INFO TABLE

TBL2 — TERMINAL CHARACTERISTIC INFO TABLE

TBL3 — MODIFIABLE GAME REPLAY OUTCOME INFO TABLE

PGS — CONTROL PROGRAM

PG-R[1] — MODIFIABLE REPLAYING PROGRAM

PG-R[Q] — MODIFIABLE REPLAYING PROGRAM

FIG. 13

50 — VIDEO DISTRIBUTION SERVER

5001 — PROCESSOR

STORAGE DEVICE — 5003

COMMUNICATION DEVICE — 5005

| PITCHER ID | PITCHER INFO | | | | | | | | |
| | PITCHER BASIC INFO | | | PITCHER SKILL INFO | | | | | |
| | PITCHER NAME INFO | PITCHER IMAGE INFO | STANDARD VELOCITY INFO | PITCHING TYPE INFO | | | | | CONTROL INFO |
| | | | | FAST BALL INFO | CURVE INFO | SLIDER INFO | ... | | |
| t001 | AAA | aaa.jpg | 143km/h | 10 | 15 | 15 | ... | | 80 |
| t002 | BBB | bbb.jpg | 138km/h | 8 | 8 | 18 | ... | | 90 |
| t003 | CCC | ccc.jpg | 148km/h | 12 | 3 | 12 | ... | | 60 |
| ... | ... | ... | ... | ... | ... | ... | ... | | ... |

FIG. 17

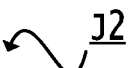

| BATTER ID | BATTER INFO | | | | |
| | BATTER BASIC INFO | | BATTER SKILL INFO | | |
| | BATTER NAME INFO | BATTER IMAGE INFO | HITTING POWER INFO | MEETING ABILITY INFO | BASE RUNNING ABILITY INFO |
|---|---|---|---|---|---|
| d001 | DDD | ddd.jpg | 70 | 90 | 95 |
| d002 | EEE | eee.jpg | 80 | 80 | 70 |
| d003 | FFF | fff.jpg | 95 | 55 | 45 |
| ⋮ | ⋮ | ⋮ | ⋮ | ⋮ | ⋮ |

FIG. 18

| PITCHING ID | | | p001 |
|---|---|---|---|
| PITCHING CONTENT INFO | VELOCITY INFO | | 148km/h |
| | PITCHING TYPE INFO | | SLIDER |
| | PITCHING TRAJECTORY INFO | PITCHING COURSE INFO | (−30, −20) |
| | | PITCHING COURSE DISPLACEMENT AMOUNT INFO | (−20, −30) |

J4

| | PITCHING ID | p085 |
|---|---|---|
| PITCHING TIMING INFO | GAME TIME INFO | 3011 |
| | INNING INFO | TOP OF THIRD INNING |
| | OUT COUNT INFO | 2 OUTS |
| COUNT INFO | STRIKE COUNT INFO | 2 STRIKES |
| | BALL COUNT INFO | 1 BALL |
| SCORE INFO | TEAM T1 | 7 |
| | TEAM T2 | 5 |
| | FIRST BASE RUNNER INFO | d105 |
| RUNNER INFO | SECOND BASE RUNNER INFO | N/A |
| | THIRD BASE RUNNER INFO | d103 |
| COMPETING CHARACTERS IDENTIFICATION INFO | CURRENT PITCHER INFO | t002 |
| | CURRENT BATTER INFO | d106 |

FIG. 20

TBL1

| MODIFIABLE REPLAYING ID | MODIFIABLE GAME REPLAY MANAGEMENT INFO | | | | | | | | |
|---|---|---|---|---|---|---|---|---|---|
| | GAME TIME INFO | COMPETING CHARACTERS IDENTIFICATION INFO | | PITCHING INFO | | | | | |
| | | CURRENT PITCHER INFO | CURRENT BATTER INFO | PITCHING CONTENT INFO | | | | | |
| | | | | PITCH-ING ID | VELOCITY INFO | PITCHING TYPE INFO | PITCHING TRAJECTORY INFO | | |
| | | | | | | | PITCHING COURSE INFO | PITCHING COURSE DISPLACEMENT AMOUNT INFO | |
| s001 | 0103 | t002 | d101 | p009 | 152km/h | FAST BALL | (+20, +20) | (+20, 0) | |
| s002 | 0221 | t002 | d105 | p021 | 136km/h | CURVE | (−30, −10) | (−20, −40) | |
| s003 | 1024 | t103 | d006 | p024 | 140km/h | FORK | (−10, −10) | (0, −60) | |
| ... | ... | ... | ... | ... | ... | ... | ... | ... | |

FIG. 21

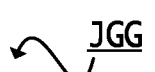JGG

| | | | | |
|---|---|---|---|---|
| MODIFIABLE REPLAYING ID | | | | s010 |
| GAME TIME INFO | | | | 3011 |
| PITCHING INFO | | PITCHING ID | | p085 |
| | PITCHING CONTENT INFO | VELOCITY INFO | | 155km/h |
| | | PITCHING TYPE INFO | | FAST BALL |
| | | PITCHING TRAJECTORY INFO | PITCHING COURSE INFO | (−10, −20) |
| | | | PITCHING COURSE DISPLACEMENT AMOUNT INFO | (+10, +10) |
| MODIFIABLE GAME REPLAY CHARACTER INFO | PITCHER BASIC INFO | PITCHER NAME INFO | | GGG |
| | | PITCHER IMAGE INFO | | ggg.jpg |
| | BATTER BASIC INFO | BATTER NAME INFO | | HHH |
| | | BATTER IMAGE INFO | | hhh.jpg |
| | BATTER SKILL INFO | HITTING POWER INFO | | 90 |
| | | MEETING ABILITY INFO | | 90 |
| | | BASE RUNNING CAPABILTIY INFO | | 30 |
| MODIFIABLE REPLAYING PROGRAM | | | | PG−R[2] |

FIG. 22

| TERMINAL ID | TERMINAL CHARACTERISTIC INFO | | | |
| --- | --- | --- | --- | --- |
| | OS TYPE INFO | BROWSER TYPE INFO | TERMINAL PROCESSING SPEED INFO | SCREEN SIZE INFO |
| m001 | OS1 | BROWSER XXX | 2.5GHz | 1920×1080 |
| m002 | OS1 | BROWSER YYY | 1.5GHz | 1280×720 |
| m003 | OS2 | BROWSER ZZZ | 3.0GHz | 2560×1440 |
| ⋮ | ⋮ | ⋮ | ⋮ | ⋮ |

FIG. 23

| MODIFIABLE REPLAYING OUTCOME ID | MODIFIABLE GAME REPLAY OUTCOME INFO | | |
| --- | --- | --- | --- |
| | MODIFIABLE REPLAYING ID | TERMINAL ID | MODIFIABLE REPLAYING OUTCOME INFO |
| k001 | s001 | m011 | HIT |
| k002 | s001 | m012 | STRIKE |
| k003 | s002 | m005 | HOME RUN |
| ⋮ | ⋮ | ⋮ | ⋮ |

FIG. 33

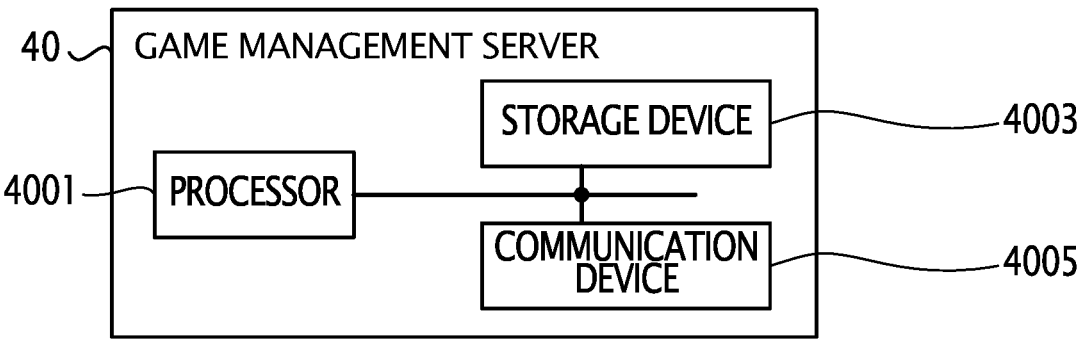

40 — GAME MANAGEMENT SERVER

STORAGE DEVICE — 4003

4001 — PROCESSOR

COMMUNICATION DEVICE — 4005

FIG. 34

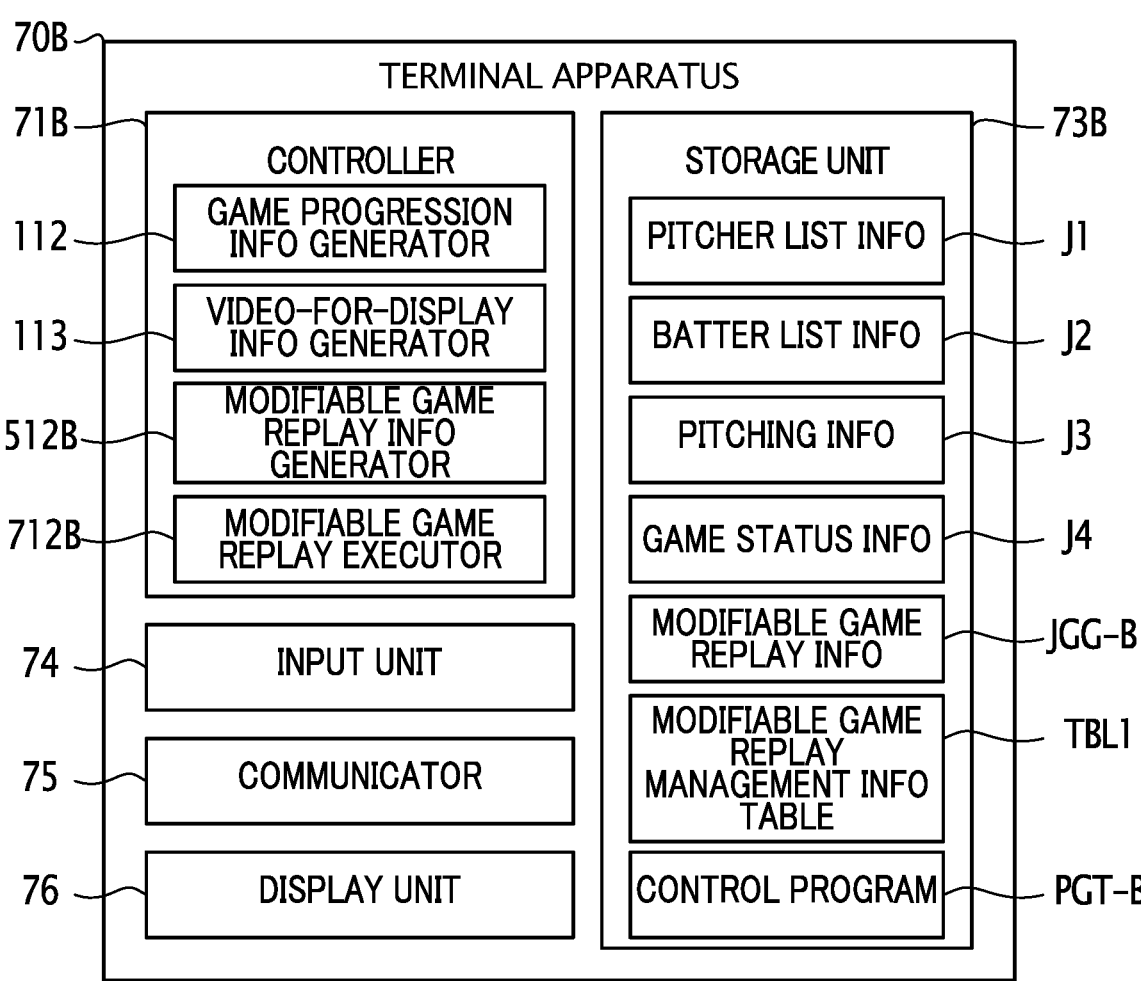

70B — TERMINAL APPARATUS

71B — CONTROLLER

112 — GAME PROGRESSION INFO GENERATOR

113 — VIDEO-FOR-DISPLAY INFO GENERATOR

512B — MODIFIABLE GAME REPLAY INFO GENERATOR

712B — MODIFIABLE GAME REPLAY EXECUTOR

74 — INPUT UNIT

75 — COMMUNICATOR

76 — DISPLAY UNIT

73B — STORAGE UNIT

PITCHER LIST INFO — J1

BATTER LIST INFO — J2

PITCHING INFO — J3

GAME STATUS INFO — J4

MODIFIABLE GAME REPLAY INFO — JGG-B

MODIFIABLE GAME REPLAY MANAGEMENT INFO TABLE — TBL1

CONTROL PROGRAM — PGT-B

FIG. 35

CONTROL METHOD OF GAME APPARATUS, CONTROL METHOD OF SERVER APPARATUS, INFORMATION PROCESSING SYSTEM, AND RECORDING MEDIUM

CROSS REFERENCE TO RELATED APPLICATIONS

This application is a Continuation Application of PCT Application No. PCT/JP2021/031172, filed on Aug. 25, 2021, and is based on and claims priority from Japanese Patent Application No. 2020-143121, filed on Aug. 27, 2020, and Japanese Patent Application No. 2020-143122, filed on Aug. 27, 2020, the entire contents of each of which are incorporated herein by reference.

BACKGROUND OF THE INVENTION

Field of the Invention

The present invention relates to a control method of a game apparatus, to a control method of a server apparatus, to an information processing system, and to a recording medium therewith.

Description of Related Art

There has been proposed a technique for an information processing system including a game apparatus that executes a video game and generates video information indicative of a video of the video game. In such a system, a distributed video based on the video information generated in the game apparatus is displayed in a terminal apparatus (e.g., see Japanese Patent Application, Laid-Open Publication No. 2018-134409).

Conventionally, however, a problem arises in that the user of the terminal apparatus cannot actually play a video game that is being executed in the game apparatus. In the conventional technique, for example, a problem may arise in that the user of the terminal apparatus cannot experience the video game in the same situation as that in which a user plays the video game in the game apparatus. Therefore, for example, conventionally, a problem may arise such that the user of the terminal apparatus is not able to know the skill level of a user playing the video game in the game apparatus, or the difficulty level of the video game being executed in the game apparatus, or the like.

SUMMARY

The present invention has been made in view of the above-described circumstances, and an object of the present invention is to provide a technique for enabling actual experience of a video game that is being executed in a game apparatus.

A recording medium according to one aspect of the present invention is a computer-readable recording medium having recorded therein a program for a server apparatus communicable with a game apparatus that executes a video game and generates video information indicative of a video of the video game. The program causes a processor of the server apparatus to function as: a distribution information generator configured to generate distribution information indicative of a distributed video based on the video information; and a modifiable replaying information generator configured to generate modifiable replaying information that indicates a progress status of the video game in the game apparatus and that enables a modifiable replaying of a game, of the video game in which a user of a terminal apparatus plays the video game under the progress status of the video game, in the terminal apparatus configured to display the distributed video based on the distribution information generated by the distribution information generator.

A recording medium according to another aspect of the present invention is a computer-readable recording medium having recorded therein a program for a server apparatus communicable with a game apparatus that executes a video game and generates video information indicative of a video of the video game, the program causing a processor of the server apparatus to function as: a distribution information generator configured to generate distribution information indicative of a distributed video based on the video information; and a supplier configured to acquire from the game apparatus modifiable replaying information indicative of a progress status of the video game in the game apparatus and that enables, in a terminal apparatus, a modifiable replaying of a game, of the video game in which a user of the terminal apparatus plays the video game under the progress status of the video game, to supply the acquired modifiable replaying information to the terminal apparatus, the terminal apparatus being configured to display the distributed video based on the distribution information generated by the distribution information generator.

A recording medium according to another aspect of the present invention is a computer-readable recording medium having recorded therein a program for causing a processor of a game apparatus to function as: a game controller configured to execute a video game and generate video information indicative of a video of the video game; and a modifiable replaying information generator configured to generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

A recording medium according to another aspect of the present invention is a computer-readable recording medium having recorded therein a program for causing a processor of a game apparatus to function as a game executor configured to execute a video game and generate modifiable replaying information indicative of a progress status of the video game in the game apparatus, the modifiable replaying information enabling displaying of a video of the video game in a terminal apparatus, and also enabling, in the terminal apparatus, a modifiable replaying of a game, of the video game in which a user of the terminal apparatus plays the video game under the progress status of the video game, and an information outputter configured to output the modifiable replaying information.

A server apparatus according to an aspect of the present invention is communicable with a game apparatus that executes a video game and generates video information indicative of a video of the video game, and the server apparatus includes: one or more memories for storing instructions; and one or more processors communicatively connected to the one or more memories and that execute the instructions to: generate distribution information indicative of a distributed video based on the video information; and generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the distribution information generated by the distribution information generator.

A game apparatus according to another aspect of the present invention includes: one or more memories for storing instructions; and one or more processors communicatively connected to the one or more memories and that execute the instructions to: execute a video game and generate video information indicative of a video of the video game; and generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

A control method of a server apparatus according to an aspect of the present invention causes a processor of a server apparatus communicable with a game apparatus that executes a video game and generates video information indicative of a video of the video game, to: generate distribution information indicative of a distributed video based on the video information; and generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the generated distribution information.

A control method of a game apparatus according to another aspect of the present invention causes a processor of the game apparatus to: execute a video game and generate video information indicative of a video of the video game; and generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

An information processing system according to an aspect of the present invention includes a game apparatus configured to execute a video game and generate video information indicative of a video of the video game; and a server apparatus communicable with the game apparatus. The system includes: one or more memories for storing instructions; and one or more processors communicatively connected to the one or more memories and that execute the instructions to: generate distribution information indicative of a distributed video based on the video information; and generate modifiable replaying information indicative of a progress status of the video game in the game apparatus and that enables a modifiable replaying of a game, of the video game in which a user of a terminal apparatus plays the video game under the progress status of the video game in the terminal apparatus configured to display the distributed video based on the generated distribution information.

To solve the above-described problem, a computer-readable recording medium according to one aspect of the present invention having recorded therein a program for causing a processor of a game apparatus to function as: a game controller configured to progress a video game; and a generator configured to generate modifiable replaying information that indicates a specific situation extracted from a progress status of the video game progressed by the game controller, the modifiable replaying information enabling, in a terminal apparatus, a modifiable replaying of a game, of the video game in which a user of the terminal apparatus plays the video game under the specific situation.

A recording medium according to another aspect of the present invention is a computer-readable recording medium having recorded therein a program for a server apparatus communicable with a game apparatus executing a video game and a terminal apparatus, the program causing a processor of the server apparatus to function as: an information acquirer configured to acquire progression status information indicative of a progress status of the video game; and a generator configured to generate, based on the progression status information acquired by the information acquirer, modifiable replaying information that indicates a specific situation extracted from the progress status of the video game progressed by the game apparatus, the modifiable replaying information enabling, in the terminal apparatus, a modifiable replaying of a game, of the video game in which a user of the terminal apparatus plays the video game under the specific situation.

A game apparatus according to an aspect of the present invention includes: one or more memories for storing instructions; and one or more processors communicatively connected to the one or more memories and that execute the instructions to: progress a video game; and generate modifiable replaying information indicative of a specific situation extracted from a progress status of the video game, the modifiable replaying information enabling, in a terminal apparatus, a modifiable replaying of a game, of the video game in which a user of the terminal apparatus plays the video game under the specific situation.

A server apparatus according to another aspect of the present invention is communicable with a game apparatus executing a video game and a terminal apparatus, and the server apparatus includes: one or more memories for storing instructions; and one or more processors communicatively connected to the one or more memories and that execute the instructions to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in the terminal apparatus, a modifiable replaying of a game, of the video game in which a user of the terminal apparatus plays the video game under the specific situation.

A control method of a game apparatus according to an aspect of the present invention is characterized in that a processor of the game apparatus is caused to: progress a video game; and generate modifiable replaying information indicative of a specific situation extracted from a progress status of the video game, the modifiable replaying information enabling, in a terminal apparatus, a modifiable replaying of a game of the video game in which a user of the terminal apparatus plays the video game under the specific situation.

A control method of a server apparatus according to another aspect of the present invention is a control method of a server apparatus communicable with a terminal apparatus and a game apparatus that executes a video game, in which a processor of the server apparatus is caused to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in the terminal apparatus, a modifiable replaying of a game, of the video game in which a user of the terminal apparatus plays the video game under the specific situation.

An information processing system according to an aspect of the present invention is an information processing system including a game apparatus that executes a video game, and the information processing system includes: one or more memories for storing instructions; and one or more processors communicatively connected to the one or more memories and that execute the instructions to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in a terminal apparatus, a modifiable replaying of a game, of the video game in which a user of the terminal apparatus plays the video game under the specific situation.

BRIEF DESCRIPTION OF THE DRAWINGS

FIG. 3 is a sequence chart showing an example overview of the operation of the information processing system Sys.

FIG. 12 is a block diagram illustrating an example configuration of a video distribution server 50.

FIG. 13 is a block diagram illustrating an example hardware configuration of the video distribution server 50.

FIG. 16 is a diagram showing an example data configuration of pitcher list information J1.

FIG. 17 is a diagram showing an example data configuration of batter list information J2.

FIG. 18 is a diagram showing an example data configuration of pitching information J3.

FIG. 20 is a diagram illustrating an example data configuration of a modifiable replaying of a game management information table TBL1.

FIG. 21 is a diagram illustrating an example data configuration of the modifiable replaying of a game information JGG.

FIG. 22 is a diagram illustrating an example data configuration of a terminal characteristic information table TBL2.

FIG. 23 is a diagram illustrating an example data configuration of a modifiable replaying of a game outcome information table TBL3.

FIG. 33 is a block diagram illustrating an example hardware configuration of the game management server 40.

FIG. 34 is a block diagram showing an example configuration of a terminal apparatus 70B.

FIG. 35 is a sequence chart showing an example overview of an operation of the information processing system Sys-B.

DESCRIPTION OF THE EMBODIMENTS

Figure 1:
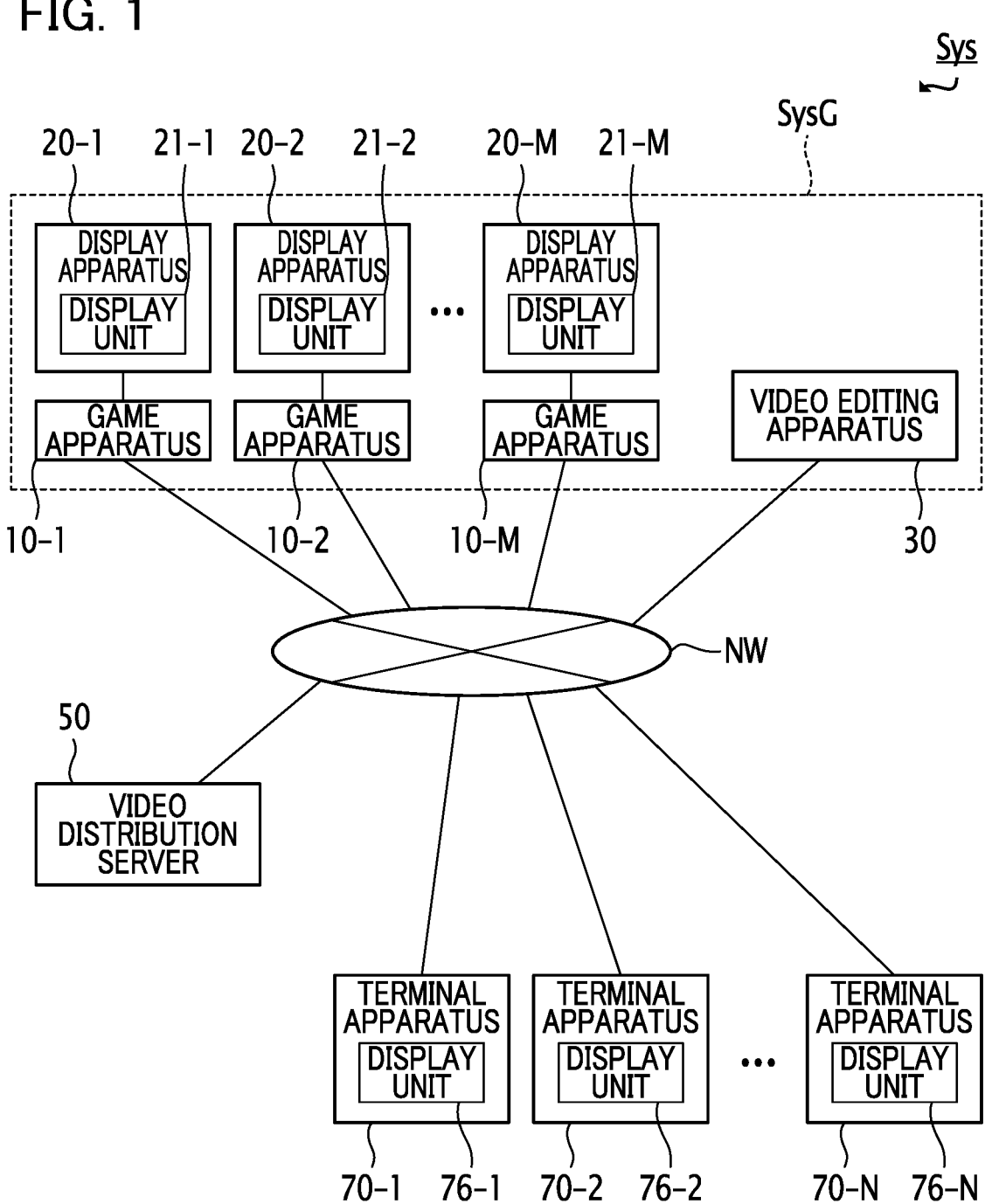
FIG. 1 is an explanatory diagram of an information processing system Sys according to a first embodiment of the present invention.

In the following, embodiments of the present invention will be described with reference to the drawings. In the drawings, the dimensions and scales of the respective parts may be appropriately different from those of actual parts. Furthermore, since the embodiments described below are preferred specific examples of the present invention, various technically preferable limitations are added, but the scope of the present invention is not limited to these forms unless specifically stated to so limit the present invention in the following description.

1. FIRST EMBODIMENT

In the following, a first embodiment of the present invention will be described.

1.1. Overview of Information Processing System

FIG. 1 is an explanatory diagram for explaining an example overview of an information processing system Sys according to an embodiment. Referring to FIG. 1, an overview of an information processing system Sys will be described below.

As illustrated in FIG. 1, the information processing system Sys includes a game system SysG including a plurality of game apparatuses 10-1 to 10-M capable of executing a baseball video game (an example of "video game"), a plurality of display apparatuses 20-1 to 20-M provided corresponding to the plurality of game apparatuses 10-1 to 10-M, and a video editing apparatus 30 communicable with the game apparatuses 10 via a network NW. Here, the value M is a natural number equal to or greater than 2. Hereinafter, an m-th game apparatus 10 among the plurality of game apparatuses 10-1 to 10-M may be referred to as a game apparatus 10-$m$. Here, the value in is a natural number satisfying 1≤m≤M. In the following description, an m-th display apparatus 20 among the plurality of display apparatuses 20-1 to 20-M may be referred to as a display apparatus 20-$m$.

In the present embodiment, there is assumed as an example a case in which the game apparatus 10 is a home game apparatus. However, any information processing apparatus may be employed as the game apparatus 10. For example, the game apparatus 10 may be a commercial game apparatus installed in a store, a game facility, or the like, or may be a mobile device such as a mobile phone or a smartphone, or may be a stationary information device such as a personal computer.

As illustrated in FIG. 1, the information processing system Sys includes a video distribution server 50 (an example of "server apparatus") communicable with the game system SysG via the network NW, and a plurality of terminal apparatuses 70-1 to 70-N communicable with the video distribution server 50 via the network NW. Here, the value N is a natural number equal to or greater than 2. Hereinafter, an n-th terminal apparatus 70 among the plurality of terminal apparatuses 70-1 to 70-N may be referred to as a terminal apparatus 70-$n$. Here, the value n is a natural number satisfying 1≤n≤N.

The terminal apparatus 70 may be any information processing apparatus that can be connected to the network NW, such as a smartphone, mobile phone, or personal computer.

In the present embodiment, the game apparatus 10-$m$ is enabled to cause a display unit 21-$m$ provided in a display apparatus 20-$m$ that corresponds to the game apparatus 10-$m$, to display a video of a baseball video game being executed in the game apparatus 10-$m$. In the following, the video of the baseball video game displayed on the display unit 21-$m$ by the game apparatus 10-$m$ will be referred to as a game video for display DG-m. In the present embodiment, the game video for display DG-m may be a still image for display GG-m updated each unit period (e.g., a period of 1/60th of a second). Here, the still image for display GG-m is a still image displayed on the display unit 21-$m$ in each unit period.

In the present embodiment, a first game apparatus 10 among the plurality of game apparatuses 10-1 to 10-M is communicable with a second game apparatus 10 via the network NW. Specifically, the first game apparatus 10 transmits information of a baseball video game being executed on the first game apparatus 10 to the second game apparatus 10.

Furthermore, the other game apparatus 10 transmits information of the baseball video game being executed on the other game apparatus 10 to the one game apparatus 10. Therefore, the user Ug of the one game apparatus 10 and the user Ug of the other game apparatus 10 can play a match of the baseball video game.

In the following description, it is assumed that a user Ug-1 of a game apparatus 10-1 and a user Ug-2 of a game apparatus 10-2 play a match of a baseball video game. In the following description, as an example, a baseball team used in the baseball video game by the user Ug-1 of the game apparatus 10-1 will be referred to as a baseball team T1, and a baseball team used in the baseball video game by the user Ug-2 of the game apparatus 10-2 will be referred to as a baseball team T2. In the following description, for convenience of explanation, the value in is assumed to be a natural number satisfying 1≤m≤2.

1.2. Operation of Information Processing System

Referring to FIGS. 2 to 9, an example overview of the operation of the information processing system Sys will be described below.

Figure 2:
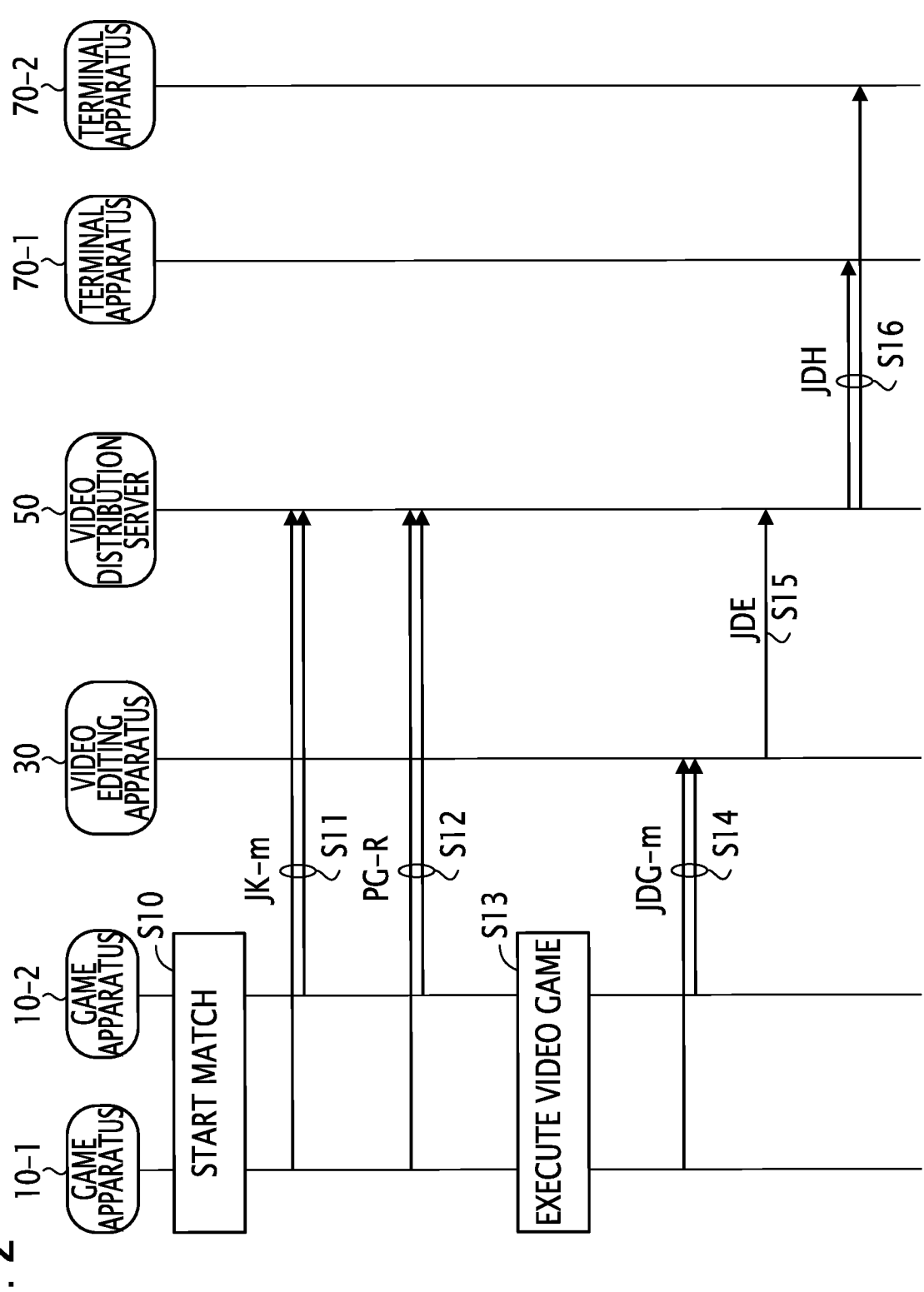
FIG. 2 is a sequence chart showing an example overview of an operation of the information processing system Sys.
Figure 3:
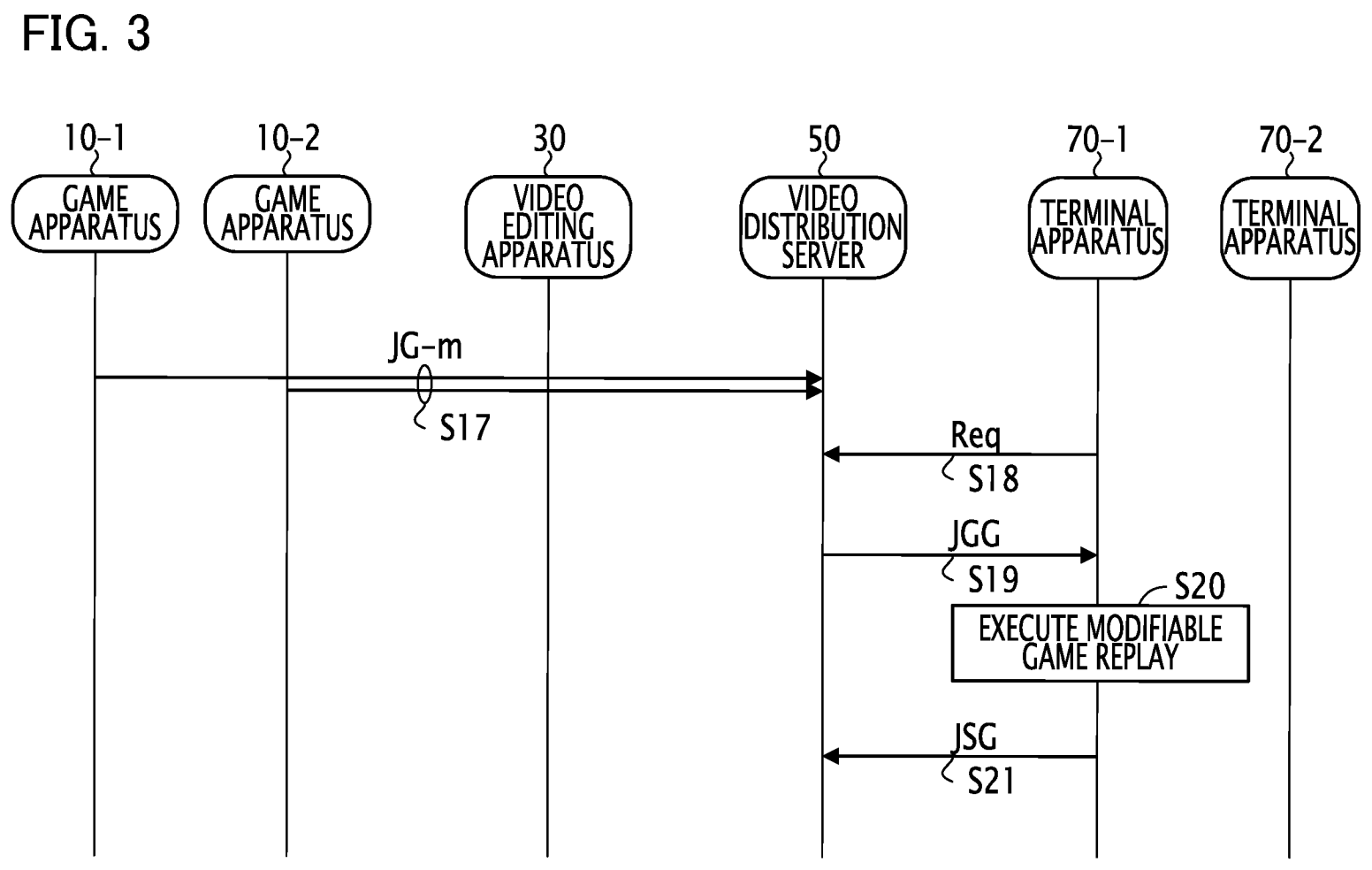

FIGS. 2 and 3 together are a sequence chart illustrating an example operation of the information processing system Sys according to the present embodiment. It is to be noted that FIGS. 2 and 3 illustrate an operation of the information processing system Sys performed in a case in which the user Ug-1 of the game apparatus 10-1 and the user Ug-2 of the game apparatus 10-2 play a match of a baseball video game.

As illustrated in FIG. 2, when the user Ug-1 of the game apparatus 10-1 and the user Ug-2 of the game apparatus 10-2 play a match of a baseball video game, the respective game apparatus 10-$m$ executes a game match start process (S10). Specifically, as the game match start process of step S10, the game apparatus 10-1 and the game apparatus 10-2 perform processing required for the user Ug-1 of the game apparatus 10-1 and the user Ug-2 of the game apparatus 10-2 to start the match of the baseball video game. For example, such processing includes establishing communication between the game apparatus 10-1 and the game apparatus 10-2, the game apparatus 10-1 sharing with the game apparatus 10-2 information of the baseball team T1 used by the user Ug-1 of the game apparatus 10-1 in the baseball video game, and the game apparatus 10-2 sharing with the game apparatus 10-1 information of the baseball team T2 used by the user Ug-2 of the game apparatus 10-2 in the baseball video game.

Next, the game apparatus 10-$m$ supplies game basic information JK-m to the video distribution server 50 (S11). The game basic information JK-m includes information used in Q types of modifiable replaying programs PG-R [1] to PG-R [Q] in common. The modifiable replaying program PG-R will be described later. Furthermore, the game basic information JK-m includes information used in common for generating a plurality of pieces of modifiable replaying of a game (modifiable game replay) information JGG in a case in which the plurality of pieces of modifiable replaying of a game information JGG is generated in a match of the baseball video game. The modifiable replaying of a game information JGG will be described later. Specifically, the game basic information JK-m includes, for example, pitcher list information J1 on pitcher characters CP in a baseball team used by a user Ug-m in a baseball video game, and batter list information J2 on batter characters CB in a baseball team used by the user Ug-m in the baseball video game. The pitcher list information J1 and the batter list information J2 will be described later.

Next, the game apparatus 10-*m* supplies the modifiable replaying program PG-R to the video distribution server 50 (S12). Here, the modifiable replaying program PG-R is a program for modifiable replaying of a game, in the terminal apparatus 70, a part corresponding to a match competed between a pitcher character CP and a batter character CB in the match of the baseball video game, to enable the user Ut of the terminal apparatus 70 to experience the match. In the following description, a "modifiable replaying of a game" may be used to refer to modifiable replaying of a game in the terminal apparatus 70 of a part of the match of a baseball video game, such as a part corresponding to a match between a pitcher character CP and a batter character CB in the match of a baseball video game.

Next, the game apparatus 10-*m* executes the baseball video game and causes the match of the baseball video game to progress (S13). Specifically, the game apparatus 10-*m* first acquires, at step S13, operation information JM indicative of an operation of the game apparatus 10-*m* by the user Ug-*m*. Next, the game apparatus 10-*m* generates game progression information JS indicative of a situation in a virtual space Fd of the baseball video game based on the operation information JM at step S13. Here, the situation in the virtual space Fd of the baseball video game is, for example, one or both situations of various characters existing in the virtual space Fd of the baseball video game and situations of various objects existing in the virtual space Fd of the baseball video game. A situation of a character is, for example, one, some, or all of a position, posture, motion, moving direction, moving velocity, and the like of the character in the virtual space Fd. Furthermore, a situation of an object is, for example, one, some, or all of a position, posture, motion, moving direction, moving velocity, and the like of the object in the virtual space Fd.

Next, the game apparatus 10-*m* captures images of the virtual space Fd of the baseball video game with a virtual camera provided in the virtual space Fd, thereby generating a game video for display DG-*m* including a still image for display GG-*m* updated in each unit period, and supplies game-video-for-display information JDG-*m* (an example of "video information") that indicates the generated game video for display DG-*m* to the video editing apparatus 30 (S14). Here, the game-video-for-display information JDG-*m* may be information indicating a still image for display GG-*m* updated in each unit period in real time, information indicating a set of a plurality of still images for display GG-*m* corresponding one-to-one to a plurality of unit periods, or information obtained by adding sounds of a baseball video game thereto.

Figure 4:
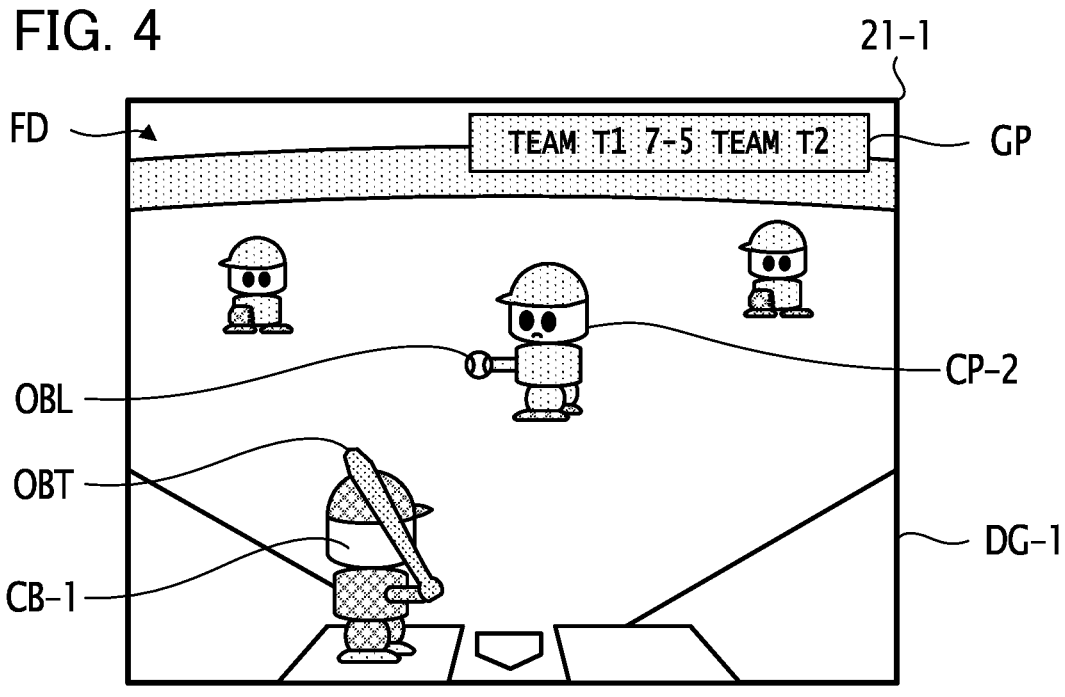
FIG. 4 is an explanatory diagram illustrating an example overview of a game video for display DG-1.
Figure 5:
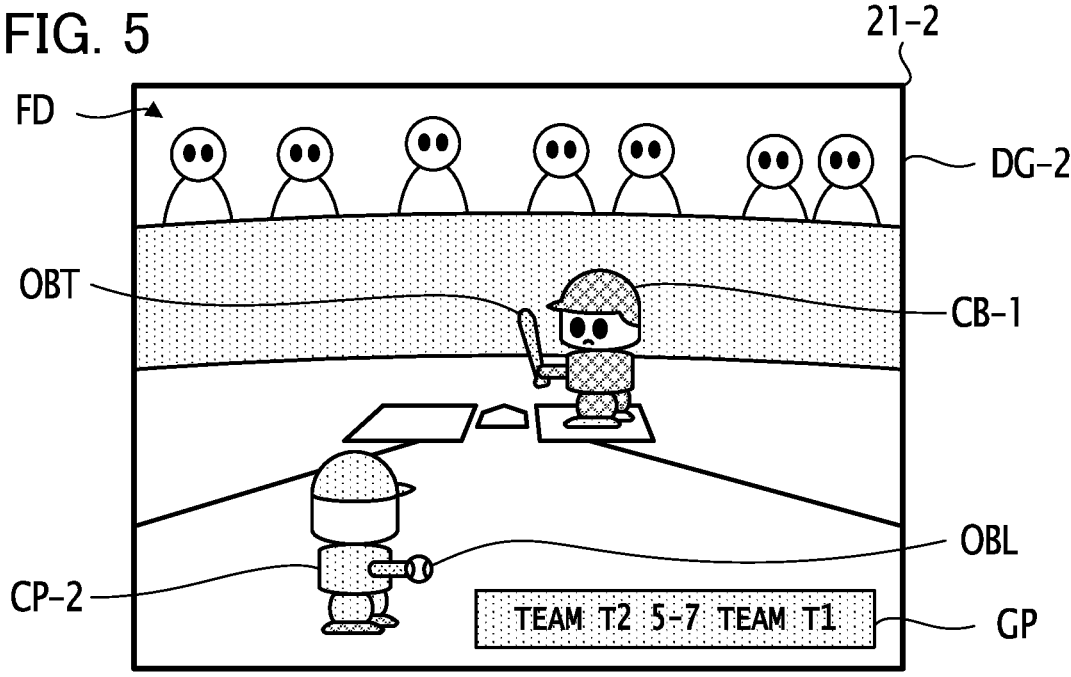
FIG. 5 is an explanatory diagram illustrating an example overview of a game video for display DG-2.

FIG. 4 is an explanatory diagram for explaining an example overview of the game video for display DG-1 generated by the game apparatus 10-1, and FIG. 5 is an explanatory diagram for explaining an example overview of the game video for display DG-2 generated by the game apparatus 10-2.

As illustrated in FIGS. 4 and 5, the game video for display DG-*m* indicates, in the virtual space Fd, a situation of a batter character CB-1 operated by the user Ug-1 and a situation of a pitcher character CP-2 operated by the user Ug-2. Specifically, the game video for display DG-*m* indicates, in the virtual space Fd, a situation in which the pitcher character CP-2 throws a ball object OBL based on an operation by the user Ug-2, and a situation in which the batter character CB-1 hits the ball object OBL using a bat object OBT based on an operation by the user Ug-1.

As illustrated in FIG. 2, the video editing apparatus 30 generates an edited game video DE, which is a video of a baseball video game being executed in the game apparatus 10-1 and the game apparatus 10-2. The edited game video DE is generated based on the game-video-for-display information JDG-1 supplied from the game apparatus 10-1 and the game-video-for-display information JDG-2 supplied from the game apparatus 10-2. The video editing apparatus 30 supplies edited game video information JDE indicative of the edited game video DE, to the video distribution server 50 (S15). The edited game video DE may be a video generated based on a plurality of pieces of game-video-for-display information JDG-*m* supplied from the game apparatus 10-1 and the game apparatus 10-2, or may be a video generated based on a single piece of game-video-for-display information JDG-*m* supplied from a game apparatus 10-*m*, which is one of the game apparatus 10-1 and the game apparatus 10-2. Furthermore, in the present embodiment, the edited game video DE may be an edited still image GE that is updated in each unit period. The edited still image GE may be an image including the same still image as the still image for display GG-*m* indicated by the game-video-for-display information JDG-*m*, or may be an image including a still image obtained by changing the resolution of the still image for display GG-*m* indicated by the game-video-for-display information JDG-*m*. Furthermore, the edited game video DE may be information indicating the edited still image GE updated each unit period in real time, information indicating a set of a plurality of edited still images GE corresponding one-to-one to a plurality of unit periods, or information obtained by adding sounds of a baseball video game thereto.

Figure 6:
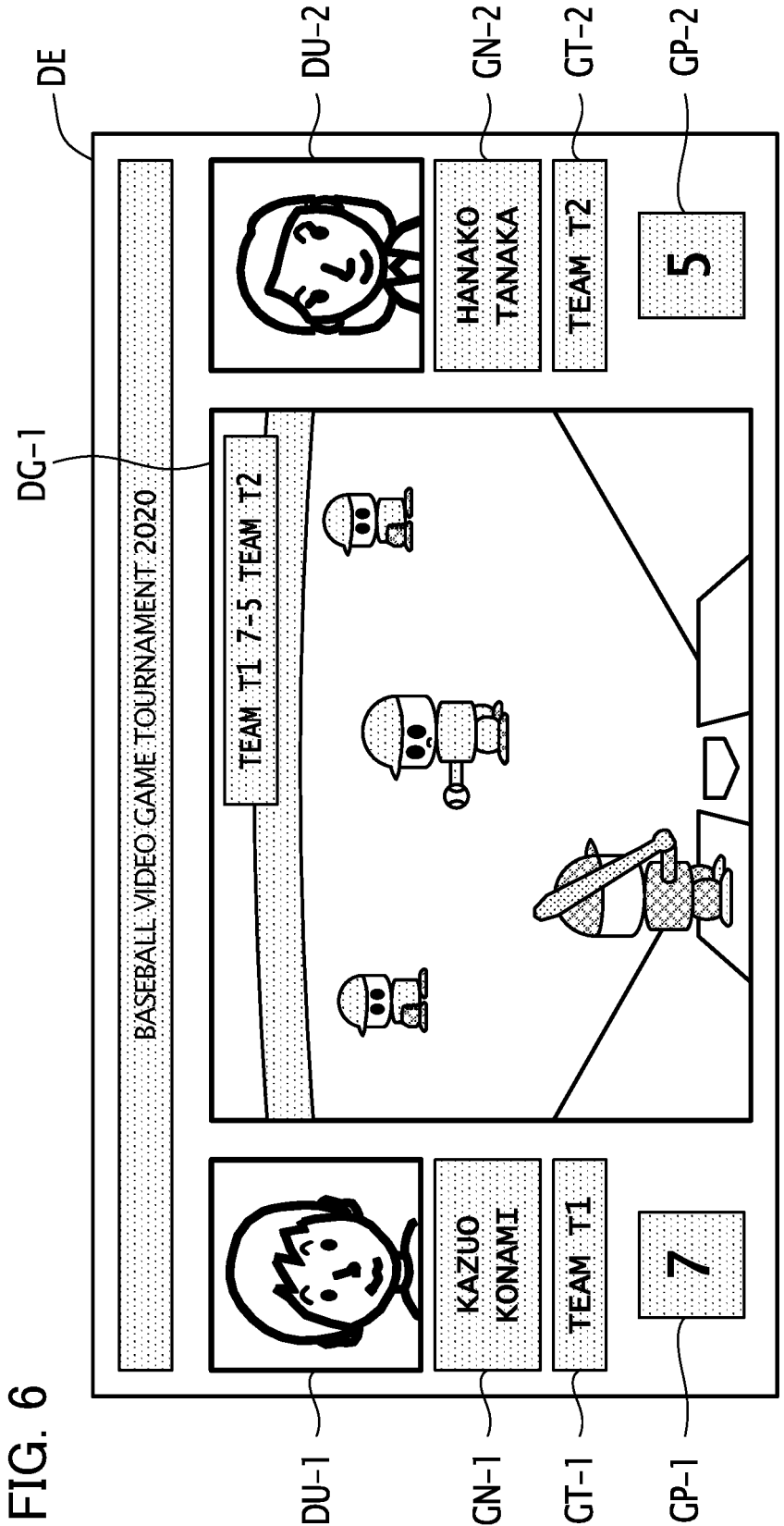
FIG. 6 is an explanatory diagram illustrating an example overview of an edited game video DE.

FIG. 6 is an explanatory diagram for explaining an example overview of the edited game video DE generated by the video editing apparatus 30.

As illustrated in FIG. 6, the edited game video DE includes a game video for display DG-*m*. In the present embodiment, the video editing apparatus 30 selects one of the game video for display DG-1 and the game video for display DG-2 in the respective period in which the match of the baseball video game is being played, and generates an edited game video DE based on the selected game video for display DG-*m*. Furthermore, in the present embodiment, the edited game video DE includes: a user captured video DU-*m* that is a video obtained by capturing a user Ug-*m*; a user name image GN-*m* that is an image indicating the name of the user Ug-*m*; a team name image GT-*m* that is an image indicating the name of a baseball team used by the user Ug-*m* in the match of the baseball video game; and a score image GP-*m* that is an image indicating the score in the match of the baseball video game of the baseball team.

As illustrated in FIG. 2, based on the edited game video information JDE supplied from the video editing apparatus 30, the video distribution server 50 generates a game video for distribution DH (an example of "distributed video"), which is a video of a baseball video game being executed in the game apparatus 10-1 and the game apparatus 10-2, and supplies game-video-for-distribution information JDH (an example of "distribution information") indicative of the game video for distribution DH, to the terminal apparatus 70 (S16). The game video for distribution DH may be a still image for distribution GH that is updated each unit period. Here, the still image for distribution GH may be an image including a still image the same as the edited still image GE indicated by the edited game video information JDE, or may be an image including a still image obtained by changing the resolution of the edited still image GE indicated by the edited game video information JDE. Furthermore, the game video for distribution DH may be information indicating the still image for distribution GH updated each unit period in real time, may be information indicating a set of a plurality of still images for distribution GH corresponding one-to-one to a plurality of unit periods, or may be information obtained by adding sounds of a baseball video game thereto.

Figure 7:
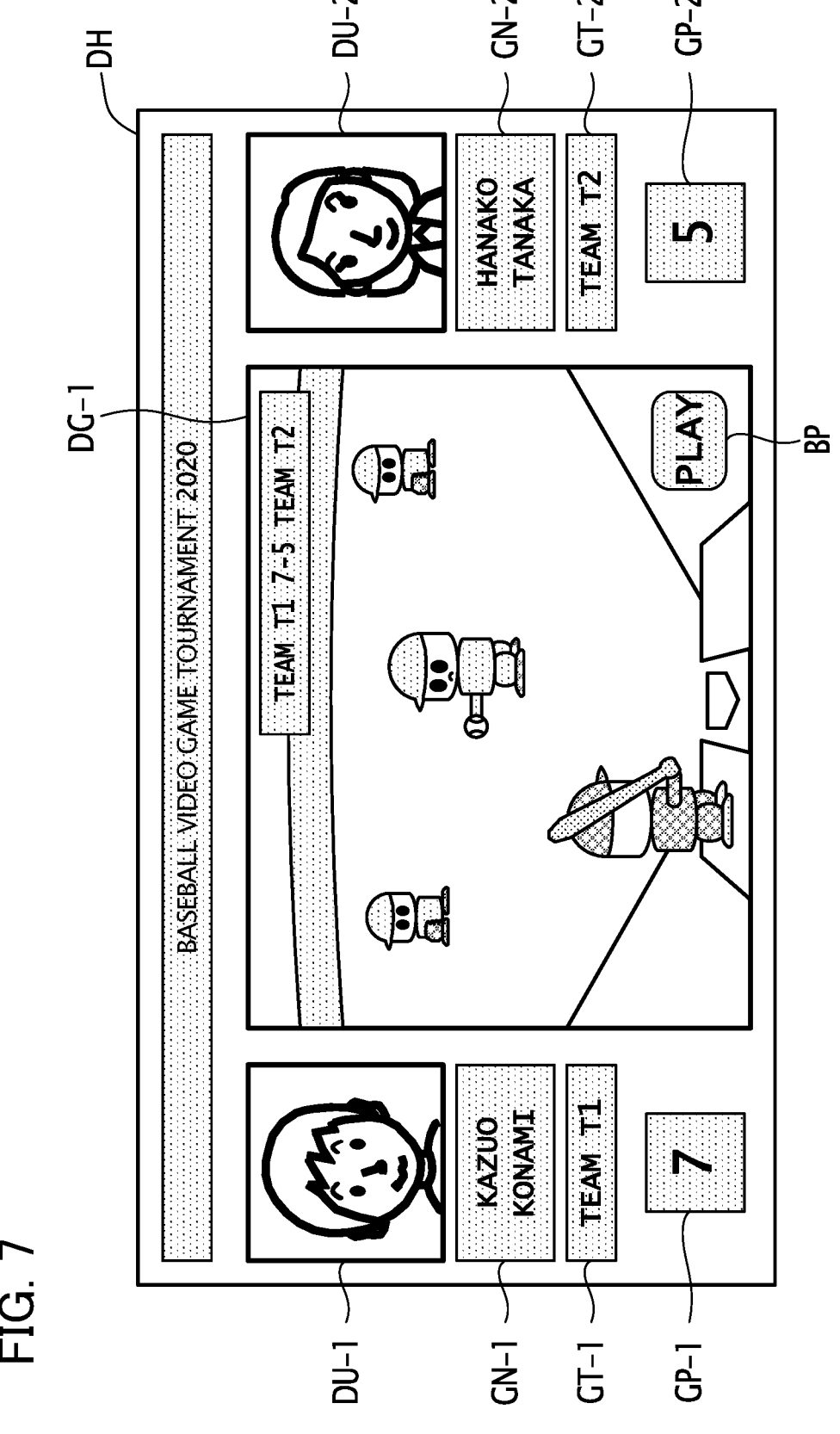
FIG. 7 is an explanatory diagram illustrating an example overview of a game video for distribution DH.

FIG. 7 is an explanatory diagram for explaining an example overview of the game video for distribution DH generated by the video distribution server 50.

As illustrated in FIG. 7, in the present embodiment, the game video for distribution DH is a video obtained by adding a modifiable replaying of a game request button BP to the edited game video DE.

As illustrated in FIG. 3, the game apparatus 10-$m$ supplies game progression status information JG-m (an example of "progression status information") to the video distribution server 50 (S17). The game progression status information JG-m is required for the terminal apparatus 70 to execute the modifiable replaying of a game. More specifically, the game progression status information JG-m may be, for example, information obtained by extracting a situation of the virtual space Fd related to the modifiable replaying of a game, out of a situation of the virtual space Fd indicated by the game progression information JS. In the present embodiment, it is assumed that the game progression status information JG-m includes pitching information J3 indicating the content of pitches by a pitcher character CP.

Then, in response to a press of the modifiable replaying of a game request button BP displayed in the game video for distribution DH by a user Ut-n of the terminal apparatus 70-$n$, the terminal apparatus 70-$n$ supplies, to the video distribution server 50, a modifiable replaying of a game request Req requesting the modifiable replaying of a game to be executed in the terminal apparatus 70-$n$ (S18). In the present embodiment, it is assumed that the modifiable replaying of a game request Req includes terminal characteristic information indicating characteristics of the terminal apparatus 70-$n$.

Next, when the video distribution server 50 receives the modifiable replaying of a game request Req from the terminal apparatus 70-$n$, the video distribution server 50 supplies, to the terminal apparatus 70-$n$, modifiable replaying of a game information JGG (an example of "modifiable replaying information"), which is information for causing the terminal apparatus 70-$n$ to execute a modifiable replaying of a game (S19). Thereafter, the terminal apparatus 70-$n$ executes a modifiable replaying of a game based on the modifiable replaying of a game information JGG (S20).

Figure 8:
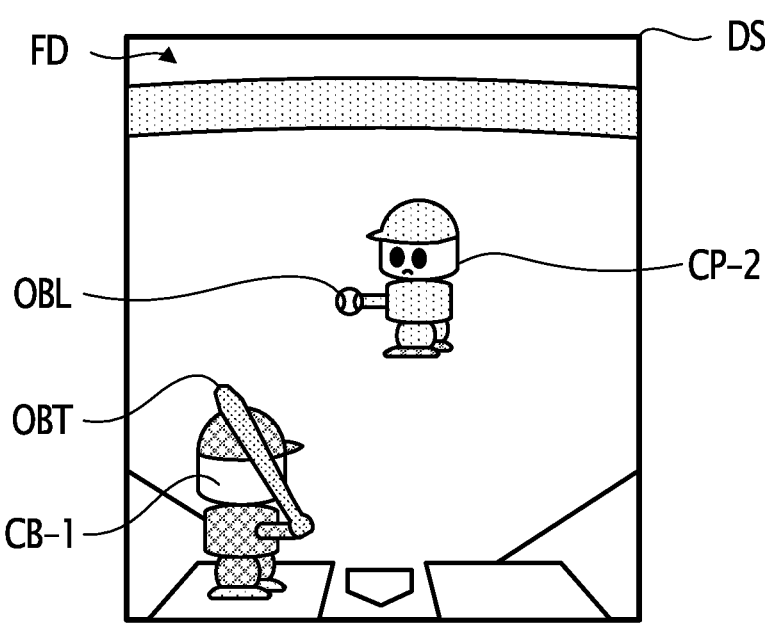
FIG. 8 is an explanatory diagram illustrating an example overview of a modifiable replaying of a game video DS.

FIG. 8 is an explanatory diagram for explaining an example overview of a modifiable replaying of a game video DS displayed on a display unit 76-$n$ provided in the terminal apparatus 70-$n$ in a case in which the terminal apparatus 70-$n$ is executing the modifiable replaying of a game.

As illustrated in FIG. 8, in the present embodiment, the modifiable replaying of a game video DS indicates a situation in which a pitcher character CP throws a ball object OBL based on an operation by the user Ug-m of the game apparatus 10-$m$ in the virtual space Fd and a situation in which a batter character CB hits the ball object OBL with the bat object OBT based on an operation by the user Ut-n of the terminal apparatus 70-$n$ in the virtual space Fd.

As illustrated in FIG. 3, the terminal apparatus 70-$n$ supplies, to the video distribution server 50, modifiable replaying of a game outcome information JSG (an example of "outcome information") indicating an outcome of the modifiable replaying of a game executed in the terminal apparatus 70-$n$ (S21).

Thereafter, the information processing system Sys repeatedly executes the processing of steps S14 to S21 until the match of the baseball video game ends.

In some embodiments, in response to the video distribution server 50 acquiring the modifiable replaying of a game outcome information JSG from the terminal apparatus 70, the video distribution server 50 may generate a modifiable replaying of a game outcome image GK indicating an outcome of the modifiable replaying of a game in the terminal apparatus 70-$n$ based on the modifiable replaying of a game outcome information JSG, and incorporate the generated modifiable replaying of a game outcome image GK into the game video for distribution DH. In some embodiments, in response to the video distribution server 50 acquiring, from a plurality of terminal apparatuses 70, a plurality of pieces of modifiable replaying of a game outcome information JSG corresponding to the plurality of terminal apparatuses 70, the video distribution server 50 may generate a modifiable replaying of a game outcome image GK indicating outcomes of modifiable replaying of games in the plurality of terminal apparatuses 70 based on the plurality of pieces of modifiable replaying of a game outcome information JSG, and incorporate the generated modifiable replaying of a game outcome image GK into the game video for distribution DH. In some embodiments, in response to the video distribution server 50 acquiring, from the plurality of terminal apparatuses 70, a plurality of pieces of modifiable replaying of a game outcome information JSG corresponding to the plurality of terminal apparatuses 70, the video distribution server 50 may generate a modifiable replaying of a game outcome image GK indicating outcomes of the modifiable replaying of games in the plurality of terminal apparatuses 70 and an outcome of a modifiable replaying of a game in one terminal apparatus 70 among the plurality of terminal apparatuses 70 based on the plurality of pieces of modifiable replaying of a game outcome information JSG, and incorporate the generated modifiable replaying of a game outcome image GK into a game video for distribution DH to be supplied to the one terminal apparatus 70.

Figure 9:
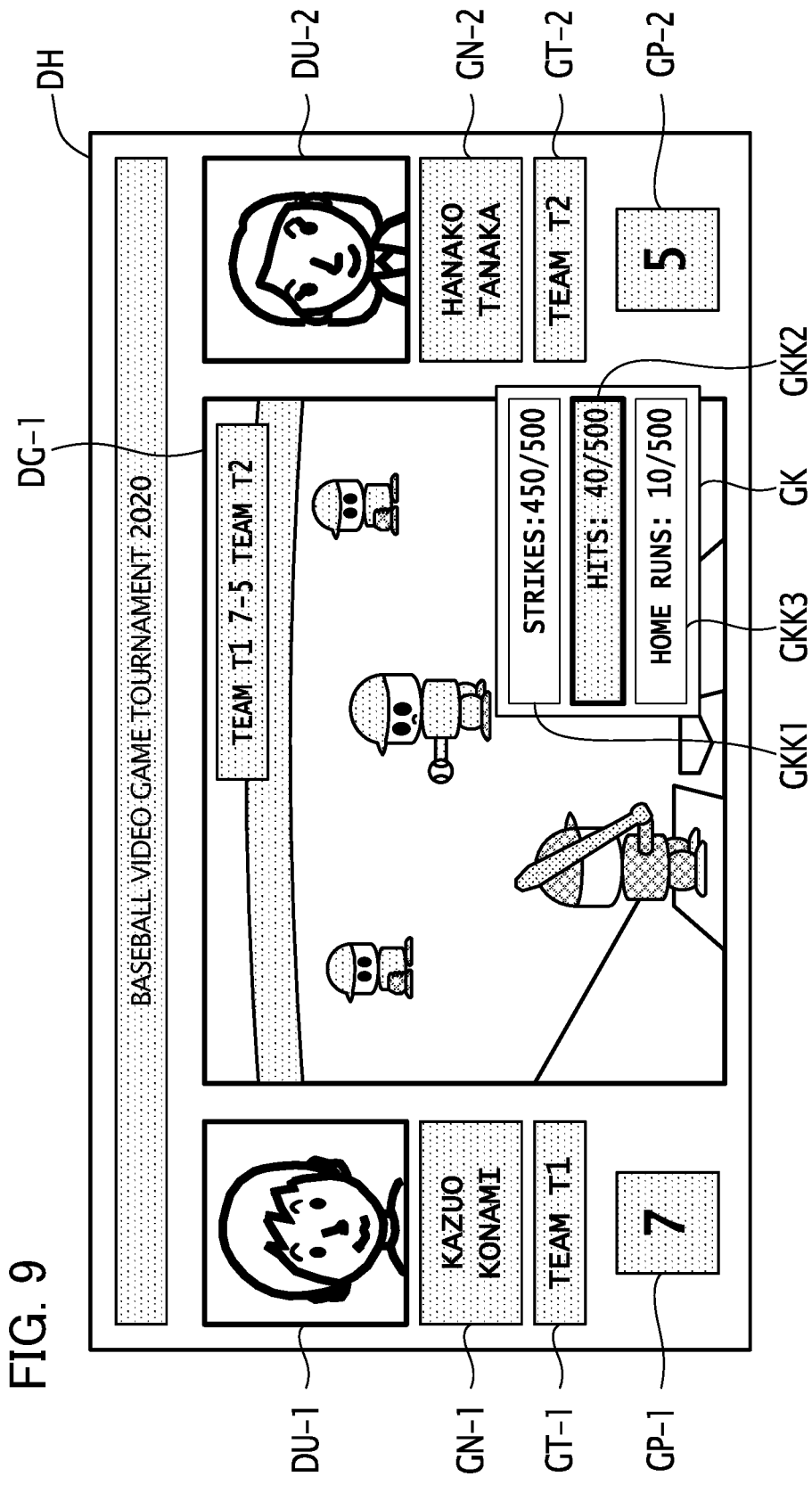
FIG. 9 is an explanatory diagram illustrating an example overview of a game video for distribution DH.

FIG. 9 is an explanatory diagram for explaining an example overview of a game video for distribution DH in which the modifiable replaying of a game outcome image GK is incorporated. It is to be noted that FIG. 9 illustrates a game video for distribution DH that is displayed on the display unit 76-$n$ provided in the terminal apparatus 70-$n$ among a plurality of terminal apparatuses 70 in response to the video distribution server 50 acquiring a plurality of pieces of modifiable replaying of a game outcome information JSG from the plurality of terminal apparatuses 70.

In the present embodiment, it is assumed that the modifiable replaying of a game outcome image GK incorporated in the game video for distribution DH includes a plurality of modifiable-replaying-of-a-game individual outcome images GKK. In the example illustrated in FIG. 9, the modifiable replaying of a game outcome image GK includes, as an example, a modifiable-replaying-of-a-game individual outcome image GKK1, a modifiable-replaying-of-a-game individual outcome image GKK2, and a modifiable-replaying-of-a-game individual outcome image GKK3. The modifiable-replaying-of-a-game individual outcome image GKK1 indicates the number of terminal apparatuses 70 for which the outcomes of modifiable replaying of games were "strikes", out of the number of terminal apparatuses 70 in which modifiable replaying of games were executed. The modifiable-replaying-of-a-game individual outcome image GKK2 indicates the number of terminal apparatuses 70 for which the outcomes of modifiable replaying of games were "base hits", out of the number of terminal apparatuses 70 in which modifiable replaying of games were executed. The modifiable-replaying-of-a-game individual outcome image GKK3 indicates the number of terminal apparatuses 70 in which the outcomes of modifiable replaying of games were "home runs", out of the number of terminal apparatuses 70 in which modifiable replaying of games were executed. Furthermore, in the present embodiment, it is assumed that the video distribution server 50 highlights a modifiable-replaying-of-a-game individual outcome image GKK that corresponds to the outcome of the modifiable replaying of a game in the terminal apparatus 70-*n*, to which the game video for distribution DH is supplied, among the plurality of modifiable-replaying-of-a-game individual outcome images GKK included in the modifiable replaying of a game outcome image GK incorporated in the game video for distribution DH. In the example illustrated in FIG. 9, it is assumed that the modifiable replaying of a game in the terminal apparatus 70-*n* was a "base hit". Therefore, in the example illustrated in FIG. 9, the modifiable-replaying-of-a-game individual outcome image GKK2, which indicates the number of the terminal apparatuses 70 for which the outcomes of the modifiable replaying of a game was a "base hit" is displayed with more emphasis (highlighted), compared with the modifiable-replaying-of-a-game individual outcome image GKK1 and the modifiable-replaying-of-a-game individual outcome image GKK3.

1.3. Functions of Information Processing System

In the following, the functions of the game apparatus 10, the video distribution server 50, and the terminal apparatus 70 will be described with reference to FIGS. 10 to 15.

Figure 10:
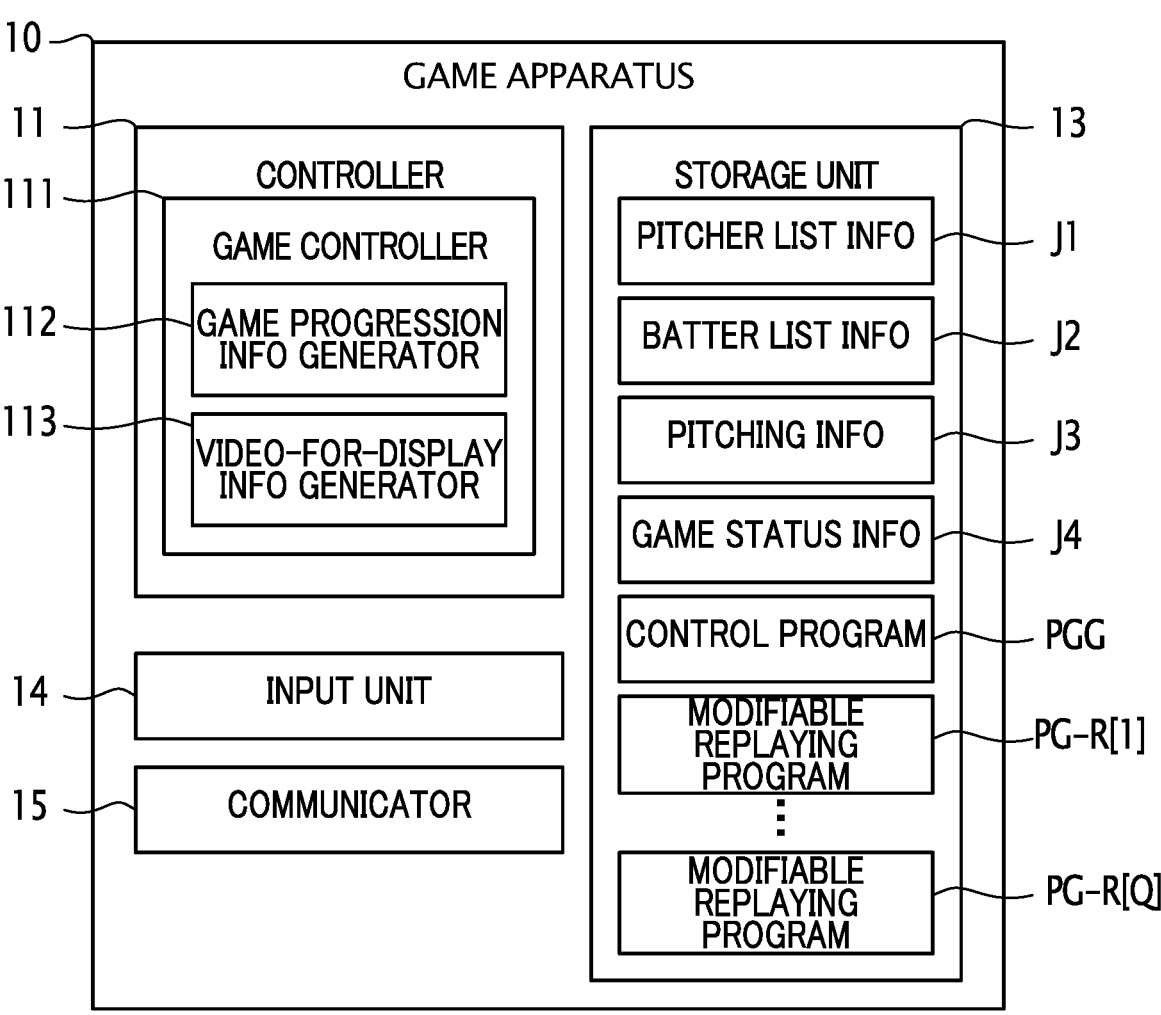
FIG. 10 is a block diagram illustrating an example configuration of a game apparatus 10.

FIG. 10 is a functional block diagram illustrating an example configuration of the game apparatus 10.

As illustrated in FIG. 10, the game apparatus 10 includes a controller 11 that controls each unit of the game apparatus 10, a storage unit 13 that stores various types of information, an input unit 14 that accepts an operation by a user Ug of the game apparatus 10, and a communicator 15 that executes communication with an external apparatus external to the game apparatus 10.

As illustrated in FIG. 10, the controller 11 includes a game controller 111. The game controller 111 includes a game progression information generator 112 and a video-for-display information generator 113. The game progression information generator 112 generates game progression information JS based on operation information JM indicating the operation content of the game apparatus 10 carried out by the user Ug and received by the input unit 14. Furthermore, the game progression information generator 112 generates pitching information J3 based on the game progression information JS. Furthermore, the game progression information generator 112 generates game status information J4 indicating a game status of the match of the baseball video game. Then, the game progression information generator 112 generates game progression status information JG including the pitching information J3 and the game status information J4. The video-for-display information generator 113 generates game-video-for-display information JDG based on the game progression information JS generated by the game progression information generator 112.

As illustrated in FIG. 10, the storage unit 13 stores pitcher list information J1, batter list information J2, the pitching information J3, the game status information J4, and a control program PGG for controlling each unit of the game apparatus 10. Furthermore, the storage unit 13 stores Q types of modifiable replaying programs PG-R. In the present embodiment, the value Q is a natural number equal to or greater than 2. However, the value Q may be "1". In the following description, a q-th modifiable replaying program PG-R among the Q types of modifiable replaying programs PG-R may be referred to as a modifiable replaying program PG-R[q]. In the present embodiment, the information processing system Sys supplies to the terminal apparatus 70 a modifiable replaying program PG-R[q] that corresponds to the characteristics of the terminal apparatus 70 among the Q types of modifiable replaying programs PG-R[1] to PG-R [Q]. Here, the characteristics of the terminal apparatus 70 comprise a concept including one or both of the characteristics of the terminal apparatus 70 related to a modifiable replaying enabling method of the modifiable replaying program PG-R and the characteristics of the terminal apparatus 70 related to the modifiable replaying accuracy of the modifiable replaying program PG-R. Specifically, the characteristics of the terminal apparatus 70 include one, some, or all of the type of an operating system of the terminal apparatus 70, the type of a browser of the terminal apparatus 70, the processing performance of a processor 7001 of the terminal apparatus 70, the storage capacity of a storage device 7003 of the terminal apparatus 70, and the like.

Figure 11:
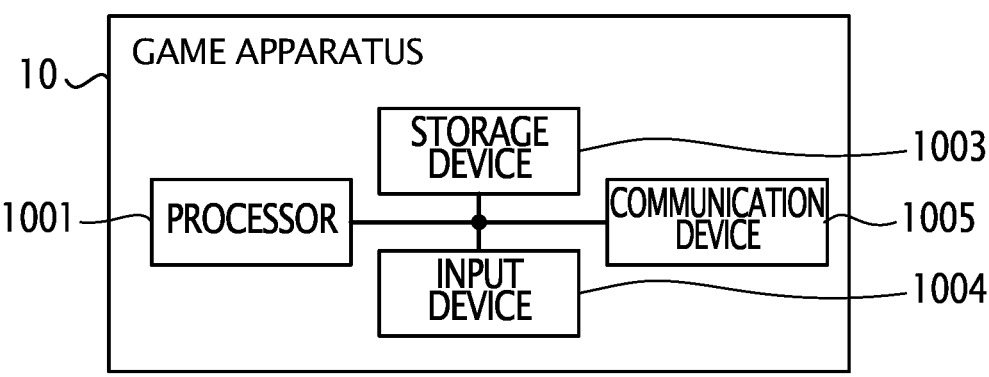
FIG. 11 is a block diagram illustrating an example hardware configuration of the game apparatus 10.

FIG. 11 is a configuration diagram illustrating an example hardware configuration of the game apparatus 10.

As illustrated in FIG. 11, the game apparatus 10 includes a processor 1001 that controls each unit of the game apparatus 10, a storage device 1003 that stores various types of information, an input device 1004 that accepts an operation by a user Ug of the game apparatus 10, and a communication device 1005 that communicates with an external apparatus external to the game apparatus 10. The storage device 1003 is, for example, a computer-readable recording medium. The storage device 1003 is a non-transitory recording medium, and includes one or both of a volatile memory, such as a RAM (Random Access Memory) that functions as a work area of the processor 1001, and a non-volatile memory, such as an Electrically Erasable Programmable Read-Only Memory (EEPROM) that stores various types of information (e.g., a control program PGG, and the like), and provides a function as the storage unit 13. That is, the storage device 1003 stores the pitcher list information J1, the batter list information J2, the pitching information J3, the game status information J4, the control program PGG for controlling each unit of the game apparatus 10, and the Q types of modifiable replaying programs PG-R [1] to PG-R [Q]. It is to be noted that, in the present embodiment, the storage device 1003 is an example of a "recording medium" in which the control program PGG is recorded, but the present invention is not limited thereto. The "recording medium" having recorded the control program PGG therein may be a storage device provided in an external apparatus external to the game apparatus 10. For example, the "recording medium" having recorded the control program PGG therein may be a storage device that exists outside the game apparatus 10, the storage device being provided in a distribution server that distributes the control program PGG and having recorded therein the control program PGG. The processor 1001 includes, for example, one or more CPUs (Central Processing Units). The processor 1001 executes the control program PGG stored in the storage device 1003 and operates in accordance with the control program PGG, thereby functioning as the controller 11. It is to be noted that the processor 1001 may be configured to include hardware such as a Graphics Processing Unit (GPU), a Digital Signal Processor (DSP), or a Field Programmable Gate Array (FPGA) in addition to the one or more CPUs or in place of one, some, or all of the one or more CPUs. Part or all of the controller 11 realized by the processor 1001 may be realized by hardware such as a DSP. Furthermore, the processor 1001 may be configured to include one, some, or all of (i) the one or more CPUs and (ii) one or more hardware elements. For example, in a case in which the processor 1001 is configured to include multiple CPUs, one, some, or all of the functions of the controller 11 may be realized by one, some, or all of the CPUs operating in cooperation with each other and in accordance with the control program PGG. The input device 1004 is, for example, an operation button, and provides a function as the input unit 14, which receives an operation by the user Ug of the game apparatus 10. The input device 1004 may be constituted of one or a plurality of devices including, for example, one, some, or all of an operation button, touch panel, keyboard, joystick, and pointing device (e.g., mouse). The communication device 1005 is hardware for communicating with an external apparatus external to the game apparatus 10 via one or both of a wired network and a wireless network, and provides a function as the communicator 15.

FIG. 12 is a functional block diagram illustrating an example configuration of the video distribution server 50.

As illustrated in FIG. 12, the video distribution server 50 includes a controller 51 that controls each unit of the video distribution server 50, a storage unit 53 that stores various types of information, and a communicator 55 for communicating with an external apparatus external to the video distribution server 50.

As illustrated in FIG. 12, the controller 51 includes a video-for-distribution information generator 511 and a modifiable replaying of a game information generator (modifiable game replay information generator) 512. Among them, the video-for-distribution information generator 511 (an example of "distribution information generator") generates game-video-for-distribution information JDH based on the edited game video information JDE. Furthermore, the modifiable replaying of a game information generator 512 (an example of the "modifiable replaying information generator" and the "generator") generates modifiable replaying of a game information JGG based on the game basic information JK-m, the game progression status information JG-m, and the modifiable replaying program PG-R. Although not shown, the controller 51 functions as an "information acquirer" by acquiring the game progression status information JG-m supplied from the game apparatus 10-m.

As illustrated in FIG. 12, the storage unit 53 stores pitcher list information J1, batter list information J2, a modifiable replaying of a game management information table (modifiable game replay management information table) TBL1, a terminal characteristic information table TBL2, a modifiable replaying of a game outcome information table (modifiable game replay outcome information table) TBL3, a control program PGS for controlling each unit of the video distribution server 50, and Q types of modifiable replaying programs PG-R [1] to PG-R [Q]. The modifiable replaying of a game management information table TBL1, the terminal characteristic information table TBL2, and the modifiable replaying of a game outcome information table TBL3 will be described later.

Figure 13:
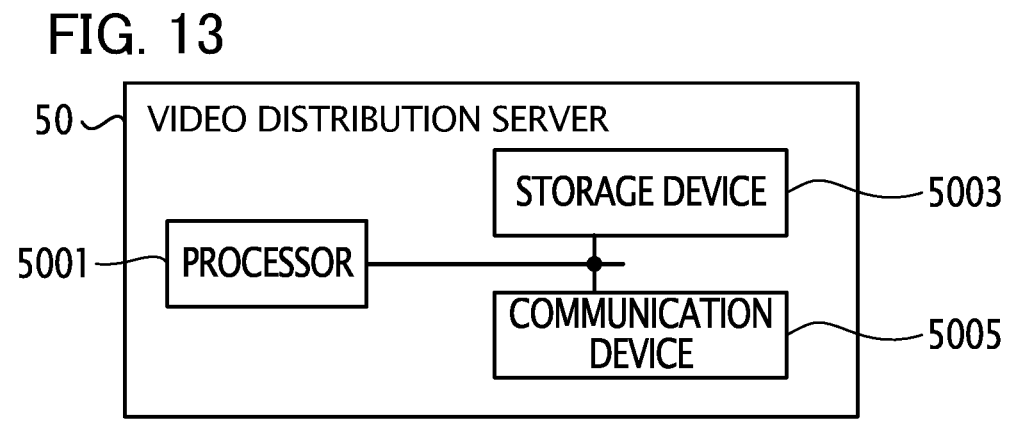

FIG. 13 is a configuration diagram illustrating an example hardware configuration of the video distribution server 50.

As illustrated in FIG. 13, the video distribution server 50 includes a processor 5001 that controls each unit of the video distribution server 50, a storage device 5003 that stores various types of information, and a communication device 5005 that communicates with an external apparatus external to the video distribution server 50.

The storage device 5003 is, for example, a computer-readable recording medium. The storage device 5003 is a non-transitory recording medium, and includes, for example, one or both of a volatile memory, such as a RAM that functions as a work area of the processor 5001, and a non-volatile memory, such as an EEPROM that stores various types of information (e.g., a control program PGS), and provides a function as the storage unit 53. That is, the storage device 5003 stores the pitcher list information J1, the batter list information J2, the modifiable replaying of a game management information table TBL1, the terminal characteristic information table TBL2, the modifiable replaying of a game outcome information table TBL3, the control program PGS for controlling each unit of the video distribution server 50, and the Q types of modifiable replaying programs PG-R[1] to PG-R[Q]. It is to be noted that, in the present embodiment, the storage device 5003 is exemplified as a "recording medium" in which the control program PGS is recorded, but the present invention is not limited thereto. The "recording medium" having recorded therein the control program PGS may be a storage device provided in an external apparatus external to the video distribution server 50. For example, the "recording medium" having recorded therein the control program PGS may be a storage device in which the control program PGS is recorded, the storage device being provided in a distribution server that is external to the video distribution server 50 and distributes the control program PGS.

The processor 5001 includes, for example, one or more CPUs. The processor 5001 executes a control program PGS stored in the storage device 5003 and operates in accordance with the control program PGS, thereby functioning as the controller 51. It is to be noted that the processor 5001 may be configured to include hardware such as a GPU, DSP, or FPGA in addition to the one or more CPUs or in place of one, some, or all of the one or more CPUs. In this case, some or all of the controller 51 implemented by the processor 5001 may be implemented by hardware, such as a DSP. Furthermore, the processor 5001 may be configured to include one, some, or all of (i) one or more CPUs and (ii) one or more hardware elements. For example, in a case in which the processor 5001 is configured to include multiple CPUs, one, some, or all of the functions of the controller 51 may be realized by one, some, or all of the CPUs operating in cooperation with each other and in accordance with the control program PGS.

The communication device 5005 is hardware for communicating with an external apparatus external to the video distribution server 50 via one or both of a wired network and a wireless network, and provides a function as the communicator 55.

Figure 14:
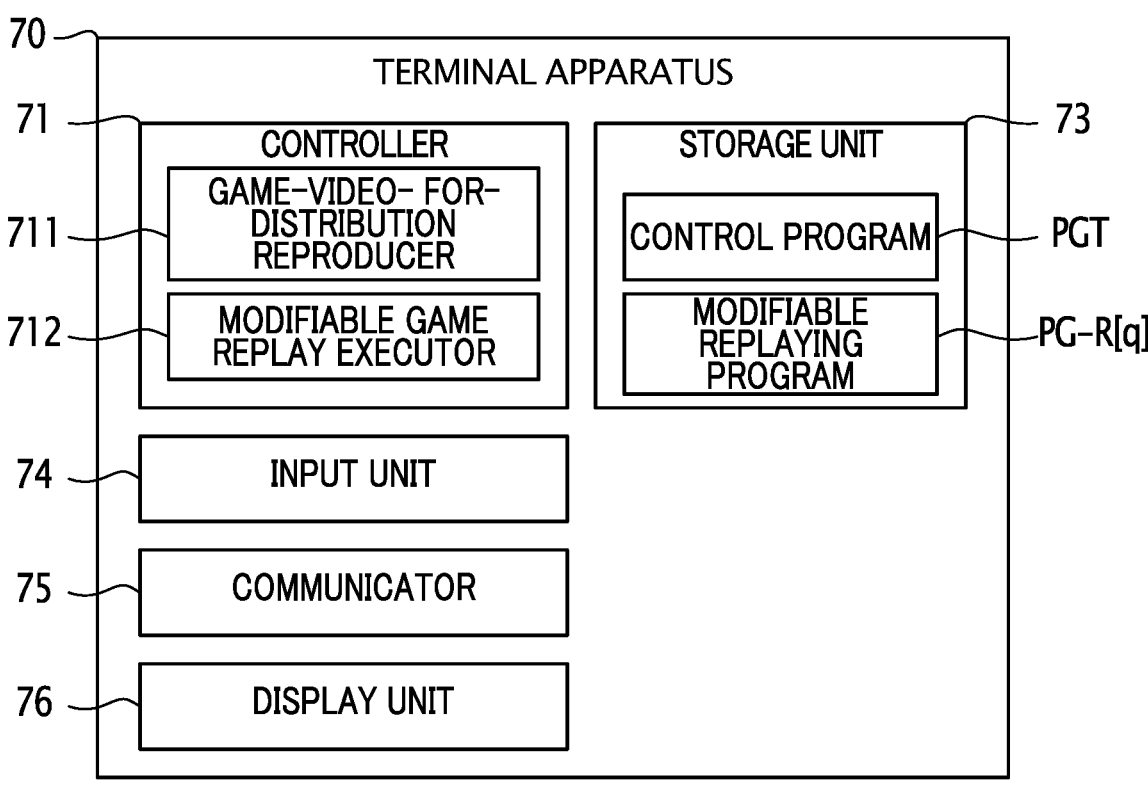
FIG. 14 is a block diagram illustrating an example configuration of a terminal apparatus 70.

FIG. 14 is a functional block diagram illustrating an example configuration of the terminal apparatus 70.

As illustrated in FIG. 14, the terminal apparatus 70 includes a controller 71 that controls each unit of the terminal apparatus 70, a storage unit 73 that stores various types of information, an input unit 74 that accepts an operation by a user Ut of the terminal apparatus 70, a communicator 75 for communicating with an external apparatus external to the terminal apparatus 70, and a display unit 76 that displays various types of images.

As illustrated in FIG. 14, the controller 71 includes a game-video-for-distribution reproducer 711 and a modifiable replaying of a game (modifiable game replay) executor 712. Among them, the game-video-for-distribution reproducer 711 causes the display unit 76 to display the game video for distribution DH based on the game-video-for-distribution information JDH. Furthermore, the modifiable replaying of a game executor 712 executes a modifiable replaying of a game based on the modifiable replaying of a game information JGG.

As illustrated in FIG. 14, the storage unit 73 stores a control program PGT for controlling each unit of the terminal apparatus 70 and a modifiable replaying program PG-R[q] that corresponds to the terminal apparatus 70.

Figure 15:
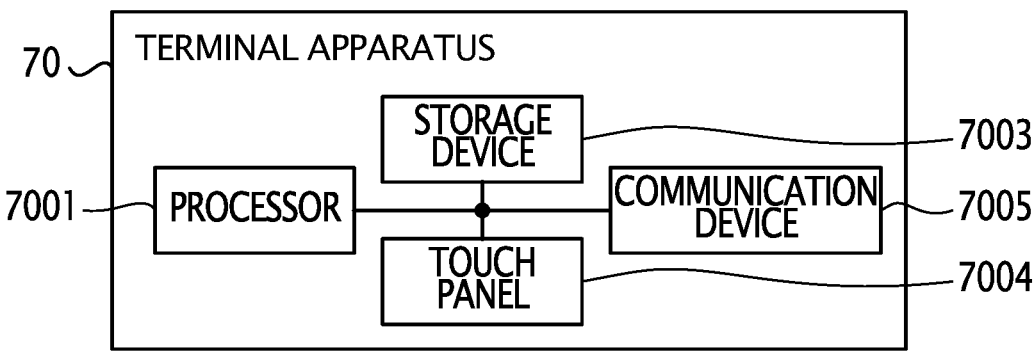
FIG. 15 is a block diagram illustrating an example hardware configuration of the terminal apparatus 70.

FIG. 15 is a configuration diagram illustrating an example hardware configuration of the terminal apparatus 70.

As illustrated in FIG. 15, the terminal apparatus 70 includes a processor 7001 that controls each unit of the terminal apparatus 70, a storage device 7003 that stores various types of information, a communication device 7005 that communicates with an external apparatus external to the terminal apparatus 70, and a touch panel 7004 that displays various images and accepts an operation carried out by a user Ut of the terminal apparatus 70.

The storage device 7003 is, for example, a computer-readable recording medium. The storage device 7003 is a non-transitory recording medium, and includes, for example, one or both of a volatile memory, such as a RAM that functions as a work area of the processor 7001, and a non-volatile memory, such as an EEPROM that stores various types of information (e.g., a control program PGT), and provides a function as the storage unit 73.

The processor 7001 includes, for example, one or more CPUs. The processor 7001 executes the control program PGT stored in the storage device 7003 and operates in accordance with the control program PGT, thereby functioning as the game-video-for-distribution reproducer 711. Furthermore, the processor 7001 executes the modifiable replaying program PG-R[q] and the control program PGT stored in the storage device 7003, and operates in accordance with the modifiable replaying program PG-R[q] and the control program PGT, thereby functioning as the modifiable replaying of a game executor 712. It is to be noted that the processor 7001 may be configured to include hardware such as a GPU, DSP or FPGA in addition to the one or more CPUs or in place of one, some, or all of the one or more CPUs. In this case, part or all of the controller 71 implemented by the processor 7001 may be implemented by hardware, such as a DSP.

The communication device 7005 is hardware for communicating with an external apparatus external to the terminal apparatus 70 via one or both of a wired network and a wireless network, and provides a function as the communicator 75.

The touch panel 7004 functions as the display unit 76 displayable of various images, and also functions as the input unit 74 that receives an operation from a user Ut of the terminal apparatus 70.

1.4. Data in Information Processing System

Referring to FIGS. 16 to 23, various types of data present in the information processing system Sys will be described below.

FIG. 16 is an explanatory diagram illustrating an example data configuration of the pitcher list information J1. It is to be noted that the pitcher list information J1 is information determined in advance prior to the start of a match of a baseball video game.

As illustrated in FIG. 16, the pitcher list information J1 includes a plurality of records corresponding one-to-one to a plurality of pitcher characters CP appearing in the match of the baseball video game. Each record of the pitcher list information J1 includes a pitcher ID and pitcher information. Here, the pitcher ID is information for identifying the respective pitcher character CP from among the plurality of pitcher characters CP appearing in the match of the baseball video game. The pitcher information is, for example, information including pitcher basic information and pitcher skill information. The pitcher basic information includes, for example, pitcher name information indicating the name of the respective pitcher character CP and pitcher image information indicating an image of the pitcher character CP. The pitcher skill information indicates the degree of the pitching ability of the pitcher character CP in throwing the ball object OBL. Specifically, the pitcher skill information includes, for example, standard velocity information indicating a standard velocity of the ball object OBL thrown by the pitcher character CP, pitching type information, and control information. The pitching type information indicates the degree of the pitching ability of the pitcher character CP for each type of pitching that the pitcher character CP can throw, and the control information indicates the degree of the control ability of the ball object OBL thrown by the pitcher character CP.

FIG. 17 is an explanatory diagram illustrating an example configuration of the batter list information J2. It is to be noted that the batter list information J2 is information determined in advance, prior to the start of a match of the baseball video game.

As illustrated in FIG. 17, the batter list information J2 includes a plurality of records corresponding one-to-one to a plurality of batter characters CB appearing in a match of a baseball video game. Each record of the batter list information J2 includes a batter ID and batter information. Here, the batter ID is information for identifying each batter character CB from among a plurality of batter characters CB appearing in the match of the baseball video game. The batter information is, for example, information including batter basic information and batter skill information. The batter basic information includes, for example, batter name information indicating the name of the batter character CB and batter image information indicating an image of the batter character CB. The batter skill information indicates a degree of the batter character CB's hitting ability of the ball object OBL. Specifically, the batter skill information is information including, for example, hitting power information indicating the hitting velocity of the hit ball object OBL when the batter character CB hits the ball object OBL pitched by the pitcher character CP, the batter character CB's meeting ability information indicating a degree of ability to have the bat object OBT meet the ball object OBL pitched by the pitcher character CP, and base running ability information indicating the base running speed of the batter character CB.

FIG. 18 is an explanatory diagram illustrating an example configuration of the pitching information J3. It is to be noted that, in response to the user Ug-m of the game apparatus 10-*m* carrying out an operation input to designate a motion of throwing the ball object OBL by the pitcher character CP in the input unit 14, the pitching information J3 is generated by the game progression information generator 112 based on the pitcher list information J1 and the operation information JM indicative of the content of the operation. Specifically, the game progression information generator 112 generates the pitching information J3 based on the pitching content of the pitcher character CP, indicated by the operation information JM, and the pitcher skill information of the pitcher character CP included in the pitcher list information J1.

As illustrated in FIG. 18, the pitching information J3 includes, for example, a pitching ID and pitching content information. The pitching ID identifies each pitch from among a plurality of pitches when the plurality of pitches are performed by a plurality of pitcher characters CP in a match of a baseball video game. The pitching content information includes, for example, velocity information indicating the velocity of the ball object OBL pitched by the pitcher character CP, pitching type information indicating a pitching type of the pitch by the pitcher character CP, and pitching trajectory information indicating the trajectory of the ball object OBL pitched by the pitcher character CP. Here, the pitching trajectory information includes, for example, pitching course information indicating a position at which the ball object OBL pitched by the pitcher character CP passes over the home base, and pitching course displacement amount information indicating how the course changes during the flight of the ball object OBL pitched by the pitcher character CP.

Figure 19:
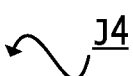
FIG. 19 is a diagram showing an example data configuration of game status information J4.

FIG. 19 is an explanatory diagram illustrating an example configuration of the game status information J4. The game status information J4 is information generated by the game progression information generator 112 based on the user Ug-m of the game apparatus 10-*m* carrying out an operation input to designate the motion of throwing the ball object OBL by the pitcher character CP in the input unit 14.

As illustrated in FIG. 19, the game status information J4 includes, for example, pitching timing information, count information, score information, runner information, and competing characters identification information.

The pitching timing information includes, for example, a pitching ID, game time information, and inning information. The game time information is, for example, information indicating an elapsed time in the game from the start of the match of the baseball video game. Specifically, in the game status information J4, the game time information is, for example, information indicating the elapsed time in the match from the start of the match of the baseball video game until the pitcher character CP pitches. However, in the game status information J4, the game time information may indicate an elapsed time in the game until the pitcher character CP pitches, from a freely selected point in time after the start of the baseball video game and before the start of the match of the baseball video game. The inning information indicates an inning in which the pitcher character CP pitches.

The count information includes, for example, out count information indicating an out count in a case in which the pitch is performed by the pitcher character CP, strike count information indicating a strike count in a case in which the pitching is performed by the pitcher character CP, and ball count information indicating a ball count in a case in which the pitching is performed by the pitcher character CP.

The score information indicates, for example, the score of the baseball team T1 in the match of the baseball video game and the score of the baseball team T2 in the match of the baseball video game.

The runner information indicates, for example, first base runner information indicating whether or not a runner is present at first base and indicating the ID of the runner who is at first base if the runner is present at first base, second base runner information indicating whether or not a runner is present at second base and indicating the ID of a runner who is at second base if the runner is present at second base, and third base runner information indicating whether or not a runner is present at third base and indicating the ID of a runner who is at third base if the runner is at third base.

The competing characters identification information includes, for example, current pitcher information indicating a pitcher ID of a pitcher character CP in a case in which pitching is performed by the pitcher character CP, and current batter at-bat information indicating a batter ID of a batter character CB at-bat in a case in which the pitcher character CP pitches.

FIG. 20 is an explanatory diagram illustrating an example data configuration of the modifiable replaying of a game management information table TBL1.

In the present embodiment, the modifiable replaying of a game information generator 512 adds a record to the modifiable replaying of a game management information table TBL1 based on a modifiable replaying of a game condition being satisfied by a pitch by the pitcher character CP in a match of a baseball video game. Here, the modifiable replaying of a game condition (an example of "predetermined condition") is a condition on game status information J4 that corresponds to the pitch by the pitcher character CP. In the present embodiment, as an example, it is assumed that the modifiable replaying of a game condition is met when at least one of the following first to fourth modifiable replaying of a game conditions is satisfied.

First Modifiable Replaying of a Game Condition

In the game status information J4, the inning information indicates "the seventh or subsequent inning".

Second Modifiable Replaying of a Game Condition

In the game status information J4, the runner information indicates that the runner is present at the second base or third base.

Third Modifiable Replaying of a Game Condition

In the game status information J4, the out count information indicates "2 outs".

Fourth Modifiable Replaying of a Game Condition

In the game status information J4, the strike count information indicates "2 strikes".

In the following description, a pitch that satisfies the modifiable replaying of a game condition, that is, a pitch that satisfies at least one of the first to fourth modifiable replaying of a game conditions, is referred to as a modifiable replaying target pitch (an example of "specific situation").

As illustrated in FIG. 20, the modifiable replaying of a game management information table TBL1 includes a plurality of records corresponding one-to-one to a plurality of modifiable replaying target pitches in a match of a baseball video game. Each record of the modifiable replaying of a game management information table TBL1 includes a modifiable replaying ID and modifiable replaying of a game management information (modifiable game replay management information). The modifiable replaying ID is information for identifying the respective modifiable replaying target pitch from among the plurality of modifiable replaying target pitches in the match of the baseball video game. Furthermore, the modifiable replaying of a game management information includes, for example, game time information, competing characters identification information, and pitching information J3.

FIG. 21 is an explanatory diagram illustrating an example data configuration of the modifiable replaying of a game information JGG. As described above, the modifiable replaying of a game information JGG is information generated by the modifiable replaying of a game information generator 512 in response to receipt of a modifiable replaying of a game request Req from the terminal apparatus 70-*n* at the video distribution server 50.

As illustrated in FIG. 21, the modifiable replaying of a game information JGG includes, for example, the above-described modifiable replaying ID, game time information, and pitching information J3, modifiable replaying of a game character information, and a modifiable replaying program PG-R[q]. The modifiable replaying of a game character information (modifiable game replay character information) is, for example, information including the above-described pitcher basic information, batter basic information, and batter skill information.

As described above, in the terminal apparatus 70 to which the modifiable replaying of a game information JGG is supplied, a modifiable replaying of a game is executed by displaying a modifiable replaying of a game video DS. Specifically, in the modifiable replaying of a game video DS, the modifiable replaying of a game executor 712 of the terminal apparatus 70 displays the pitcher character CP based on the pitcher basic information included in the modifiable replaying of a game information JGG, displays the batter character CB based on the batter basic information included in the modifiable replaying of a game information JGG, and further displays the ball object OBL based on the pitching content information included in the modifiable replaying of a game information JGG. Then, the modifiable replaying of a game executor 712 determines whether or not the ball object OBL can be hit by the bat object OBT based on the operation content of the input unit 74 by the user Ut of the terminal apparatus 70 and the batter skill information included in the modifiable replaying of a game information JGG. Furthermore, when the ball object OBL is hit in the modifiable replaying of a game, the modifiable replaying of a game executor 712 determines the speed of the hit ball object OBL (batted ball) and the trajectory of the ball object OBL based on the content of the operation of the input unit 74 by the user Ut of the terminal apparatus 70 and the batter skill information included in the modifiable replaying of a game information JGG.

FIG. 22 is an explanatory diagram illustrating an example data configuration of the terminal characteristic information table TBL2.

In the present embodiment, the modifiable replaying of a game information generator 512 adds a record to the terminal characteristic information table TBL2 in response to receipt of the modifiable replaying of a game request Req at the video distribution server 50 from a terminal apparatus 70 and based on the modifiable replaying of a game request Req being the first modifiable replaying of a game request Req from the terminal apparatus 70 during a period in which a match of a baseball video game is being executed.

As illustrated in FIG. 22, the terminal characteristic information table TBL2 includes a plurality of records corresponding one-to-one to the plurality of terminal apparatuses 70 that have transmitted a modifiable replaying of a game request Req to the video distribution server 50 while the match of the baseball video game is being executed. In the following description, the terminal apparatus 70, which has transmitted the modifiable replaying of a game request Req to the video distribution server 50 while the match of the baseball video game is being executed, may be referred to as a modifiable replaying of a game execution terminal. Each record of the terminal characteristic information table TBL2 includes a terminal ID and terminal characteristic information. The terminal ID is information for identifying the respective modifiable replaying of a game execution terminal from among the plurality of modifiable replaying of a game execution terminals. As described above, the terminal characteristic information indicates characteristics of the terminal apparatus 70. In the present embodiment, as an example, the terminal characteristic information includes OS type information indicating the type of an operating system of the terminal apparatus 70, browser type information indicating the type of a browser of the terminal apparatus 70, terminal processing speed information indicating the processing speed of the processor 7001 of the terminal apparatus 70, and screen size information indicating the screen size of the display unit 76 of the terminal apparatus 70.

FIG. 23 is an explanatory diagram illustrating an example data configuration of the modifiable replaying of a game outcome information table TBL3. In the present embodiment, in response to a receipt of the modifiable replaying of a game outcome information JSG at the video distribution server 50 from a terminal apparatus 70, the modifiable replaying of a game information generator 512 adds a record to the modifiable replaying of a game outcome information table TBL3.

As illustrated in FIG. 23, the modifiable replaying of a game outcome information table TBL3 includes a plurality of records corresponding one-to-one to a plurality of pieces of modifiable replaying of a game outcome information JSG received by the video distribution servers 50 from the plurality of modifiable replaying of a game execution terminals. Each record of the modifiable replaying of a game outcome information table TBL3 includes a modifiable replaying outcome ID and modifiable replaying of a game outcome information (modifiable game replay outcome information) JSG. The modifiable replaying outcome ID is information for identifying the respective modifiable replaying of a game outcome information JSG from among the plurality of pieces of modifiable replaying of a game outcome information JSG received by the video distribution server 50. The modifiable replaying of a game outcome information JSG is information including, for example, a modifiable replaying ID of a modifiable replaying of a game corresponding to the modifiable replaying of a game outcome information JSG, a terminal ID of a terminal apparatus 70 that has transmitted the modifiable replaying of a game outcome information JSG, and modifiable replaying outcome information indicating the outcome of the modifiable replaying of a game corresponding to the modifiable replaying of a game outcome information JSG.

1.5. Operation of Video Distribution Server

In the following, description will be given of operation of the video distribution server 50 performed in a case in which a match of a baseball video game is performed, with reference to FIGS. 24 and 25.

Figure 24:
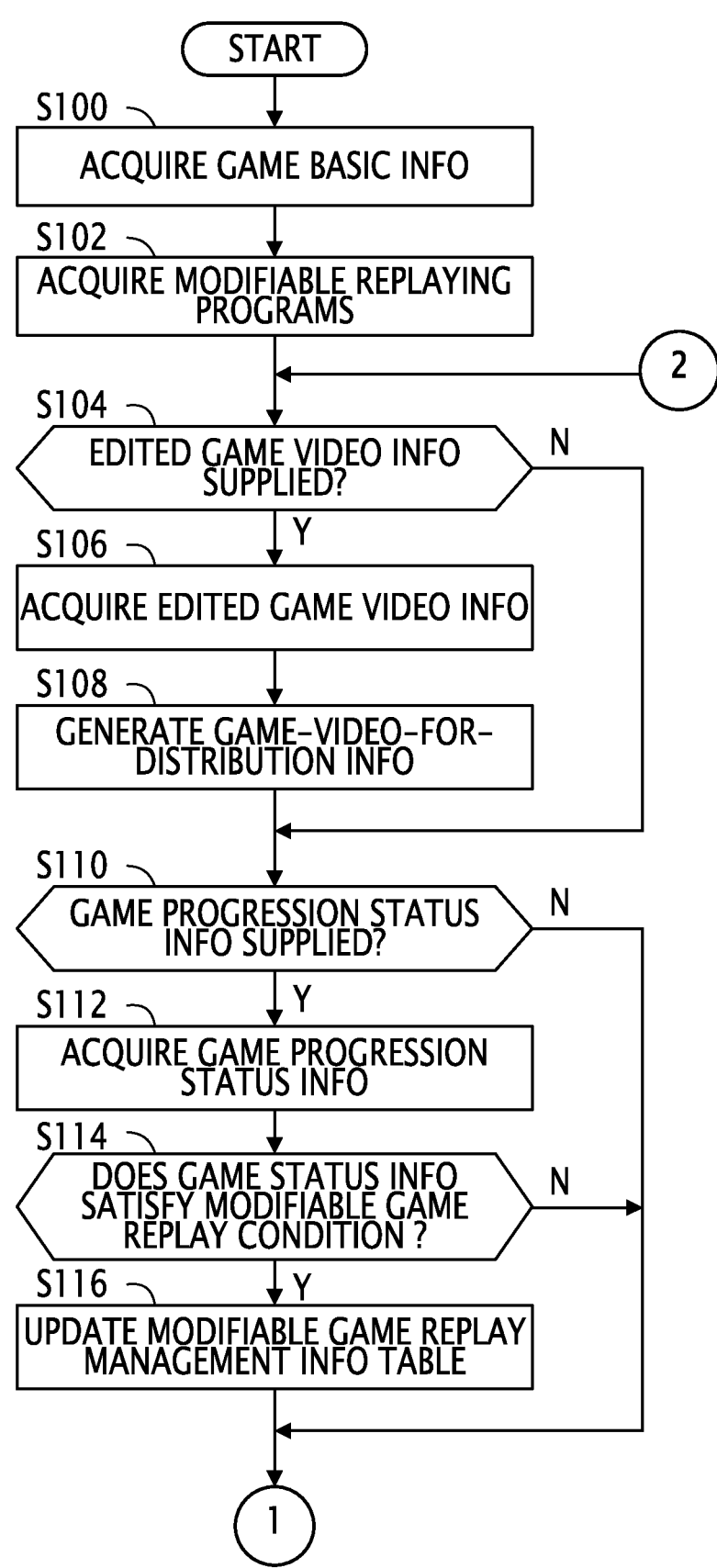
FIG. 24 is a flowchart showing an example operation of the video distribution server 50.
Figure 25:
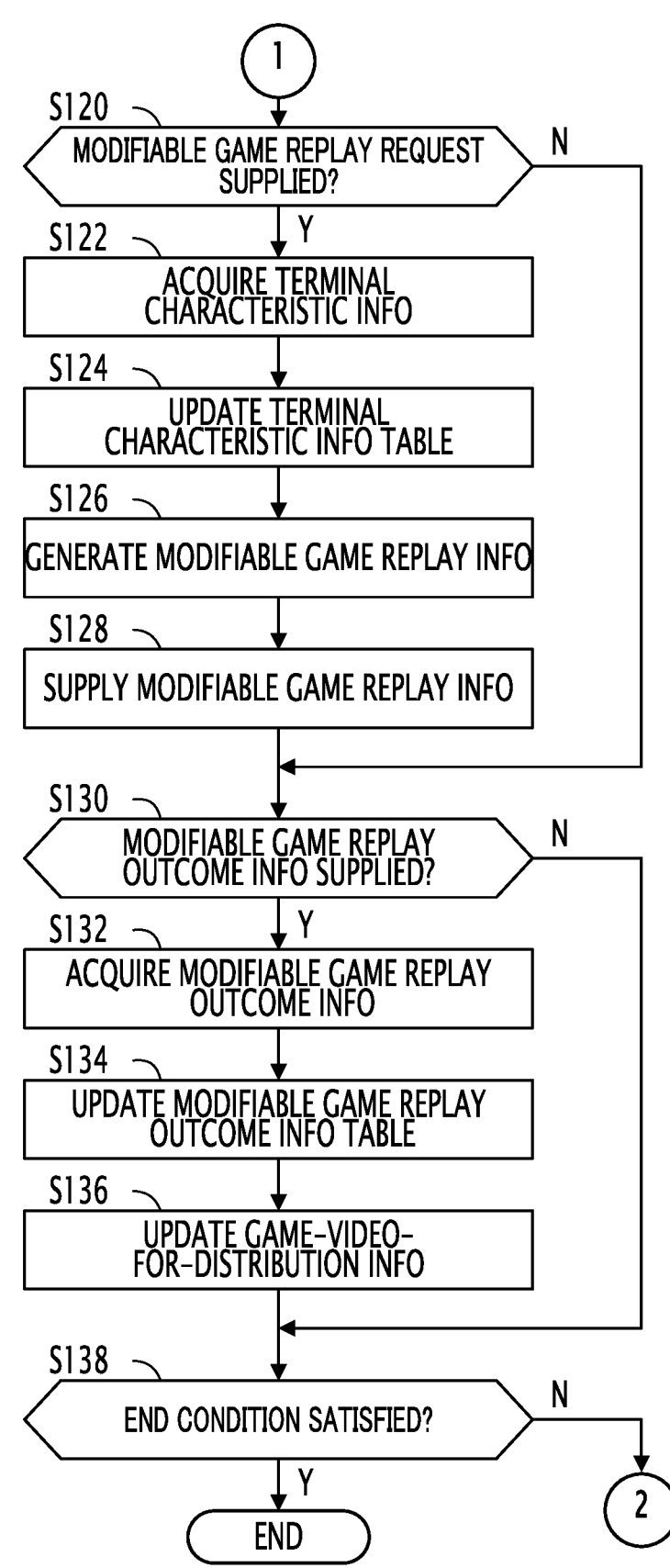
FIG. 25 is a flowchart showing an example operation of the video distribution server 50.

FIGS. 24 and 25 together are a flowchart illustrating an example operation of the video distribution server 50 performed in a case in which the match of the baseball video game is performed.

As illustrated in FIG. 24, based on the match of a baseball video game being started in the game apparatus 10-1 and the game apparatus 10-2, and game basic information JK-m being transmitted from the game apparatus 10-*m*, the modifiable replaying of a game information generator 512 acquires the game basic information JK-m (S100). Furthermore, based on the match of the baseball video game being started in the game apparatus 10-1 and the game apparatus 10-2, and the modifiable replaying programs PG-R [1] to PG-R [Q] being transmitted from the game apparatus 10-*m*, the modifiable replaying of a game information generator 512 acquires the modifiable replaying programs PG-R [1] to PG-R [Q] (S102).

Next, the video-for-distribution information generator 511 determines whether or not edited game video information JDE has been supplied from the video editing apparatus 30

(S104). If the determination result of step S104 is negative, the video-for-distribution information generator 511 advances the process to step S110. When the determination result of step S104 is affirmative, the video-for-distribution information generator 511 acquires the edited game video information JDE supplied at step S104 (S106).

Then, the video-for-distribution information generator 511 generates game-video-for-distribution information JDH based on the edited game video information JDE acquired at step S106 (S108). In the present embodiment, the game-video-for-distribution information JDH may include game time information indicating an elapsed time in the game from the start of the match of the baseball video game.

Furthermore, the modifiable replaying of a game information generator 512 determines whether or not game progression status information JG-m is supplied from the game apparatus 10-m (S110). If the determination result of step S110 is negative, the modifiable replaying of a game information generator 512 advances the process to step S120. When the determination result of step S110 is affirmative, the modifiable replaying of a game information generator 512 acquires the game progression status information JG-m supplied at step S110 (S112).

Next, the modifiable replaying of a game information generator 512 determines whether or not game status information J4 included in the game progression status information JG-m acquired at step S112 satisfies the modifiable replaying of a game condition (S114). If the determination result of step S114 is negative, the modifiable replaying of a game information generator 512 advances the process to step S120. If the determination result of step S114 is negative, the modifiable replaying of a game information generator 512 may discard the game progression status information JG-m acquired at step S112. When the determination result of step S114 is affirmative, the modifiable replaying of a game information generator 512 generates modifiable replaying of a game management information based on the game basic information JK-m acquired at step S100 and the game progression status information JG-m acquired at step S112, and stores the generated modifiable replaying of a game management information in the modifiable replaying of a game management information table TBL1 (S116).

As illustrated in FIG. 25, the modifiable replaying of a game information generator 512 determines whether or not a modifiable replaying of a game request Req is supplied from a terminal apparatus 70-n (S120). If the determination result of step S120 is negative, the modifiable replaying of a game information generator 512 advances the process to step S130. When the determination result of step S120 is affirmative, the modifiable replaying of a game information generator 512 acquires terminal characteristic information included in the modifiable replaying of a game request Req supplied at step S120 from the terminal apparatus 70-n (S122).

Next, the modifiable replaying of a game information generator 512 stores the terminal characteristic information acquired at step S122 in the terminal characteristic information table TBL2 (S124). Then, the modifiable replaying of a game information generator 512 generates modifiable replaying of a game information JGG based on the game basic information JK-m acquired at step S100, the game progression status information JG-m acquired at step S112, the modifiable replaying of a game management information generated at step S116, and the terminal characteristic information acquired at step S122 (S126). Specifically, at step S126, the modifiable replaying of a game information generator 512 selects, from among the modifiable replaying programs PG-R [1] to PG-R [Q], a modifiable replaying program PG-R [q] that corresponds to the terminal characteristic information acquired at step S122. Then, at step S126, the modifiable replaying of a game information generator 512 generates modifiable replaying of a game information JGG including the selected modifiable replaying program PG-R[q].

It is to be noted that, in the present embodiment, the modifiable replaying of a game information generator 512 generates the modifiable replaying of a game information JGG based on the terminal characteristic information, but the present invention is not limited thereto. For example, the modifiable replaying of a game information generator 512 may generate modifiable replaying of a game information JGG based on an operation of the user Ut of the terminal apparatus 70-n instead of the terminal characteristic information or in addition to the terminal characteristic information. For example, the user Ut of the terminal apparatus 70-n may be enabled to designate a modifiable replaying mode of the modifiable replaying of a game video DS by operating the input unit 74. Here, the modifiable replaying mode of the modifiable replaying of a game video DS includes, for example, one, some, or all of a modifiable replaying accuracy of the modifiable replaying of a game video DS, a processing load applied to the terminal apparatus 70-n by reproducing the modifiable replaying of a game video DS, and a communication load of the terminal apparatus 70-n by reproducing the modifiable replaying of a game video DS. In this case, based on the designated modifiable replaying mode of the modifiable replaying of a game video DS designated by the user Ut of the terminal apparatus 70-n, the modifiable replaying of a game information generator 512 may select a modifiable replaying program PG-R[q] that corresponds to the designated mode, from among the modifiable replaying programs PG-R[1] to PG-R[Q]. Then, the modifiable replaying of a game information generator 512 may generate modifiable replaying of a game information JGG including the selected modifiable replaying program PG-R[q].

Next, the modifiable replaying of a game information generator 512 supplies the modifiable replaying of a game information JGG generated at step S126 to the terminal apparatus 70-n, which has supplied the modifiable replaying of a game request Req at step S120 (S128). In the present embodiment, at step S128, the modifiable replaying of a game information generator 512 supplies the modifiable replaying of a game information JGG to the terminal apparatus 70-n so that the elapsed time indicated by the game time information included in the modifiable replaying of a game information JGG is shorter than the elapsed time indicated by the game time information included in the game-video-for-distribution information JDH. In other words, at step S128, the modifiable replaying of a game information generator 512 supplies the terminal apparatus 70-n with the modifiable replaying of a game information JGG so that browsing of the game video for distribution DH corresponding to the modifiable replaying of a game is allowed in the terminal apparatus 70-n, at or after the timing at which the modifiable replaying of a game based on the modifiable replaying of a game information JGG becomes executable in the terminal apparatus 70-n. Consequently, the user Ut of the terminal apparatus 70-n can perform a modifiable replaying of a game in the terminal apparatus 70-n before knowing how the game progresses in a part corresponding to the modifiable replaying of a game, of the progression content of the baseball video game executed in the game apparatus 10-*m*. This makes it possible for the user Ut of the terminal apparatus 70-*n* to play a modifiable replaying of a game in a manner close to the user Ug playing the baseball video game on the game apparatus 10-*m*, thereby enhancing the entertainment value of modifiable replaying of games.

Next, the video-for-distribution information generator 511 determines whether or not the modifiable replaying of a game outcome information JSG has been supplied from the terminal apparatus 70-*n* (S130). If the determination result of step S130 is negative, the video-for-distribution information generator 511 advances the process to step S138. When the determination result of step S130 is affirmative, the video-for-distribution information generator 511 acquires the modifiable replaying of a game outcome information JSG supplied from the terminal apparatus 70-*n* (S132).

Next, the video-for-distribution information generator 511 stores the modifiable replaying of a game outcome information JSG acquired at step S132 in the modifiable replaying of a game outcome information table TBL3 (S134). Then, the video-for-distribution information generator 511 generates a modifiable replaying of a game outcome image GK based on the modifiable replaying of a game outcome information JSG acquired at step S134, and incorporates the generated modifiable replaying of a game outcome image GK into the game-video-for-distribution information JDH, to be supplied to the terminal apparatus 70-*n* (S136).

Next, the controller 51 determines whether or not the match of the baseball video game is ended (S138). When the determination result of step S138 is negative, the controller 51 advances the process to step S104. When the determination result of step S138 is affirmative, the controller 51 ends the processes illustrated in FIGS. 24 and 25.

1.6. Summary of First Embodiment

As described above, the video distribution server 50 according to the present embodiment includes the modifiable replaying of a game information generator 512, which generates modifiable replaying of a game information JGG for enabling a modifiable replaying of a game in the terminal apparatus 70-*n*. Accordingly, in the present embodiment, in the terminal apparatus 70-*n*, the game video for distribution DH that is based on the game-video-for-distribution information JDH can be viewed. In addition, in the terminal apparatus 70-*n*, a modifiable replaying of a game of a match of a baseball video game being executed in the game apparatus 10-*m* can be performed based on the modifiable replaying of a game information JGG. Therefore, according to the present embodiment, the user Ut of the terminal apparatus 70-*n* can actually experience a match of a baseball video game being executed in the game apparatus 10-*m*. Thus, according to the present embodiment, compared with a form in which, in the terminal apparatus 70-*n*, it is only possible to view the game video for distribution DH and it is not possible to perform a modifiable replaying of a game of the baseball video game, the user Ut of the terminal apparatus 70-*n* can easily grasp the skill level of the user Ug who plays the baseball video game in the game apparatus 10-*m* and can easily grasp the difficulty of the baseball video game being executed in the game apparatus 10-*m*.

2. SECOND EMBODIMENT

In the following, a second embodiment of the present invention will be described. It is to be noted that, for elements for which actions and functions are the same as those of the first embodiment in each of the embodiments shown below, detailed descriptions of each element are omitted as appropriate by using the same reference signs as those used in the above description.

In the first embodiment, the modifiable replaying of a game information JGG is generated in a video distribution server. The second embodiment is different from the first embodiment in that the modifiable replaying of a game information JGG is generated in a game apparatus.

Figure 26:
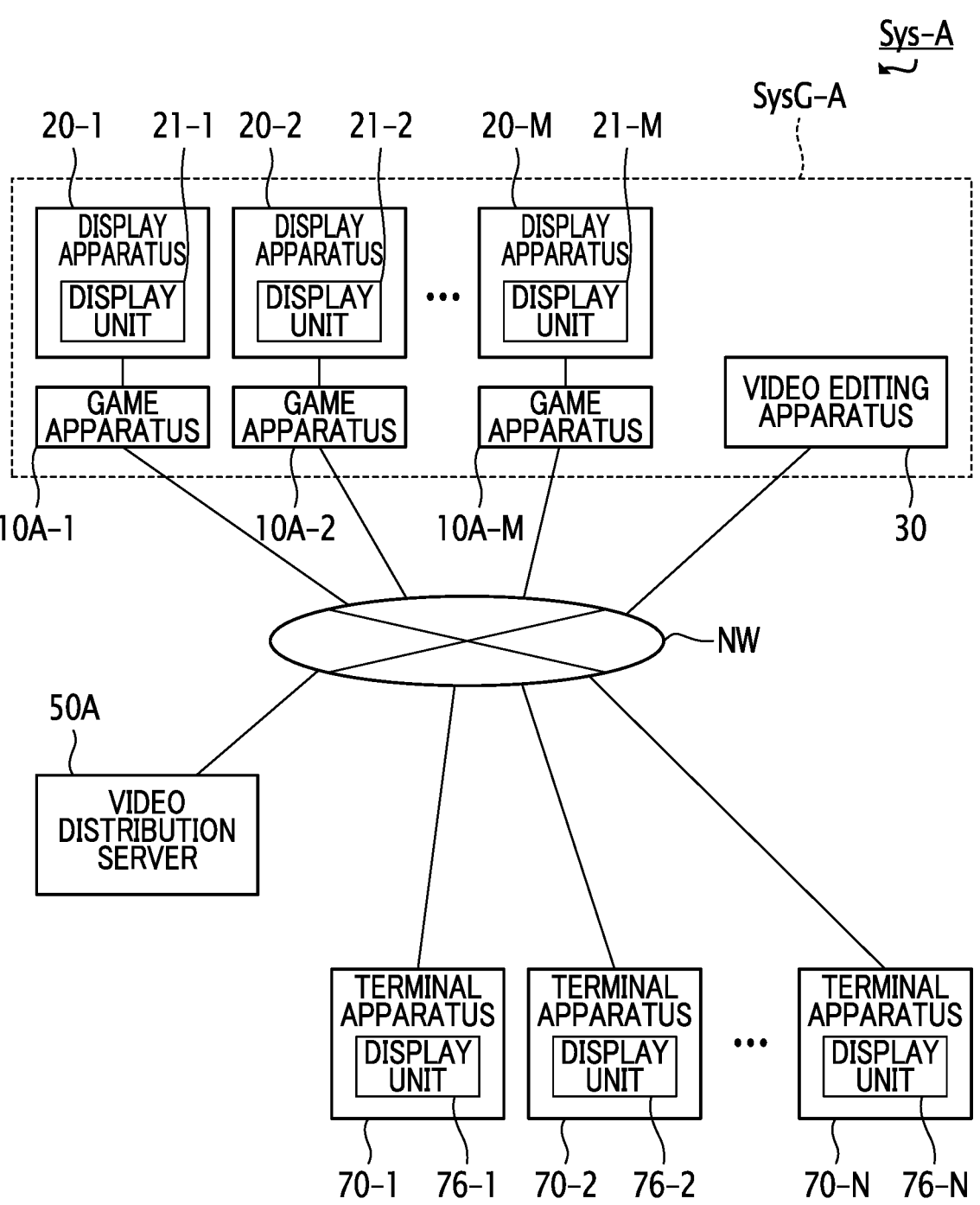
FIG. 26 is an explanatory diagram of an information processing system Sys-A according to a second embodiment of the present invention.

FIG. 26 is an explanatory diagram for explaining an example overview of an information processing system Sys-A according to the second embodiment.

As illustrated in FIG. 26, the information processing system Sys-A is configured in substantially the same manner as the information processing system Sys according to the first embodiment, except that a game system SysG-A is provided in place of the game system SysG and that a video distribution server 50A is provided in place of the video distribution server 50. The game system SysG-A is configured in substantially the same manner as the game system SysG according to the first embodiment, except that a game apparatus 10A is provided in place of the game apparatus 10.

Figure 27:
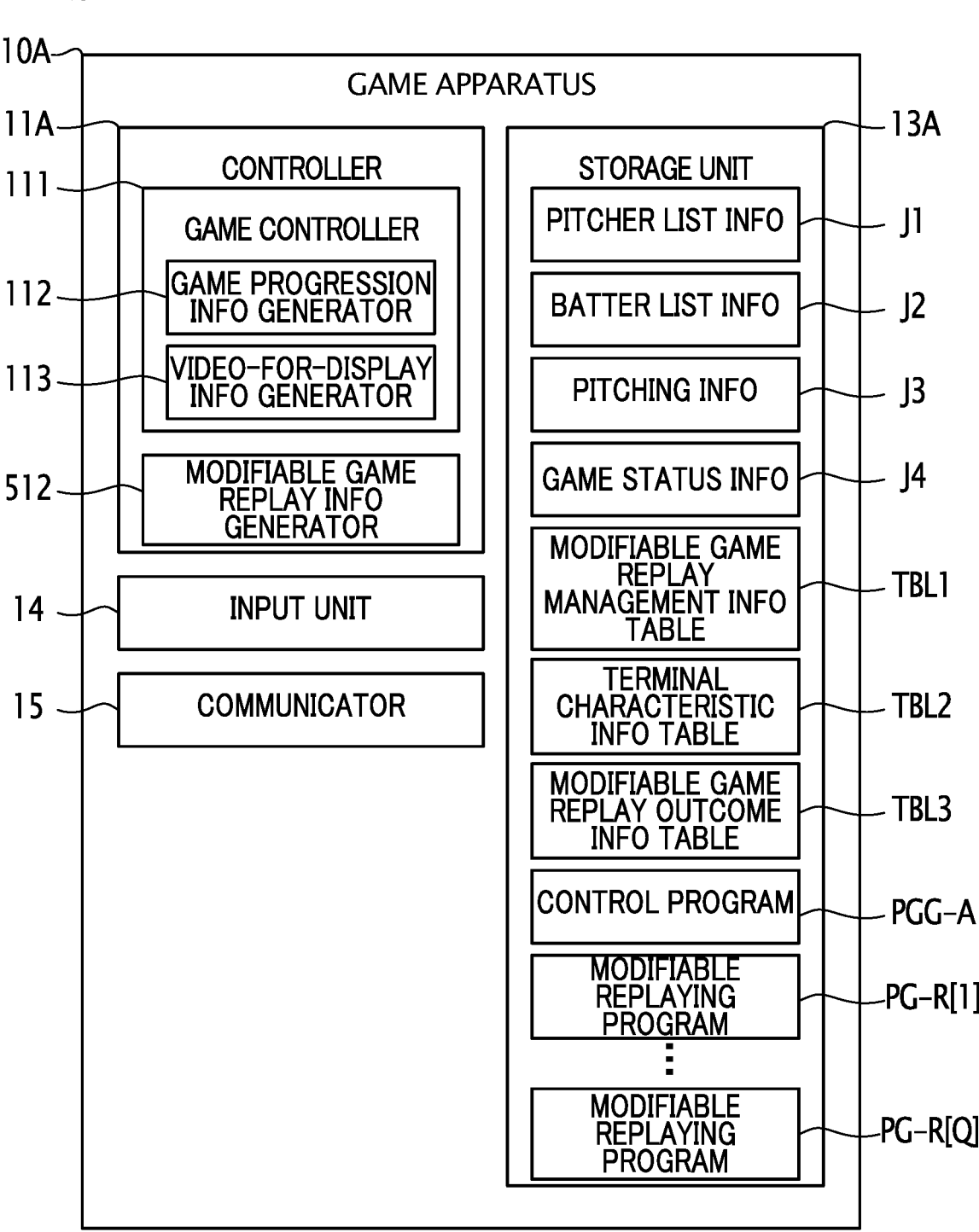
FIG. 27 is a block diagram showing an example configuration of a game apparatus 10A.

FIG. 27 is a functional block diagram illustrating an example configuration of the game apparatus 10A.

As illustrated in FIG. 27, the game apparatus 10A is configured in substantially the same manner as the game apparatus 10 according to the first embodiment, except that a controller 11A is provided in place of the controller 11 and that a storage unit 13A is provided in place of the storage unit 13. The controller 11A is configured in substantially the same manner as the controller 11 according to the first embodiment, except that the controller 11A includes a modifiable replaying of a game information generator 512. The storage unit 13A is configured in substantially the same manner as the storage unit 13 according to the first embodiment, except that the modifiable replaying of a game management information table TBL1, the terminal characteristic information table TBL2, and the modifiable replaying of a game outcome information table TBL3 are stored, and that a control program PGG-A is stored instead of the control program PGG.

In the present embodiment, the processor 1001 executes the control program PGG-A stored in the storage device 1003 and operates in accordance with the control program PGG-A, thereby functioning as a controller 11A.

As described above, in the present embodiment, the controller 11A provided in the game apparatus 10A includes the modifiable replaying of a game information generator 512 in addition to the game progression information generator 112 and the video-for-display information generator 113. Furthermore, in the present embodiment, the storage unit 13A provided in the game apparatus 10A stores the modifiable replaying of a game management information table TBL1. Therefore, according to the present embodiment, the modifiable replaying of a game information generator 512 provided in the game apparatus 10A is able to generate modifiable replaying of a game information JGG on the bases of (i) the pitcher list information J1 and the batter list information J2 stored in the storage unit 13A, (ii) the pitching information J3 based on the game progression information JS generated by the game progression information generator 112, and (iii) the modifiable replaying of a game management information stored in the modifiable replaying of a game management information table TBL1.

Figure 28:
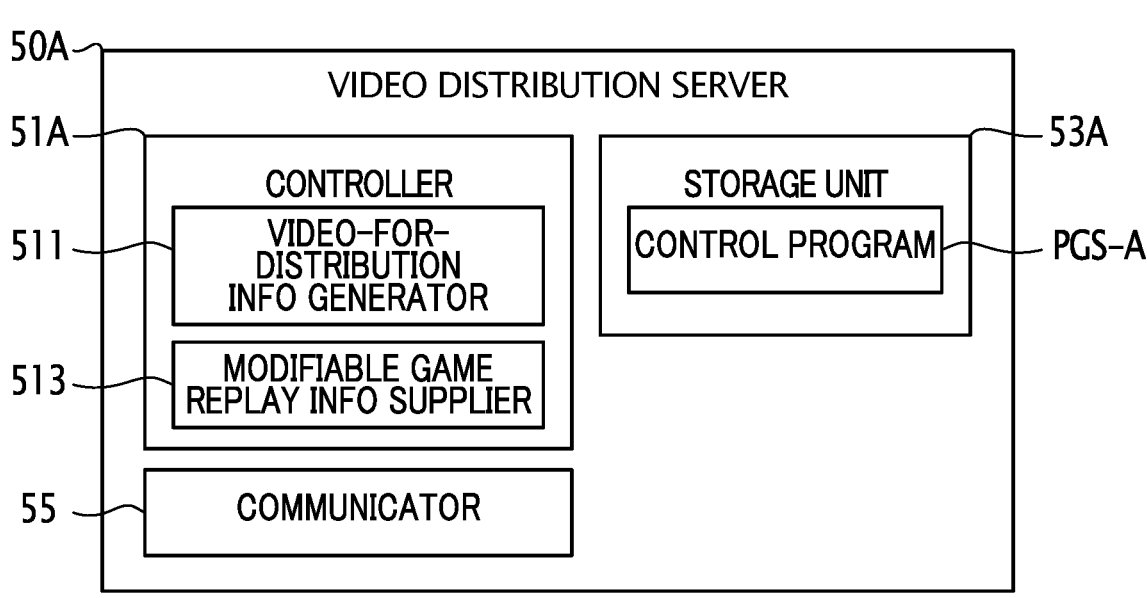
FIG. 28 is a block diagram showing an example configuration of a video distribution server 50A.

FIG. 28 is a functional block diagram illustrating an example configuration of the video distribution server 50A.

As illustrated in FIG. 28, the video distribution server 50A is configured in substantially the same manner as the video distribution server 50 according to the first embodiment, except that a controller 51A is provided in place of the controller 51 and a storage unit 53A is provided in place of the storage unit 53. The controller 51A is configured in substantially the same manner as the controller 51 according to the first embodiment, except that a modifiable replaying of a game information supplier (modifiable game replay information supplier) 513 is provided in place of the modifiable replaying of a game information generator 512. The modifiable replaying of a game information supplier 513 (an example of "supplier") acquires modifiable replaying of a game information JGG generated in the game apparatus 10A, and supplies the acquired modifiable replaying of a game information JGG to the terminal apparatus 70-*n*. The storage unit 53A is configured similarly to the storage unit 53 according to the first embodiment, except that a control program PGS-A is stored instead of the pitcher list information J1, the batter list information J2, the modifiable replaying of a game management information table TBL1, the terminal characteristic information table TBL2, the modifiable replaying of a game outcome information table TBL3, the control program PGS, and the modifiable replaying programs PG-R [1] to PG-R [Q].

In the present embodiment, the processor 5001 executes the control program PGS-A stored in the storage device 5003 and operates in accordance with the control program PGS-A, thereby functioning as the controller 51A.

Figure 29:
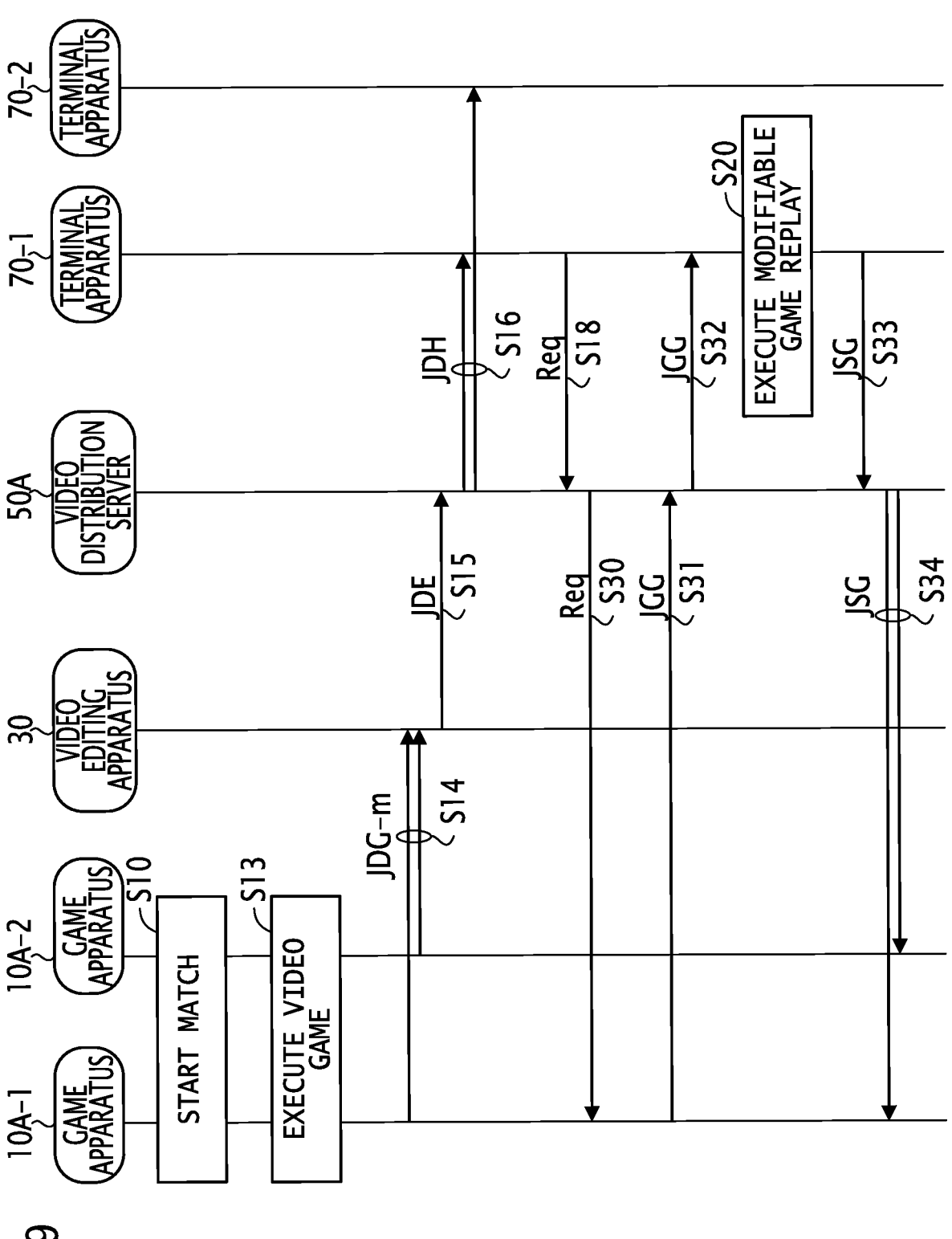
FIG. 29 is a sequence chart showing an example overview of an operation of the information processing system Sys-A.

FIG. 29 is a sequence chart for explaining an overview operation of the information processing system Sys-A according to the present embodiment. FIG. 29 illustrates operation of the information processing system Sys-A performed in a case in which the user Ug-1 of the game apparatus 10A-1 and the user Ug-2 of the game apparatus 10A-2 play a match of a baseball video game.

As illustrated in FIG. 29, in playing the match of the baseball video game, each game apparatus 10A-m executes a game match start process (S10). Next, the game apparatus 10A-m executes the baseball video game and causes the match of the baseball video game to progress (S13). Specifically, the game progression information generator 112 provided in the game apparatus 10A-m generates game progression information JS based on operation information JM. Next, the game apparatus 10A-m generates game-video-for-display information JDG-m based on the game progression information JS, and supplies the generated game-video-for-display information JDG-m to the video editing apparatus 30 (S14). Then, the video editing apparatus 30 generates edited game video information JDE based on the game-video-for-display information JDG-m, and supplies the generated edited game video information JDE to the video distribution server 50A (S15). Next, the video distribution server 50A generates game-video-for-distribution information JDH based on the edited game video information JDE, and supplies the generated game-video-for-distribution information JDH to the terminal apparatus 70 (S16).

Then, in a case in which the terminal apparatus 70-*n* transmits a modifiable replaying of a game request Req based on an operation by the user Ut-n of the terminal apparatus 70-*n*, to the video distribution server 50A (S18), the video distribution server 50A supplies the modifiable replaying of a game request Req acquired from the terminal apparatus 70-*n* to the game apparatus 10A-m (S30). Also in the present embodiment, it is assumed that the modifiable replaying of a game request Req includes terminal characteristic information.

Next, when the game apparatus 10A-m receives the modifiable replaying of a game request Req from the video distribution server 50A, the game apparatus 10A-m supplies modifiable replaying of a game information JGG to the video distribution server 50A (S31). Specifically, at step S31, the game progression information generator 112 provided in the game apparatus 10A-m first generates pitching information J3 and game status information J4 based on the game progression information JS generated at step S13. Next, the modifiable replaying of a game information generator 512 provided in the game apparatus 10A-m generates modifiable replaying of a game management information based on the pitching information J3 and the game status information J4. Then, the modifiable replaying of a game information generator 512 provided in the game apparatus 10A-m generates modifiable replaying of a game information JGG based on the pitcher list information J1, the batter list information J2, the pitching information J3, the modifiable replaying of a game management information, and the modifiable replaying program PG-R[q], and supplies the generated modifiable replaying of a game information JGG to the video distribution server 50A.

Next, the video distribution server 50A acquires the modifiable replaying of a game information JGG from the game apparatus 10A-m, and supplies the acquired modifiable replaying of a game information JGG to the terminal apparatus 70-*n* (S32). Then, the terminal apparatus 70-*n* executes a modifiable replaying of a game based on the modifiable replaying of a game information JGG (S20).

Next, the terminal apparatus 70-*n* supplies modifiable replaying of a game outcome information JSG to the video distribution server 50A (S33). Then, the video distribution server 50A acquires the modifiable replaying of a game outcome information JSG from the terminal apparatus 70-*n*, and supplies the acquired modifiable replaying of a game outcome information JSG to the game apparatus 10A-m (S34). In the present embodiment, the game progression information generator 112 generates a modifiable replaying of a game outcome image GK based on the modifiable replaying of a game outcome information JSG, and incorporates the generated modifiable replaying of a game outcome image GK into a game video for display DG-m. Thereafter, the information processing system Sys-A repeatedly executes the steps S14 to S16, S18, S20, and S30 to S34, until the match of the baseball video game ends.

As described above, the game apparatus 10A-m according to the present embodiment includes the modifiable replaying of a game information generator 512, which generates modifiable replaying of a game information JGG for enabling a modifiable replaying of a game in the terminal apparatus 70-*n*. Therefore, according to the present embodiment, compared with a form in which the terminal apparatus 70-*n* only allows viewing of the game video for distribution DH and does not allow a modifiable replaying of a game of the baseball video game, the user Ut of the terminal apparatus 70-*n* can easily grasp the skill level of the user Ug who plays the baseball video game in the game apparatus 10-*m* and can easily grasp the difficulty of the baseball video game being executed in the game apparatus 10-*m*.

3. THIRD EMBODIMENT

In the following, a third embodiment of the present invention will be described.

In the first embodiment, in order to enable the modifiable replaying of a game to be executed in the terminal apparatus, the game apparatus supplies the modifiable replaying of a game information JGG to the terminal apparatus. The third embodiment is different from the first embodiment in that the game apparatus supplies the game progression information JS to the terminal apparatus, to enable the modifiable replaying of a game to be executed in the terminal apparatus.

Figure 30:
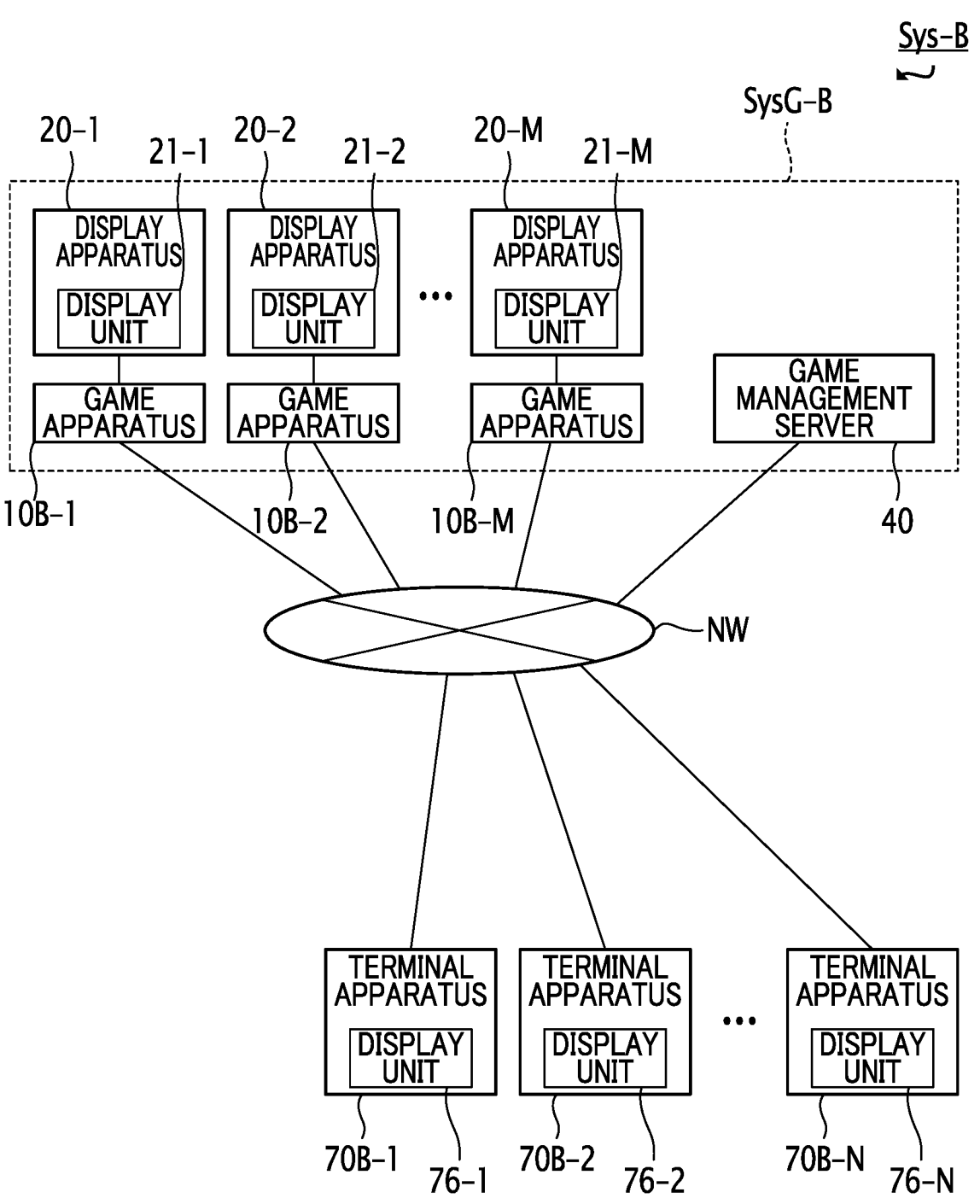
FIG. 30 is an explanatory diagram illustrating an example overview of an information processing system Sys-B according to a third embodiment of the present invention.

FIG. 30 is an explanatory diagram for explaining an example overview of an information processing system Sys-B according to the third embodiment.

As illustrated in FIG. 30, the information processing system Sys-B is configured in substantially the same manner as the information processing system Sys according to the first embodiment, except that a game system SysG-B is provided in place of the game system SysG, that a terminal apparatus 70B is provided in place of the terminal apparatus 70, and that a video distribution server 50 is not provided. The game system SysG-B is configured in substantially the same manner as the game system SysG according to the first embodiment, except that a game apparatus 10B is provided in place of the game apparatus 10 and a game management server 40 is provided instead of the video editing apparatus 30.

Figure 31:
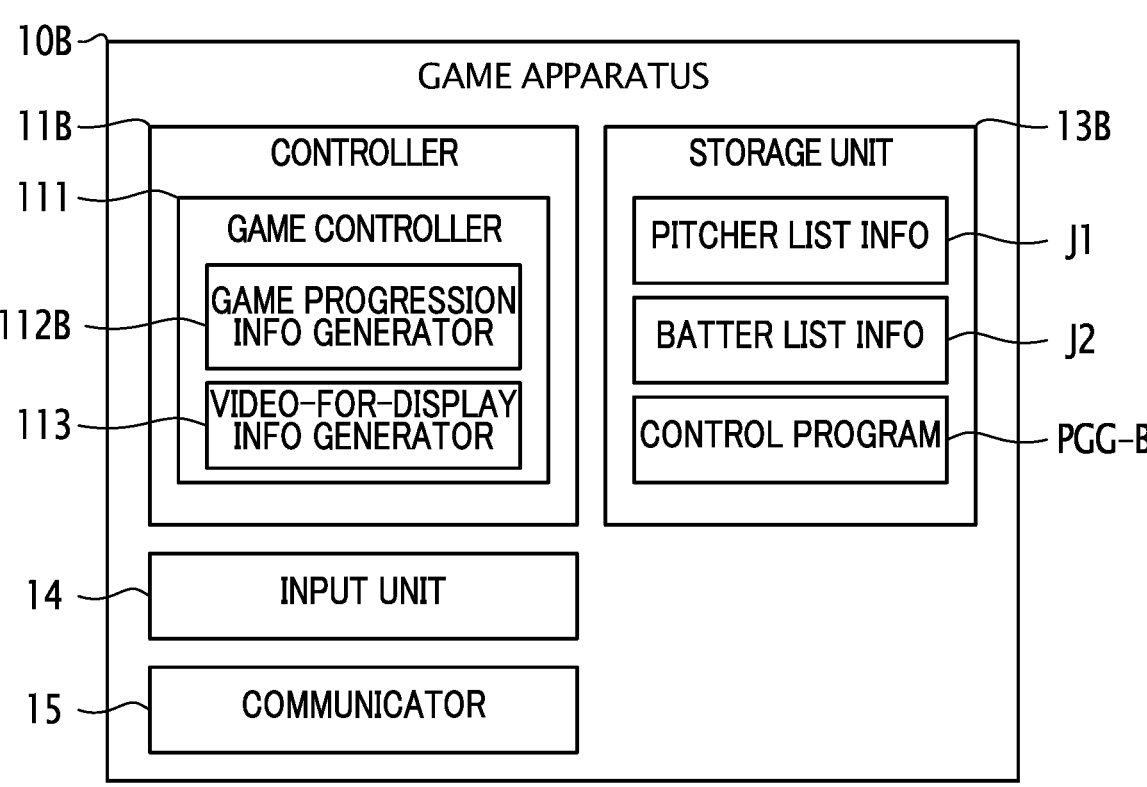
FIG. 31 is a block diagram showing an example configuration of a game apparatus 10B.

FIG. 31 is a functional block diagram illustrating an example configuration of the game apparatus 10B.

As illustrated in FIG. 31, the game apparatus 10B is configured in substantially the same manner as the game apparatus 10 according to the first embodiment, except that a controller 11B is provided in place of the controller 11 and that a storage unit 13B is provided in place of the storage unit 13. The controller 11B is configured in substantially the same manner as the controller 11 according to the first embodiment, except that a game progression information generator 112B is provided in place of the game progression information generator 112. The game progression information generator 112B functions in a manner similar to that of the game progression information generator 112, except that the game progression information generator 112B has no function of generating the pitching information J3 or the game status information J4. As will be described later in detail, the game progression information generator 112B generates game progression information JS based on operation information JM, and supplies the generated game progression information JS to the terminal apparatus 70B via the game management server 40. The storage unit 13B is configured in substantially the same manner as the storage unit 13 according to the first embodiment, except that a control program PGG-B is stored in place of the control program PGG, and that the pitching information J3, the game status information J4, or the modifiable replaying programs PG-R [1] to PG-R [Q] are not stored.

In the present embodiment, the processor 1001 executes the control program PGG-B stored in the storage device 1003 and operates in accordance with the control program PGG-B, thereby functioning as the controller 11B.

Figure 32:
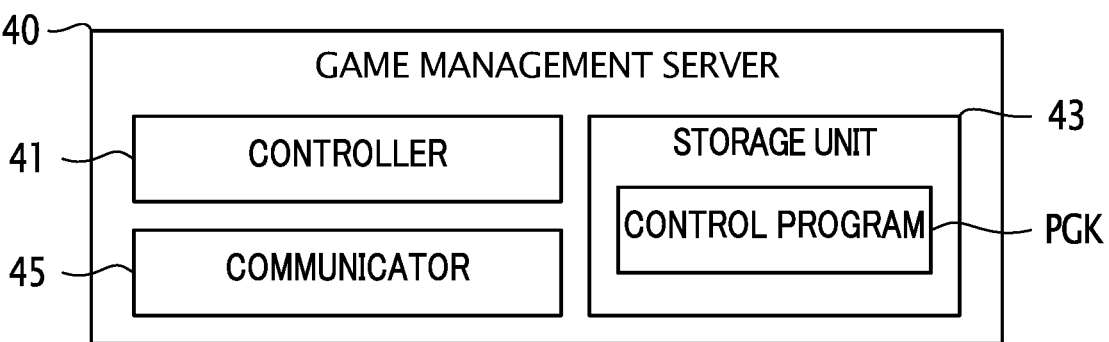
FIG. 32 is a block diagram illustrating an example configuration of a game management server 40.

FIG. 32 is a functional block diagram illustrating an example configuration of the game management server 40.

As illustrated in FIG. 32, the game management server 40 includes a controller 41 that controls each unit of the game management server 40, a storage unit 43 that stores various types of information, such as a control program PGK for controlling each unit of the game management server 40, and a communicator 45 that communicates with an external apparatus external to the game management server 40. The controller 41 acquires game progression information JS from the game apparatus 10B and supplies the acquired game progression information JS to the terminal apparatus 70B.

FIG. 33 is a configuration diagram illustrating an example hardware configuration of the game management server 40.

As illustrated in FIG. 33, the game management server 40 includes a processor 4001 that controls each unit of the game management server 40, a storage device 4003 that stores various types of information, and a communication device 4005 that communicates with an external apparatus external to the game management server 40. The storage device 4003 includes one or both of a volatile memory, such as a RAM that functions as a work area of the processor 4001, and a nonvolatile memory, such as an EEPROM that stores various types of information (e.g., a control program PGK), and provides a function as the storage unit 43. The processor 4001 includes, for example, one or more CPUs. The processor 4001 executes the control program PGK stored in the storage device 4003 and operates in accordance with the control program PGK, thereby functioning as the controller 41. The communication device 4005 is hardware for communicating with an external apparatus external to the game management server 40 via one or both of a wired network and a wireless network, and provides a function as the communicator 45.

FIG. 34 is a functional block diagram illustrating an example configuration of the terminal apparatus 70B.

As illustrated in FIG. 34, the terminal apparatus 70B is configured in substantially the same manner as the terminal apparatus 70 according to the first embodiment, except that a controller 71B is provided in place of the controller 71 and that a storage unit 73B is provided in place of the storage unit 73.

The controller 71B is configured in substantially the same manner as the controller 71 according to the first embodiment, except that the controller 71B includes a game progression information generator 112, that the controller 71B includes a video-for-display information generator 113, that the controller 71B includes a modifiable replaying of a game information generator (modifiable game replay information generator) 512B, and that the controller 71B includes a modifiable replaying of a game executor (modifiable game replay executor) 712B instead of the modifiable replaying of a game executor 712, and that the controller 71B does not include the game-video-for-distribution reproducer 711. It is to be noted that the modifiable replaying of a game information generator 512B functions in substantially the same manner as the modifiable replaying of a game information generator 512 according to the first embodiment, except that modifiable replaying of a game information JGG-B (to be described later) is generated instead of the modifiable replaying of a game information JGG. The modifiable replaying of a game executor 712B functions in substantially the same manner as the modifiable replaying of a game executor 712 according to the first embodiment, except that the modifiable replaying of a game is executed based on the modifiable replaying of a game information (modifiable game replay information) JGG-B instead of the modifiable replaying of a game information JGG.

Furthermore, the storage unit 73B is configured in substantially the same manner as the storage unit 73 according to the first embodiment, except that the storage unit 73B stores the pitcher list information J1, the batter list information J2, the pitching information J3, the game status information J4, the modifiable replaying of a game information JGG-B, and the modifiable replaying of a game management information table TBL1, that the storage unit 73B stores a control program PGT-B in place of the control program PGT, and that the storage unit 73B does not store the modifiable replaying program PG-R[q]. Here, the modifiable replaying of a game information JGG-B has the same data configuration as that of the modifiable replaying of a game information JGG according to the first embodiment, except that the modifiable replaying of a game information JGG-B does not include the modifiable replaying program PG-R[q].

In the present embodiment, the processor 7001 executes the control program PGT-B stored in the storage device 7003 and operates in accordance with the control program PGT-B, thereby functioning as the controller 71B.

As described above, in the present embodiment, the controller 71B provided in the terminal apparatus 70B includes the modifiable replaying of a game information generator 512B and the modifiable replaying of a game executor 712B. In the present embodiment, the modifiable replaying of a game information generator 512B generates modifiable replaying of a game information JGG-B based on game progression information JS. Furthermore, in the present embodiment, the modifiable replaying of a game executor 712B executes a modifiable replaying of a game based on the modifiable replaying of a game information JGG-B.

Figure 35:
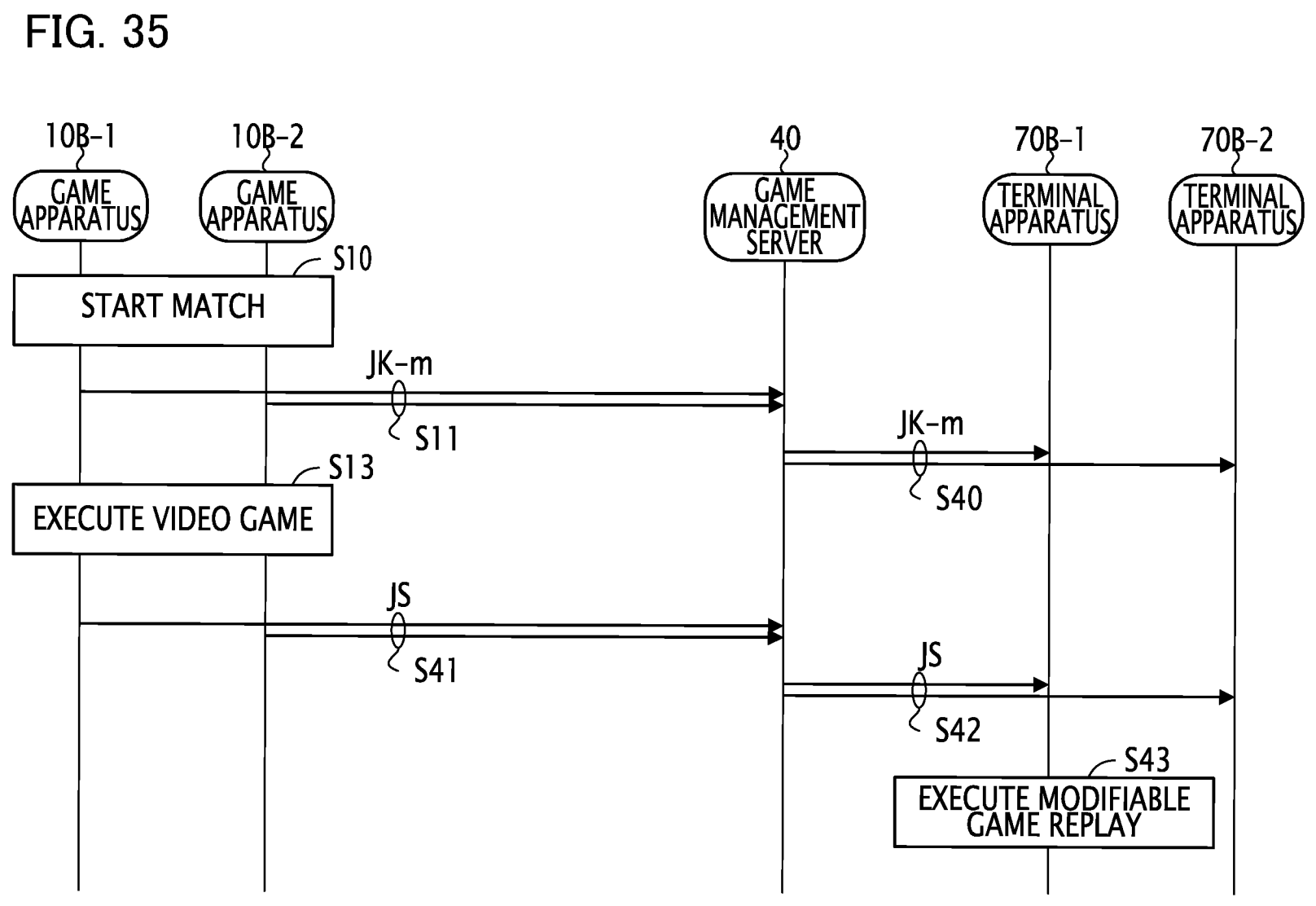

FIG. 35 is a sequence chart for explaining an overview operation of the information processing system Sys-B according to the present embodiment. FIG. 35 illustrates an operation of the information processing system Sys-B performed in a case in which the user Ug-1 of the game apparatus 10A-1 and the user Ug-2 of the game apparatus 10A-2 play a match of a baseball video game.

As illustrated in FIG. 35, in playing of a match of a baseball video game, the game apparatus 10B-m executes a game match start process (S10). Next, the game apparatus 10B-m supplies the game basic information JK-m to the game management server 40 (S11). Next, the game management server 40 supplies the game basic information JK-m acquired from the game apparatus 10B-m to the terminal apparatus 70B (S40).

Next, the game apparatus 10B-m executes the baseball video game and causes the match of the baseball video game to progress (S13). Specifically, the game progression information generator 112B (an example of "game executor") included in the controller 11B provided in the game apparatus 10B-m generates game progression information JS based on operation information M. Then, the game apparatus 10B-m supplies the game progression information JS to the game management server 40 (S41). The controller 11B provided in the game apparatus 10B-m functions as an "information outputter" by performing the process of step S41. Next, the game management server 40 supplies the game progression information JS acquired from the game apparatus 10B-m to the terminal apparatus 70B (S42).

Then, the terminal apparatus 70B generates game-video-for-distribution information JDH based on the game progression information JS acquired from the game management server 40, and executes a modifiable replaying of a game (S43). Specifically, at step S43, the video-for-display information generator 113 provided in the terminal apparatus 70B generates game-video-for-display information JDG based on the game progression information JS, and causes the display unit 76 to display a game video for display DG. It is to be noted that, in the present embodiment, the video-for-display information generator 113 provided in the terminal apparatus 70B causes a modifiable replaying of a game request button BP to be displayed in game video for display DG.

Furthermore, at step S43, the modifiable replaying of a game information generator 512B provided in the terminal apparatus 70B generates pitching information J3 and game status information J4 based on the game progression information JS. Next, the modifiable replaying of a game information generator 512B provided in the terminal apparatus 70B generates modifiable replaying of a game management information based on the pitching information J3 and the game status information J4. Next, the modifiable replaying of a game information generator 512B provided in the terminal apparatus 70B generates modifiable replaying of a game information JGG-B based on the pitcher list information J1, the batter list information J2, the pitching information J3, and the modifiable replaying of a game management information. Then, in response to a press of the modifiable replaying of a game request button BP by the user Ut of the terminal apparatus 70B, the modifiable replaying of a game executor 712B provided in the terminal apparatus 70B executes a modifiable replaying of a game based on the modifiable replaying of a game information JGG-B.

As described above, the terminal apparatus 70B according to the present embodiment includes the modifiable replaying of a game information generator 512B, which generates the modifiable replaying of a game information JGG-B for enabling a modifiable replaying of a game in the terminal apparatus 70B. Therefore, according to the present embodiment, compared with a form that only allows viewing of the game video for distribution DH but disallows a modifiable replaying of a game of the baseball video game in the terminal apparatus 70B, the user Ut of the terminal apparatus 70B can easily grasp the skill level of the user Ug who plays the baseball video game in the game apparatus 10B and can easily grasp the difficulty of the baseball video game being executed in the game apparatus 10B.

4. MODIFICATIONS

The above embodiments may be variously modified. Specific variations are exemplified below. Two or more aspects freely selected from the following examples may be combined as appropriate to the extent that they do not conflict with each other. For elements for which actions and functions are the same as those of the embodiment in the modifications shown below, detailed descriptions of each element are omitted as appropriate by using the same reference signs as those used in the above description.

Modification 1

In the first to third embodiments described above, a single modifiable replaying of a game request button BP corresponding to a single modifiable replaying of a game is displayed in the game video for distribution DH or in the game video for display DG, but the present invention is not limited thereto. For example, a plurality of modifiable replaying of a game request buttons BP corresponding to a plurality of modifiable replaying of games may be displayed in the game video for distribution DH or in the game video for display DG. In this case, the user Ut of the terminal apparatus 70 (or the terminal apparatus 70B) may be able to execute one modifiable replaying of a game from among the plurality of modifiable replaying of games by selecting one modifiable replaying of a game request button BP from among the plurality of modifiable replaying of a game request buttons BP.

Figure 36:
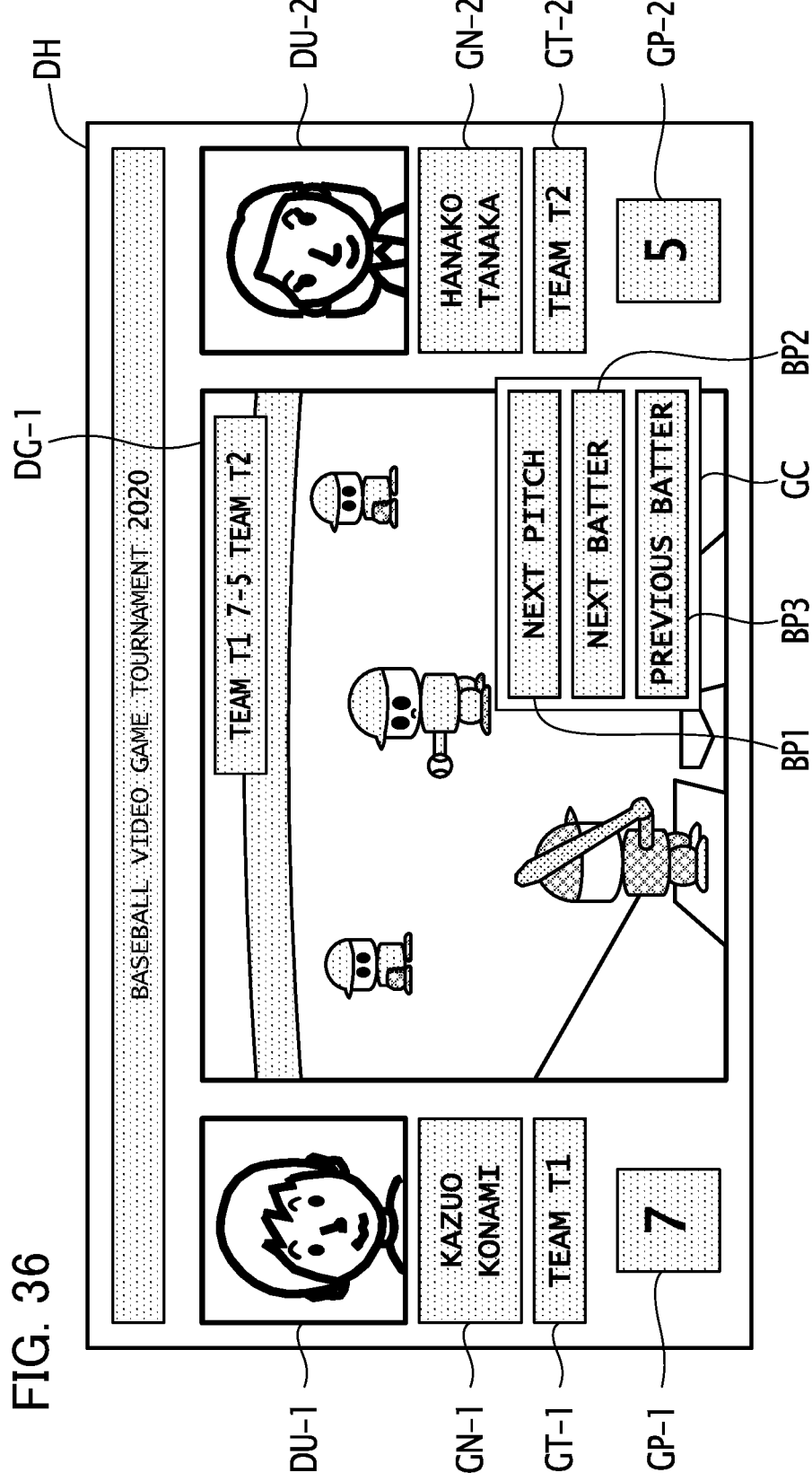
FIG. 36 is an explanatory view showing an example overview of a game video for distribution DH according to Modification 1.

FIG. 36 is an explanatory diagram for describing an example overview of the game video for distribution DH according to the present modification.

As illustrated in FIG. 36, in the present modification, a modifiable replaying of a game selection image GC including a plurality of modifiable replaying of a game request buttons BP (BP1 to BP3) is displayed in the game video for distribution DH. The user Ut of the terminal apparatus 70 (or the terminal apparatus 70B) can select, by selecting one modifiable replaying of a game request button BP from the plurality of modifiable replaying of a game request buttons BP included in the modifiable replaying of a game selection image GC, one modifiable replaying of a game that can be executed in the terminal apparatus 70 (or the terminal apparatus 70B) from among a plurality of modifiable replaying of games corresponding to the plurality of modifiable replaying of a game request buttons BP.

It is to be noted that, in the present modification, an example is given of a case in which the modifiable replaying of a game selection image GC is displayed in the game video for distribution DH, but the present invention is not limited thereto. The modifiable replaying of a game selection image GC may be displayed in the game video for display DG or may be displayed in the edited game video DE. Furthermore, in the present modification, an example is given of a case in which the user Ut of the terminal apparatus 70 (or the terminal apparatus 70B) selects one modifiable replaying of a game request button BP from among the plurality of modifiable replaying of a game request buttons BP included in the modifiable replaying of a game selection image GC displayed in the game video for distribution DH, but the present invention is not limited thereto. For example, the user Ug of the game apparatus 10 (or the game apparatus 10A or the game apparatus 10B) may select one modifiable replaying of a game request button BP from among the plurality of modifiable replaying of a game request buttons BP included in the modifiable replaying of a game selection image GC displayed in the game video for display DG. Furthermore, for example, a human operator of the video editing apparatus 30 may select one modifiable replaying of a game request button BP from among the plurality of modifiable replaying of a game request buttons BP included in the modifiable replaying of a game selection image GC displayed in the edited game video DE.

Figure 37:
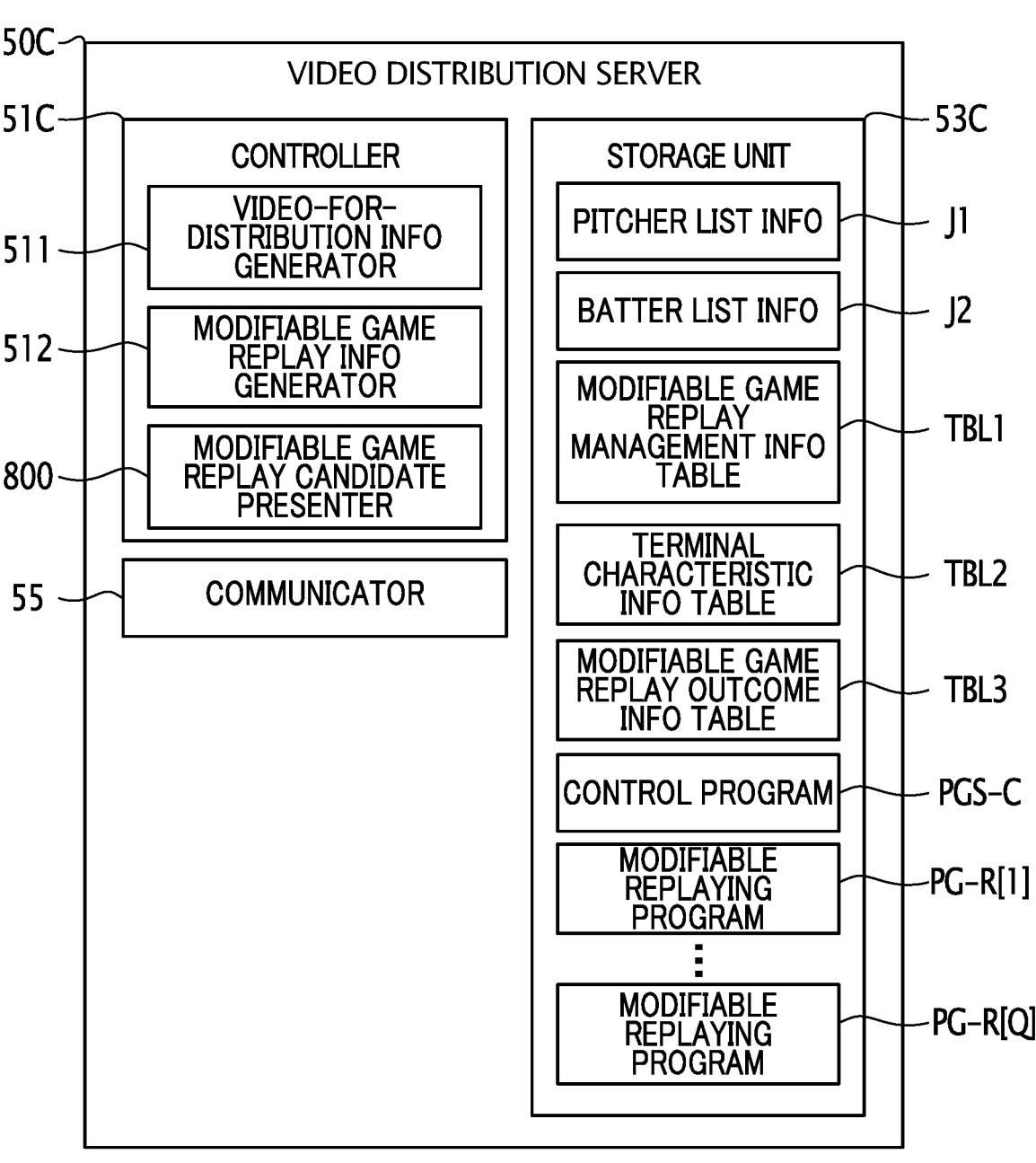
FIG. 37 is a block diagram showing an example configuration of a video distribution server 50C.

FIG. 37 is a functional block diagram illustrating an example configuration of a video distribution server 50C according to a first mode of the present modification. The video distribution server 50C is provided in place of the video distribution server 50 in the information processing system Sys according to the first embodiment.

As illustrated in FIG. 37, the video distribution server 50C is configured in substantially the same manner as the video distribution server 50 according to the first embodiment, except that a controller 51C is provided in place of the controller 51 and that a storage unit 53C is provided in place of the storage unit 53. The controller 51C is configured in substantially the same manner as the controller 51 according to the first embodiment, except that controller 51C includes a modifiable replaying of a game candidate presenter (modifiable game replay candidate presenter) 800. The modifiable replaying of a game candidate presenter 800 (an example of "presenter") selects two or more modifiable replaying target pitches from among a plurality of modifiable replaying target pitches corresponding to a plurality of records stored in the modifiable replaying of a game management information table TBL1, and generates information indicative of two or more modifiable replaying of a game request buttons BP corresponding one-to-one to the selected two or more modifiable replaying target pitches. Then, the video-for-distribution information generator 511 generates game-video-for-distribution information JDH indicating a game video for distribution DH in which a modifiable replaying of a game selection image GC is incorporated, based on the information indicative of the two or more modifiable replaying of a game request buttons BP generated by the modifiable replaying of a game candidate presenter 800. The storage unit 53C is configured in substantially the same manner as the storage unit 53 according to the first embodiment, except that a control program PGS-C is stored in place of the control program PGS.

In this embodiment, the processor 5001 executes the control program PGS-C stored in the storage device 5003 and operates in accordance with the control program PGS-C, thereby functioning as the controller 51C.

Figure 38:
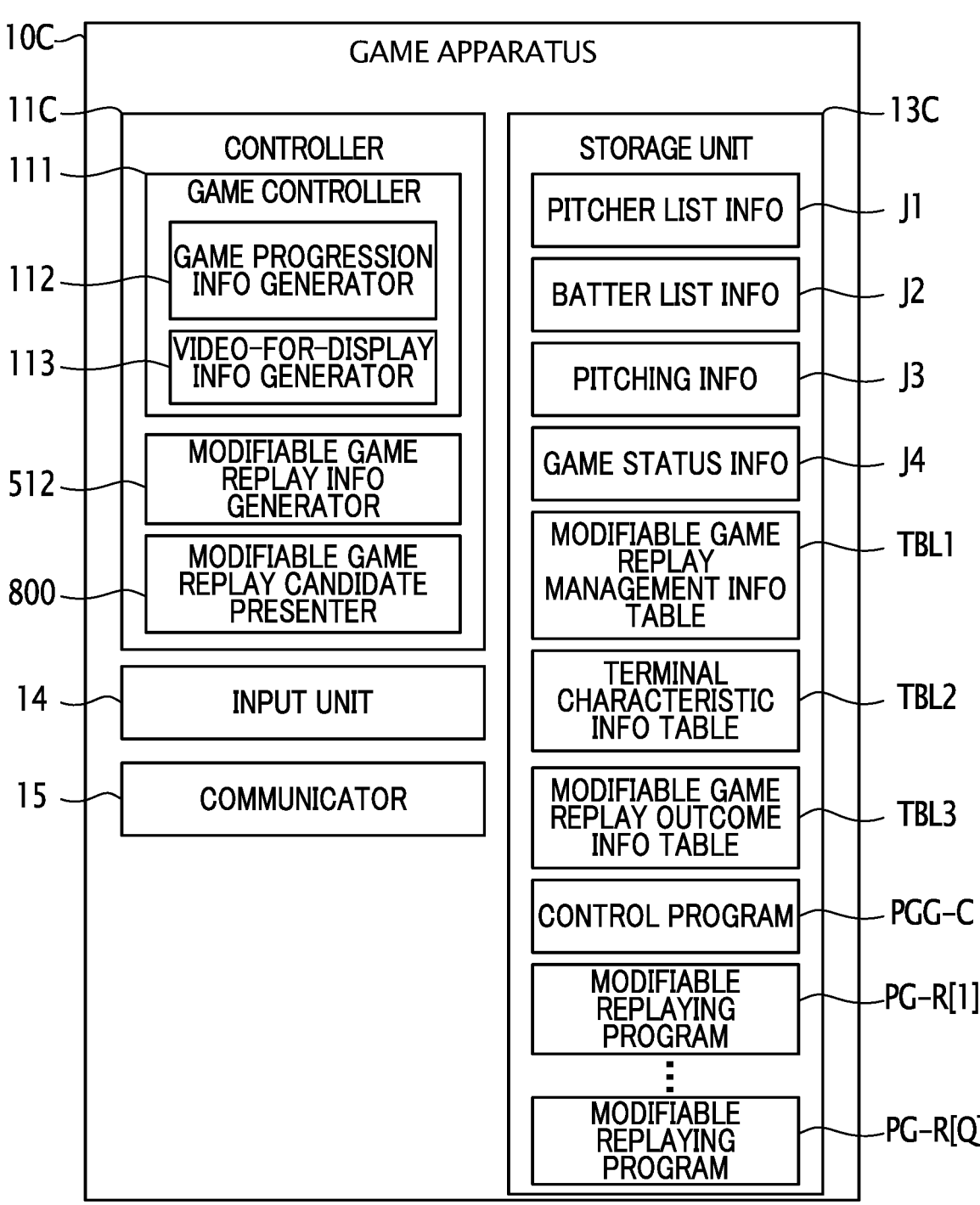
FIG. 38 is a block diagram showing an example configuration of a game apparatus 10C.

FIG. 38 is a functional block diagram illustrating an example configuration of a game apparatus 10C according to a second mode of the present modification. It is to be noted that the game apparatus 10C is provided in place of the game apparatus 10A in the information processing system Sys-A according to the second embodiment.

As illustrated in FIG. 38, the game apparatus 10C is configured in substantially the same manner as the game apparatus 10A according to the second embodiment, except that a controller 11C is provided in place of the controller 11A and that a storage unit 13C is provided in place of the storage unit 13A. The controller 11C is configured in substantially the same manner as the controller 11A according to the second embodiment, except that a modifiable replaying of a game candidate presenter 800 is provided. The storage unit 13C is configured in substantially the same manner as the storage unit 13A according to the second embodiment, except that a control program PGG-C is stored in place of the control program PGG-A.

In this aspect, the processor 1001 executes the control program PGG-C stored in the storage device 1003 and operates in accordance with the control program PGG-C, thereby functioning as the controller 11C.

As described above, according to the present modification, the user Ut of the terminal apparatus 70 (or the terminal apparatus 70B) can execute one modifiable replaying of a game from among the plurality of modifiable replaying of games by selecting one modifiable replaying of a game request button BP from among the plurality of modifiable replaying of a game request buttons BP. Therefore, according to this modification, it is possible to enhance the entertainment value of the modifiable replaying of a game as compared with a form in which the user Ut is not allowed to select one from executable modifiable replaying of games.

Modification 2

In the first to third embodiments and modification 1 described above, points may be awarded to one or both of the user Ut of the terminal apparatus 70 (or the terminal apparatus 70B) and the user Ug of the game apparatus 10 (or the game apparatus 10A, the game apparatus 10B, or the game apparatus 10C) on the basis of the outcome of the modifiable replaying of a game performed by the user Ut. Points may be a value related to a baseball video game, a value related to a game video for distribution DH, something valuable to the user Ug of the game apparatus 10 or to the user Ut of the terminal apparatus 70, something valuable in a baseball video game, a prize, or a monetary value.

Figure 39:
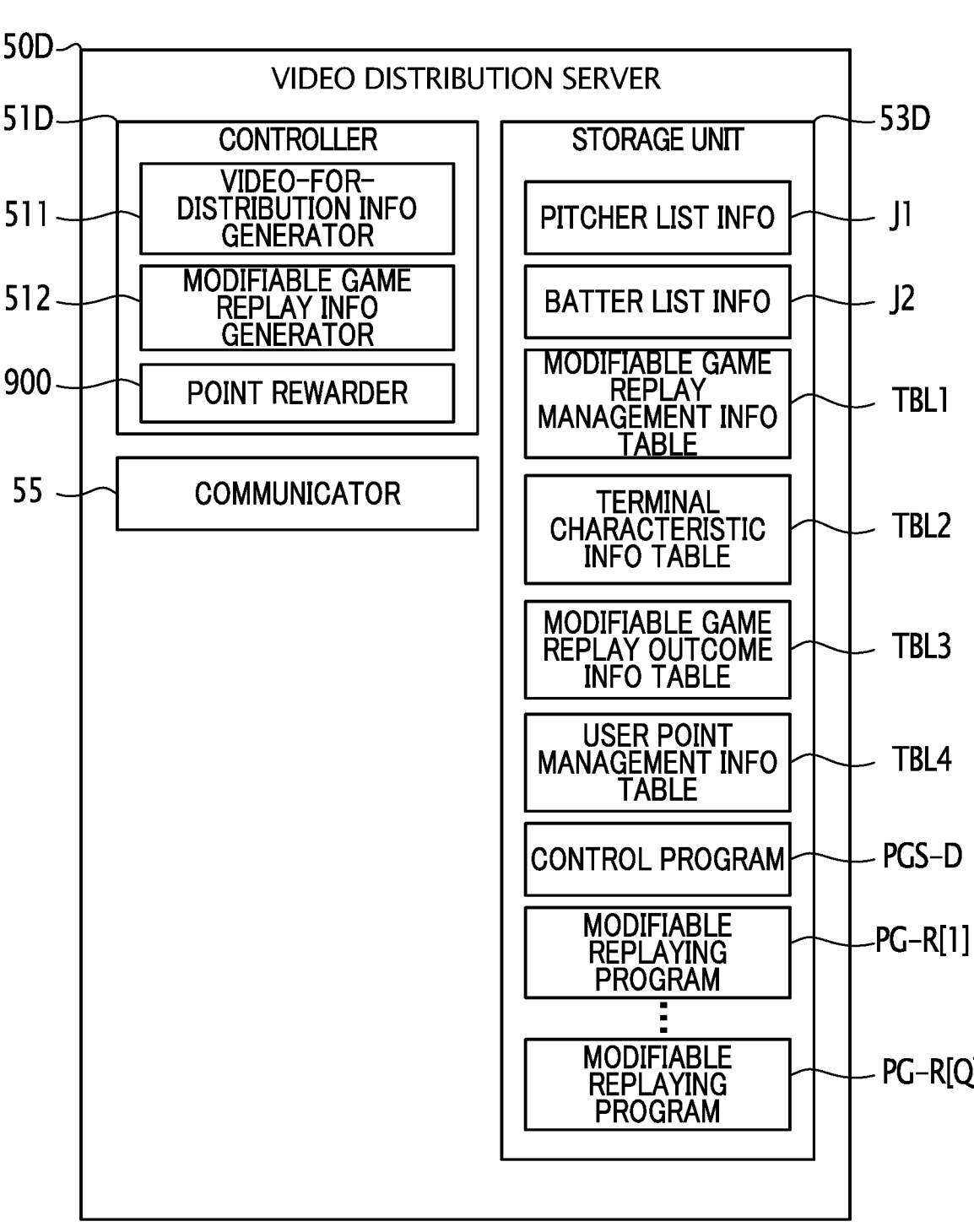
FIG. 39 is a block diagram showing an example configuration of a video distribution server 50D.

FIG. 39 is a functional block diagram illustrating an example configuration of a video distribution server 50D according to the present modification. The video distribution server 50D is provided in place of the video distribution server 50 in the information processing system Sys according to the first embodiment.

As illustrated in FIG. 39, the video distribution server 50D is configured in substantially the same manner as the video distribution server 50 according to the first embodiment, except that a controller 51D is provided in place of the controller 51 and that a storage unit 53D is provided in place of the storage unit 53. The controller 51D is configured in substantially the same manner as the controller 51 according to the first embodiment, except that a point rewarder 900 is provided. Furthermore, the storage unit 53D is configured in substantially the same manner as the storage unit 53 according to the first embodiment, except that a user point management information table TBL4 is stored, and that a control program PGS-D is stored instead of the control program PGS. The user point management information table TBL4 stores information on points of the user Ug of the game apparatus 10 (or the game apparatus 10A, the game apparatus 10B, or the game apparatus 10C) and information on points of the user Ut of the terminal apparatus 70 (or the terminal apparatus 70B). The point rewarder 900 (an example of "value provider") rewards points to one or both of the user Ug and the user Ut according to the outcome of the modifiable replaying of a game indicated by the modifiable replaying of a game outcome information JSG. Specifically, the point rewarder 900 updates one or both of the information on the points of the user Ug and the information on the points of the user Ut stored in the user point management information table TBL4 in accordance with the outcome of the modifiable replaying of a game indicated by the modifiable replaying of a game outcome information JSG.

In this embodiment, the processor 5001 executes the control program PGS-D stored in the storage device 5003 and operates in accordance with the control program PGS-D, thereby functioning as the controller 51D.

As described above, according to the present modification, since the points are awarded to one or both of the user Ug and the user Ut according to the outcome of the modifiable replaying of a game, it is possible to enhance the entertainment value of the modifiable replaying of a game as compared with a form in which no points are awarded to the user Ug or the user Ut.

Modification 3

In the first to third embodiments and modifications 1 and 2 described above, a hit using the bat object OBT by the batter character CB is given as an example of the modifiable replaying of a game. The hit using the bat object OBT by the batter character CB is based on the operation by the user Ut of the terminal apparatus 70 in response to the pitching of the ball object OBL by the pitcher character CP based on the operation by the user Ug of the game apparatus 10. However, the present invention is not limited thereto. It is sufficient if the modifiable replaying of a game is one in which no operation by the user Ug of the game apparatus 10 intervenes in the progress thereof, at a timing at which the user Ut of the terminal apparatus 70 performs an operation for advancing the modifiable replaying of a game, or at or after a timing at which the user Ut of the terminal apparatus 70 performs an operation for advancing the modifiable replaying of a game. For example, such a modifiable replaying of a game may be a defense by a fielder character (batter character CB) based on the operation by the user Ut of the terminal apparatus 70 as a response to the hit by the batter character CB based on the operation by the user Ug of the game apparatus 10.

Modification 4

In the first and second embodiments and modifications 1 to 3 described above, it is assumed that the game-video-fordistribution information JDH indicating the game video for distribution DH is supplied to the terminal apparatus 70 (or the terminal apparatus 70B), but the present invention is not limited thereto. No game-video-for-distribution information JDH indicating the game video for distribution DH may be supplied to the terminal apparatus 70 (or the terminal apparatus 70B).

Modification 5

In the first and second embodiments and modifications 1 to 4 described above, the terminal apparatus 70 (or the terminal apparatus 70B) may not be capable of executing a baseball video game. Furthermore, in the first and second embodiments and modifications 1 to 4 described above, the terminal apparatus 70 (or the terminal apparatus 70B) may not be capable of executing a video game executable in the game apparatus 10 (or the game apparatus 10A, the game apparatus 10B, or the game apparatus 10C).

Modification 6

In the first to third embodiments and modifications 1 to 5 described above, the baseball video game has been described as an example of a "video game", but the present invention is not limited thereto. Any video game can be adopted as the "video game".

5. APPENDICES

From the above description, the present invention can be understood, for example, as follows. In order to facilitate understanding of the embodiments, reference numerals in the drawings are appended in parentheses for convenience, but the present invention is not intended to be limited to the embodiments shown in the drawings.

Appendix A1

A recording medium according to one aspect of the present invention is a computer-readable recording medium (e.g., storage device 5003) having recorded therein a program (e.g., control program PGS) of a server apparatus (e.g., video distribution server 50) communicable with a game apparatus (e.g., game apparatus 10) that executes a video game (e.g., baseball video game) and generates video information (e.g., game-video-for-display information JDG) indicative of a video of the video game. The program causes a processor (e.g., processor 5001) of the server apparatus to function as: a distribution information generator (e.g., video-for-distribution-information generator 511) configured to generate distribution information (e.g., game-video-for-distribution information JDH) indicative of a distributed video (e.g., game video for distribution DH) based on the video information; and a modifiable replaying information generator (e.g., modifiable replaying of a game information generator 512) configured to generate modifiable replaying information (e.g., modifiable replaying of a game information JGG) that indicates a progress status of the video game in the game apparatus and that enables a modifiable replaying of a game, of the video game in which a user of a terminal apparatus plays the video game under the progress status of the video game, in the terminal apparatus (e.g., the terminal apparatus 70) configured to display the distributed video based on the distribution information generated by the distribution information generator.

In this aspect, the terminal apparatus can display the distributed video based on the video information indicating the video of the video game, and also can allow a modifiable replaying of a game of the video game under a progress status of the video game being executed in the game apparatus, based on the modifiable replaying information generated by the modifiable replaying information generator. Therefore, according to this aspect, the user of the terminal apparatus can actually experience the video game, which is being executed in the game apparatus. That is, according to the present aspect, compared with a form in which the terminal apparatus can simply display the distributed video and cannot allow a modifiable replaying of a game of the video game, the user of the terminal apparatus can easily grasp the skill level of the user playing the video game in the game apparatus and the difficulty of the video game being executed in the game apparatus.

In the above-described aspect, the "video information" may be, for example, information indicating in real time a game image updated each unit period, information indicating a set of a plurality of game images corresponding one-to-one to a plurality of unit periods, or information obtained by adding information indicating sound thereto. The "unit period" may be, for example, a period having a predetermined time length or a period having a variable time length. The "game image" may be, for example, a still image indicating a virtual space of a video game or a still image indicating a screen for operation by a user of the game apparatus for performing operations of a video game. Furthermore, the "information indicating sound" may be, for example, information indicating sound generated in a virtual space of a video game, or information indicating sound generated by a game apparatus as a result of operations performed by a user of the game apparatus.

In the above aspect, the "distributed video" may be, for example, the same video as a video indicated by video information, may be a video in which the resolution of the video indicated by the video information is altered, or a video in which a video or a still image different from the video indicated by the video information is added to the video indicated by the video information.

In the above aspect, the "progress status of a video game" may be, for example, a situation of a virtual space of the video game at each time point at which or in each time period in which the game progresses, or may be content of an operation of the game apparatus by the user of the game apparatus at each time point at which or in each time period in which the game progresses. Here, the "situation of a virtual space of a video game" may be, for example, a situation of a game character existing in the virtual space or a situation of an object existing in the virtual space. The "situation of a game character" may be, for example, survivability of the game character in the virtual space of the video game, a skill level of the game character, an item belonging to the game character, a position, posture, motion, moving direction, and moving speed of the game character in the virtual space, or one, some, or all of these. Furthermore, the "situation of an object" may be, for example, persistence of the object in the virtual space of the video game, one, some, or all of a position, posture, motion, moving direction, and moving speed of the object in the virtual space, or one, some, or all of these.

In the above aspect, the "terminal apparatus" may be, for example, a terminal apparatus in which an application program of a video game for executing the video game is installed, or a terminal apparatus in which an application program of the video game is not installed. It is to be noted that the terminal apparatus may be capable of executing a video game only when an application program of the video game is installed in the terminal apparatus. In other words, in a case in which the application program of the video game is not installed in the terminal apparatus, the terminal apparatus may not be able to execute the game.

In the above aspect, the "modifiable replaying of a game of a video game" may be, for example, that the progress status of the video game being executed in the game apparatus is modifiably replayed (recreated, modifiably reenacted) in an external apparatus other than the game apparatus, and the user of the external apparatus plays the video game in the modifiably replayed situations. Like the above-described terminal apparatus, the "external apparatus" may be an apparatus capable of displaying a distributed video or may be an apparatus incapable of displaying a distributed video. The "external apparatus" may be, for example, an apparatus in which an application program of a video game is installed, or it may be an apparatus in which an application program of a video game is not installed. In a case in which an application program of a video game is installed in the external apparatus, the user of the external apparatus may be able to perform a modifiable replaying of a game of the video game by executing the application program of the video game in the external apparatus, that is, by executing the video game. On the other hand, when an application program of a video game is not installed in the external apparatus, the user of the external apparatus may be enabled to perform a modifiable replaying of a game of the video game by executing a program other than the application program of the video game in the external apparatus, for example, by executing a program related to a web browser or a program related to video playback software.

Appendix A2

A recording medium according to another aspect of the present invention is a recording medium according to Appendix A1, in which the modifiable replaying information generator is configured to supply the modifiable replaying information to the terminal apparatus such that the distributed video under the progress status of the video game is displayed in the terminal apparatus at or after a timing at which the modifiable replaying of a game of the video game under the progress status of the video game becomes executable in the terminal apparatus.

In this aspect, before a timing at which a modifiable replaying of a game under a progress status of each video game becomes executable, the user of the terminal apparatus cannot view a distributed video that is under the progress status of each video game. That is, according to this aspect, the user of the terminal apparatus can perform a modifiable replaying of a game of the video game under the progress status of each video game, before the distributed video under the progress status of each video game is displayed. Therefore, according to the present aspect, in the terminal apparatus, the user of the terminal apparatus can perform a modifiable replaying of a game of the video game in the progress status of each video game under conditions close to that of a user who plays the video game in the game apparatus, as compared with a form in which a modifiable replaying of a game of the video game in the progress status of each video game becomes executable after the distributed video in the progress status of each video game can be displayed. Thus, the entertainment value of the modifiable replaying of a game can be enhanced.

Appendix A3

A recording medium according to another aspect of the present invention is the recording medium according to Appendix A1 or A2, in which the distribution information generator is configured to generate the distribution information on the basis of outcome information (e.g., modifiable replaying of a game outcome information JSG) supplied from the terminal apparatus and indicating an outcome of the modifiable replaying of a game, of the video game performed based on the modifiable replaying information by the user of the terminal apparatus.

In this aspect, since the distribution information generator generates the distribution information in accordance with the outcome of the modifiable replaying of a game in the terminal apparatus, the outcome of the modifiable replaying of a game in the terminal apparatus can be reflected in the distributed video. Therefore, according to this aspect, it is possible to enhance the entertainment value of the modifiable replaying of a game in the terminal apparatus as compared with a form in which the outcome of the modifiable replaying of a game in the terminal apparatus is not reflected in the distributed video.

Appendix A4

A recording medium according to another aspect of the present invention is the recording medium according to any one of Appendices A1 to A3, in which the terminal apparatus is included in a plurality of terminal apparatuses displaying the distributed video. The modifiable replaying information generator is configured to generate modifiable replaying information that enables, in each of the plurality of terminal apparatuses, a modifiable replaying of a game, of the video game under the progress status of the video game, the modifiable replaying of a game being performed by a user of each of the plurality of terminal apparatuses, the distribution information generator is configured to, based on a plurality of pieces of outcome information supplied from the plurality of terminal apparatuses, generate the distribution information, and each of the plurality of pieces of outcome information indicates an outcome of the modifiable replaying of a game, of the video game based on the modifiable replaying information, by the user of each of the plurality of terminal apparatuses.

In this aspect, since the distribution information generator generates the distribution information in accordance with the outcome of the modifiable replaying of a game in each of the plurality of terminal apparatuses, the outcome of the modifiable replaying of a game in each of the plurality of terminal apparatuses can be reflected in the distributed video. Therefore, according to this aspect, the user of the terminal apparatus can compare the outcome of the modifiable replaying of a game in the terminal apparatus with the outcome of the modifiable replaying of a game in another terminal apparatus. Therefore, according to this aspect, it is possible to enhance the entertainment value of the modifiable replaying of a game in the terminal apparatus as compared with a form in which the outcome of the modifiable replaying of a game in the plurality of terminal apparatuses is not reflected in the distributed video.

Appendix A5

A recording medium according to another aspect of the present invention is the recording medium according to any one of Appendices A1 to A3, in which the program causes the processor of the server apparatus to further function as a value provider (e.g., point rewarder 900) configured to provide value (e.g., points) to the user of the terminal apparatus based on the outcome information, which is supplied from the terminal apparatus and indicates an outcome of the modifiable replaying of a game, of the video game by the user of the terminal apparatus, the modifiable replaying of a game being performed based on the modifiable replaying information.

According to this aspect, since the value provider provides value to the user of the terminal apparatus in accordance with the outcome of the modifiable replaying of a game in the terminal apparatus, it is possible to enhance the entertainment value of the modifiable replaying of a game in the terminal apparatus, as compared with a form in which no value is provided to the user of the terminal apparatus.

In the above aspect, the "value" may be, for example, a value related to the video game, or it may be something valuable to the user of the game apparatus or the user of the terminal apparatus, may be something valuable in the video game, may be a prize, or may be a monetary value.

Appendix A6

A recording medium according to another aspect of the present invention is the recording medium according to any one of Appendices A1 to A3 or appendix A5, in which the program causes the processor of the server apparatus to further function as a value provider configured to provide value to the user of the game apparatus based on the outcome information, which is supplied from the terminal apparatus and indicates an outcome of the modifiable replaying of a game of the video game by the user of the terminal apparatus, the modifiable replaying of a game being performed based on the modifiable replaying information.

According to this aspect, since the value provider provides the value to the user of the game apparatus in accordance with the outcome of the modifiable replaying of a game in the terminal apparatus, it is possible to enhance the entertainment value of the modifiable replaying of a game in the terminal apparatus as compared with a form in which no value is provided to the user of the game apparatus.

Appendix A7

A recording medium according to another aspect of the present invention is the recording medium according to any one of Appendices A1 to A3, or Appendix A5 or A6, in which the modifiable replaying information generator is configured to generate the modifiable replaying information based on terminal characteristic information indicative of a characteristic of the terminal apparatus.

According to this aspect, since the modifiable replaying information generator generates the modifiable replaying information in accordance with the characteristics of the terminal apparatus, it is possible to perform a modifiable replaying of a game in the terminal apparatus in the manner in accordance with the characteristics of the terminal apparatus. Therefore, according to this aspect, it is possible to reduce the load that occurs when the user of the terminal apparatus who performs a modifiable replaying of a game of the video game on the terminal apparatus performs a modifiable replaying of a game, as compared with a form in which the modifiable replaying information is generated without considering the characteristics of the terminal apparatus.

In the above aspect, the "characteristics of the terminal apparatus" may be, for example, the characteristics relating to hardware of the terminal apparatus or the characteristics relating to software installed in the terminal apparatus. The "characteristics relating to hardware of the terminal apparatus" may be, for example, the characteristics of processing performance of an arithmetic processing device provided in the terminal apparatus, or the characteristics of display performance of the display device provided in the terminal apparatus. That is, the "terminal characteristic information" may be, for example, information indicating the characteristics of processing performance of the arithmetic processing device provided in the terminal apparatus, or information indicating the characteristics of display performance of the display device provided in the terminal apparatus. The "characteristics relating to software installed in the terminal apparatus" may be, for example, a type of a program installed in the terminal apparatus, or may be a specific program being installed in the terminal apparatus. That is, the "terminal characteristic information" may be, for example, information indicating the type of a program installed in the terminal apparatus, or information indicating whether or not a specific program is installed in the terminal apparatus. The "specific program" may be an application program of a video game.

Appendix A8

A recording medium according to another aspect of the present invention is the recording medium according to Appendices A1 to A3 or Appendices A5 to A7, in which the modifiable replaying information generator is configured to generate the modifiable replaying information based on an operation by a user of another game apparatus that communicates with the game apparatus and executes the video game.

According to this aspect, the user of the terminal apparatus can simulate the experience of competing with or cooperating with the user of another game apparatus in the modifiable replaying of a game of the video game. Therefore, according to the present aspect, it is possible to enhance the entertainment value of the modifiable replaying of a game in the terminal apparatus as compared with a form in which the user of the terminal apparatus cannot simulate the experience of competing with or cooperating with the user of another game apparatus.

Appendix A9

A recording medium according to another aspect of the present invention is a computer-readable recording medium (e.g., a storage device 5003) having recorded therein a program (e.g., a control program PGS-A) for a server apparatus (e.g., a video distribution server 50A) communicable with a game apparatus that executes a video game and generates video information indicative of a video of the video game, the program causing a processor of the server apparatus to function as: a distribution information generator (e.g., a video-for-distribution information generator 511) configured to generate distribution information indicative of a distributed video based on the video information; and a supplier (e.g., a modifiable replaying of a game information supplier 513) configured to acquire from the game apparatus modifiable replaying information indicative of a progress status of the video game in the game apparatus and that enables, in a terminal apparatus, a modifiable replaying of a game, of the video game in which a user of the terminal apparatus plays the video game under the progress status of the video game, to supply the acquired modifiable replaying information to the terminal apparatus, the terminal apparatus being configured to display the distributed video based on the distribution information generated by the distribution information generator.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A10

A recording medium according to another aspect of the present invention is a computer-readable recording medium (e.g., storage device 1003) having recorded therein a program (e.g., control program PGG-A) for causing a processor (e.g., processor 1001) of a game apparatus (e.g., game apparatus 10A) to function as: a game controller (e.g., game controller 111) configured to execute a video game and generate video information indicative of a video of the video game; and a modifiable replaying information generator (e.g., modifiable replaying of a game information generator 512) configured to generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A11

A recording medium according to another aspect of the present invention is a computer-readable recording medium (e.g., storage device 1003) having recorded therein a program (e.g., control program PGG-B) for causing a processor of a game apparatus (e.g., game apparatus 10B) to function as a game executor configured to execute a video game and generate modifiable replaying information indicative of a progress status of the video game in the game apparatus, the modifiable replaying information enabling displaying of a video of the video game in a terminal apparatus, and also enabling, in the terminal apparatus, a modifiable replaying of a game, of the video game in which a user of the terminal apparatus plays the video game under the progress status of the video game, and an information outputter configured to output the modifiable replaying information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix A12

A server apparatus according to an aspect of the present invention is communicable with a game apparatus that executes a video game and generates video information indicative of a video of the video game, and the server apparatus includes: one or more memories for storing instructions; and one or more processors communicatively connected to the one or more memories and that execute the instructions to: generate distribution information indicative of a distributed video based on the video information; and generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the distribution information generated by the distribution information generator.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A13

A game apparatus according to another aspect of the present invention includes: one or more memories for storing instructions; and one or more processors communicatively connected to the one or more memories and that execute the instructions to: execute a video game and generate video information indicative of a video of the video game; and generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A14

A control method of a server apparatus according to an aspect of the present invention causes a processor of a server apparatus communicable with a game apparatus that executes a video game and generates video information indicative of a video of the video game, to: generate distribution information indicative of a distributed video based on the video information; and generate modifiable replaying information indicative of a progress status of the video game in the game apparatus and that enables a modifiable replaying of a game, of the video game in which the user of a terminal apparatus plays the video game under the progress status of the video game, in the terminal apparatus configured to display the distributed video based on the generated distribution information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A15

A control method of a game apparatus according to another aspect of the present invention causes a processor of the game apparatus to: execute a video game and generate video information indicative of a video of the video game; and generate modifiable replaying information indicative of a progress status of the video game in the game apparatus and that enables, in a terminal apparatus, a modifiable replaying of a game, of the video game in which a user of the terminal apparatus plays the video game under the progress status of the video game, the terminal apparatus being configured to display a distributed video based on the video information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix A16

An information processing system (e.g., information processing system Sys) according to an aspect of the present invention includes a game apparatus configured to execute a video game and generates video information indicative of a video of the video game; and a server apparatus communicable with the game apparatus. The system comprises: one or more memories for storing instructions; and one or more processors communicatively connected to the one or more memories and that execute the instructions to: generate distribution information indicative of a distributed video based on the video information; and generate modifiable replaying information indicative of a progress status of the video game in the game apparatus and that enables a modifiable replaying of a game, of the video game in which a user of a terminal apparatus plays the video game under the progress status of the video game in the terminal apparatus configured to display the distributed video based on the generated distribution information.

According to this aspect, since the user of the terminal apparatus can actually experience the video game being executed in the game apparatus, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix B1

A computer-readable recording medium (e.g., memory storage 1003) according to one aspect of the present invention having recorded therein a program (e.g., control program PGG-A) for causing a processor (e.g., processor 1001) of a game apparatus (e.g., game apparatus 10A) to function as: a game controller (e.g., game controller 111) configured to progress a video game (e.g., baseball video game); and a generator (e.g., modifiable replaying of a game information generator 512) configured to generate modifiable replaying information (e.g., modifiable replaying of a game information JGG) that indicates a specific situation (e.g., modifiable replaying target pitch) extracted from a progress status of the video game progressed by the game controller, the modifiable replaying information enabling, in a terminal apparatus, a modifiable replaying of a game, of the video game in which a user of the terminal apparatus plays the video game under the specific situation.

In this aspect, based on the modifiable replaying information, the terminal apparatus can allow a modifiable replaying of a game of the video game to be performed under the progress status of the video game being executed in the game apparatus. Therefore, according to this aspect, the user of the terminal apparatus can actually experience the video game being executed in the game apparatus. That is, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

A recording medium according to an aspect of the present invention may be a computer-readable recording medium having recorded therein a program that causes a processor of a game apparatus to function as a game controller configured to cause a video game to progress and a generator configured to generate modifiable replaying information indicative of a specific situation extracted from a progress status of the video game progressed by the game controller and enables a user of the terminal apparatus to play the game in the specific situation.

Appendix B2

A recording medium according to another aspect of the present invention is the recording medium according to Appendix B1, in which the game controller is configured to generate video information (e.g., game-video-for-display information JDG) indicative of a video of the video game in accordance with progression of the video game, and the generator generates modifiable replaying information that enables, in the terminal apparatus, the modifiable replaying of a game, of the video game in which the user of the terminal apparatus plays the video game under the specific situation, the terminal apparatus (e.g., a terminal apparatus 70) being configured to display a distributed video (e.g., a game video for distribution DH) based on the video information.

According to this aspect, the user of the terminal apparatus can actually experience the video game being executed in the game apparatus in addition to being able to view the distributed video. Therefore, according to this aspect, the user of the terminal apparatus can easily grasp the skill level of the user playing the video game in the game apparatus and the difficulty of the video game being executed in the game apparatus, as compared with a form that only allows display of the distributed video but does not allow the modifiable replaying of a game of the video game to be performed in the terminal apparatus.

Appendix B3

A recording medium according to another aspect of the present invention is the recording medium according to Appendix B1 or B2, in which, based on the progress status of the video game progressed by the game controller satisfying a predetermined condition (e.g., game modifiable replaying condition), the generator is configured to generate modifiable replaying information that enables, in the terminal apparatus, the modifiable replaying of a game, of the video game in which the user of the terminal apparatus plays the video game under the progress status of the video game, the progress status satisfying the predetermined condition.

According to this aspect, in a case in which the progress status of the video game being executed in the game apparatus is, for example, a situation suitable for a modifiable replaying of a game, the user of the terminal apparatus can actually experience the video game in that situation. Therefore, according to this aspect, the user of the terminal apparatus can easily grasp the skill level of the user playing the video game in the game apparatus and the difficulty of the video game being executed in the game apparatus, as compared with a form that does not allow the modifiable replaying of a game of the video game to be performed in the terminal apparatus.

In the above aspect, the "predetermined condition" may be, for example, a condition related to the situation of the virtual space of the video game, a condition related to a content of an operation of the game apparatus by the user of the game apparatus, a condition related to the rules of the video game, or one, some, or all of these conditions. Specifically, the "predetermined condition" may be, for example, a condition that the progress status of the video game enters a predetermined situation. The "predetermined condition" may be, for example, a condition that the user of the game apparatus has performed an operation of the game apparatus, the operation designating a predetermined content. Furthermore, the "predetermined condition" may be, for example, a condition in which the progress status of the video game enters a situation that falls under a predetermined matter among one or more matters defined as the rules of the video game.

Appendix B4

A recording medium according to another aspect of the present invention is the recording medium according to any one of Appendices B1 to B3, in which the generator is configured to generate the modifiable replaying information based on an operation by a user of another game apparatus that communicates with the game apparatus and executes the video game.

According to this aspect, the user of the terminal apparatus can simulate the experience of competing with or cooperating in the video game with the user of the other game apparatus in the modifiable replaying of a game of the video game. Therefore, according to the present aspect, it is possible to enhance the entertainment value of the modifiable replaying of a game in the terminal apparatus as compared with a form in which the user of the terminal apparatus cannot simulate the experience of competing with or cooperating in the video game with the user of another game apparatus.

A recording medium according to another aspect of the present invention may be the recording medium according to any one of Appendices B1 to B3, in which at a timing at which the user of the terminal apparatus performs an operation for progressing the modifiable replaying of a game, an operation by the user of the game apparatus or an operation by the user of another game apparatus that communicates with the game apparatus and executes the game does not interfere with the progression of the modifiable replaying of a game.

According to this aspect, the user of the terminal apparatus can execute the modifiable replaying of a game of the video game only through the operation of the terminal apparatus by the user of the terminal apparatus without the operation of the game apparatus by the user of the game apparatus or the operation of the other game apparatus by the user of the other game apparatus intervening. Therefore, according to this aspect, the user of the terminal apparatus can simulate the experience of competing with or cooperating in a video game, the video game being a competition between the user of the game apparatus and the user of another game apparatus.

Furthermore, a recording medium according to another aspect of the present invention may be the recording medium according to any one of Appendices B1 to B3, in which, at or after a timing at which the user of the terminal apparatus performs an operation for progressing the modifiable replaying of a game, an operation by the user of the game apparatus and an operation by the user of another game apparatus that communicates with the game apparatus and executes the game does not interfere with the progression of the modifiable replaying of a game.

According to this aspect, the user of the terminal apparatus can execute the modifiable replaying of a game of the video game merely by the operation of the terminal apparatus by the user of the terminal apparatus without the operation on the game apparatus by the user of the game apparatus and the operation on the other game apparatus by the user of the other game apparatus intervening. Therefore, according to this aspect, the user of the terminal apparatus can simulate the experience of competing with or cooperating in a video game, the video game being a competition between the user of the game apparatus and the user of another game apparatus.

Appendix B5

A recording medium according to another aspect of the present invention is the recording medium described in Appendices B1 to B4, in which the program further causes a presenter (e.g., modifiable replaying of a game candidate presenter 800) configured to present a plurality of situations extractable from the progress status of the video game progressed by the game controller, and the generator is configured to generate modifiable replaying information indicative of one situation selected from the plurality of situations presented by the presenter, the modifiable replaying information enabling, in the terminal apparatus, the modifiable replaying of a game, of the video game in which the user of the terminal apparatus plays the video game in the selected one situation.

According to this aspect, in a case in which the progress of the video game being executed in the game apparatus is, for example, a situation suitable for a modifiable replaying of a game, the user of the terminal apparatus can actually experience the video game in that situation. Therefore, according to this aspect, the user of the terminal apparatus can easily grasp the skill level of the user playing the video game in the game apparatus and the difficultness of the video game being executed in the game apparatus, as compared with a form that does not allow the modifiable replaying of a game of the video game to be performed in the terminal apparatus.

Appendix B6

A recording medium according to another aspect of the present invention is a computer-readable recording medium (e.g., storage device 5003) having recorded therein a program (e.g., control-program PGS) for a server apparatus (e.g., video distribution server 50) communicable with a game apparatus (e.g., game apparatus 10) executing a video game (e.g., a baseball video game) and a terminal apparatus (e.g., terminal apparatus 70), the program causing the processor (e.g., a processor 5001) of the server apparatus to function as: an information acquirer configured to acquire progression status information indicative of a progress status of the video game; and a generator (e.g., modifiable replaying of a game information generator 512) configured to generate, based on the progression status information acquired by the information acquirer, modifiable replaying information (e.g., modifiable replaying of a game information JGG) that indicates a specific situation (e.g., a pitch to be modifiably replayed) extracted from the progress status of the video game progressed by the game apparatus, the modifiable replaying information enabling, in the terminal apparatus, a modifiable replaying of a game, of the video game in which a user of the terminal apparatus plays the video game under the specific situation.

In this aspect, based on the modifiable replaying information, the terminal apparatus can perform a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix B7

A game apparatus according to an aspect of the present invention includes: one or more memories for storing instructions; and one or more processors communicatively connected to the one or more memories and that execute the instructions to: progress a video game; and generate modifiable replaying information indicative of a specific situation extracted from a progress status of the video game, the modifiable replaying information enabling, in a terminal apparatus, a modifiable replaying of a game, of the video game in which a user of the terminal apparatus plays the video game under the specific situation.

In this aspect, based on the modifiable replaying information, the terminal apparatus can allow a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix B8

A server apparatus according to another aspect of the present invention is communicable with a game apparatus executing a video game and a terminal apparatus, and the server apparatus includes: one or more memories for storing instructions; and one or more processors communicatively connected to the one or more memories and that execute the instructions to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in the terminal apparatus, a modifiable replaying of a game, of the video game in which a user of the terminal apparatus plays the video game under the specific situation.

In this aspect, based on the modifiable replaying information, the terminal apparatus can allow a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix B9

A control method of a game apparatus according to an aspect of the present invention is characterized in that a processor of the game apparatus is caused to: progress a video game; and generate modifiable replaying information indicative of a specific situation extracted from a progress status of the video game, the modifiable replaying information enabling, in a terminal apparatus, a modifiable replaying of a game of the video game in which a user of the terminal apparatus plays the video game under the specific situation.

In this aspect, based on the modifiable replaying information, the terminal apparatus can allow a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix B10

A control method of a server apparatus according to another aspect of the present invention is a control method of a server apparatus communicable with a terminal apparatus and a game apparatus that executes a video game, in which a processor of the server apparatus is caused to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in the terminal apparatus, a modifiable replaying of a game, of the video game in which a user of the terminal apparatus plays the video game under the specific situation.

In this aspect, based on the modifiable replaying information, the terminal apparatus can allow a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

Appendix B11

An information processing system according to an aspect of the present invention is an information processing system including a game apparatus that executes a video game, and the information processing system includes: one or more memories for storing instructions; and one or more processors communicatively connected to the one or more memories and that execute the instructions to: acquire progression status information indicative of a progress status of the video game; and generate, based on the acquired progression status information, modifiable replaying information indicative of a specific situation extracted from the progress status of the video game progressed by the game apparatus, the modifiable replaying information enabling, in a terminal apparatus, a modifiable replaying of a game, of the video game in which a user of the terminal apparatus plays the video game under the specific situation.

In this aspect, based on the modifiable replaying information, the terminal apparatus can allow a modifiable replaying of a game of the video game under the progress status of the video game being executed by the game apparatus. Therefore, according to this aspect, the user of the terminal apparatus can easily grasp the skill level of the user playing the video game in the game apparatus and the difficulty of the video game being executed in the game apparatus, as compared with a form that only allows display of the video of the video game but does not allow the modifiable replaying of a game of the video game to be performed in the terminal apparatus.

DESCRIPTION OF REFERENCE SIGNS 10 game apparatus
11 controller
13 storage unit
14 input unit
15 communicator
20 display apparatus
30 video editing apparatus
40 game management server
50 video distribution server
51 controller
53 storage unit
55 communicator
70 terminal apparatus
71 controller
73 storage unit
74 input unit
75 communicator
76 display unit
111 game controller
112 game progression information generator
113 video for display information generator
511 video for distribution information generator
512 modifiable replaying of a game information generator
1001 processor
5001 processor
7001 processor
Sys information processing system
SysG game system.

What is claimed is:

1. A non-transitory computer-readable recording medium having recorded therein a program for a server apparatus communicable with a game apparatus that executes a video game and generates video information indicative of a video of the video game, the program causing a processor of the server apparatus to function as:

a distribution information generator configured to generate distribution information indicative of a distributed video based on the video information;

a modifiable replaying information generator configured to generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the distribution information generated by the distribution information generator; and a presenter configured to present a plurality of situations extractable from the progress status of the video game progressed by the game apparatus.

2. The recording medium according to claim 1, wherein the modifiable replaying information generator is configured to supply the modifiable replaying information to the terminal apparatus such that the distributed video under the progress status of the video game is displayed in the terminal apparatus at or after a timing at which the modifiable replaying of a game of the video game under the progress status of the video game becomes executable in the terminal apparatus.

3. The recording medium according to claim 1, wherein the distribution information generator is configured to generate the distribution information based on outcome information indicative of an outcome of the modifiable replaying of a game, of the video game performed based on the modifiable replaying information by the user of the terminal apparatus, the outcome information being supplied from the terminal apparatus.

4. The recording medium according to claim 1, wherein:

the terminal apparatus is included in a plurality of terminal apparatuses displaying the distributed video, the modifiable replaying information generator is configured to generate modifiable replaying information that enables, in each of the plurality of terminal apparatuses, a modifiable replaying of a game, of the video game under the progress status of the video game, the modifiable replaying of a game being performed by a user of each of the plurality of terminal apparatuses, the distribution information generator is configured to, based on a plurality of pieces of outcome information supplied from the plurality of terminal apparatuses, generate the distribution information, and each of the plurality of pieces of outcome information indicates an outcome of the modifiable replaying of a game, of the video game based on the modifiable replaying information, by the user of each of the plurality of terminal apparatuses.

5. The recording medium according to claim 1, wherein the program causes the processor of the server apparatus to further function as a value provider configured to provide value to the user of the terminal apparatus based on outcome information supplied from the terminal apparatus and indicative of an outcome of the modifiable replaying of a game, of the video game by the user of the terminal apparatus, the modifiable replaying of a game being performed based on the modifiable replaying information.

6. The recording medium according to claim 1, wherein the program causes the processor of the server apparatus to further function as a value provider configured to provide value to the user of the game apparatus based on outcome information supplied from the terminal apparatus and indicative of an outcome of the modifiable replaying of a game of the video game by the user of the terminal apparatus, the modifiable replaying of a game being performed based on the modifiable replaying information.

7. The recording medium according to claim 1, wherein the modifiable replaying information generator is configured to generate the modifiable replaying information based on terminal characteristic information indicative of a characteristic of the terminal apparatus.

8. The recording medium according to claim 1, wherein:

the game apparatus is a first game apparatus; and the modifiable replaying information generator is configured to generate the modifiable replaying information based on an operation by a user of a second game apparatus that communicates with the first game apparatus and executes the video game.

9. A non-transitory computer-readable recording medium having recorded therein a program for a server apparatus communicable with a game apparatus that executes a video game and generates video information indicative of a video of the video game, the program causing a processor of the server apparatus to function as:

a distribution information generator configured to generate distribution information indicative of a distributed video based on the video information;

a supplier configured to acquire, from the game apparatus, modifiable replaying information indicative of a progress status of the video game in the game apparatus and that enables, in a terminal apparatus, a modifiable replaying of a game, of the video game in which a user of the terminal apparatus plays the video game under the progress status of the video game, to supply the acquired modifiable replaying information to the terminal apparatus, the terminal apparatus being configured to display the distributed video based on the distribution information generated by the distribution information generator; and a presenter configured to present a plurality of situations extractable from the progress status of the video game progressed by the game apparatus.

10. A non-transitory computer-readable recording medium having recorded therein a program for causing a processor of a game apparatus to function as:

a game executor configured to execute a video game and generate modifiable replaying information indicative of a progress status of the video game in the game apparatus, the modifiable replaying information enabling displaying of a video of the video game in a terminal apparatus, and also enabling, in the terminal apparatus, a modifiable replaying of a game, of the video game in which a user of the terminal apparatus plays the video game under the progress status of the video game;

an information outputter configured to output the modifiable replaying information; and a presenter configured to present a plurality of situations extractable from the progress status of the video game progressed by the game apparatus.

11. A method of controlling a server apparatus communicable with a game apparatus that executes a video game and generates video information indicative of a video of the video game, the method causing a processor of the server apparatus to:

generate distribution information indicative of a distributed video based on the video information;

generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the generated distribution information; and present a plurality of situations extractable from the progress status of the video game progressed by the game apparatus.

12. An information processing system including a game apparatus configured to execute a video game and generate video information indicative of a video of the video game, and a server apparatus communicable with the game apparatus, the system comprising:

one or more memories for storing instructions; and one or more processors communicatively connected to the one or more memories and that execute the instructions to:

generate distribution information indicative of a distributed video based on the video information;

generate modifiable replaying information indicative of a progress status of the video game in the game apparatus and that enables a modifiable replaying of a game, of the video game in which a user of a terminal apparatus plays the video game under the progress status of the video game, in the terminal apparatus configured to display the distributed video based on the generated distribution information; and present a plurality of situations extractable from the progress status of the video game progressed by the game apparatus.

13. A non-transitory computer-readable recording medium having recorded therein a program for causing a processor of a game apparatus to function as:

a game controller configured to progress a video game;

a generator configured to generate modifiable replaying information indicative of a specific situation extracted from a progress status of the video game progressed by the game controller, the modifiable replaying information enabling, in a terminal apparatus, a modifiable replaying of a game, of the video game in which a user of the terminal apparatus plays the video game under the specific situation; and a presenter configured to present a plurality of situations extractable from the progress status of the video game progressed by the game controller.

14. The recording medium according to claim 13, wherein:

the game controller is configured to generate video information indicative of a video of the video game in accordance with progression of the video game, and the generator is configured to generate modifiable replaying information that enables, in the terminal apparatus, the modifiable replaying of a game, of the video game in which the user of the terminal apparatus plays the video game under the specific situation, the terminal apparatus being configured to display a distributed video based on the video information.

15. The recording medium according to claim 13, wherein, based on the progress status of the video game progressed by the game controller satisfying a predetermined condition, the generator is configured to generate modifiable replaying information that enables, in the terminal apparatus, the modifiable replaying of a game, of the video game in which the user of the terminal apparatus plays the video game under the progress status of the video game, the progress status satisfying the predetermined condition.

16. The recording medium according to claim 13, wherein the generator is configured to generate the modifiable replaying information based on an operation by a user of another game apparatus that communicates with the game apparatus and executes the video game.

17. The recording medium according to claim 13, wherein:

the generator is configured to generate modifiable replaying information indicative of one situation selected from the plurality of situations presented by the presenter, the modifiable replaying information enabling, in the terminal apparatus, the modifiable replaying of a game, of the video game in which the user of the terminal apparatus plays the video game in the selected one situation.

18. A method of controlling a game apparatus, the method causing a processor of the game apparatus to:

progress a video game;

generate modifiable replaying information indicative of a specific situation extracted from a progress status of the video game, the modifiable replaying information enabling, in a terminal apparatus, a modifiable replaying of a game, of the video game in which a user of the terminal apparatus plays the video game under the specific situation; and present a plurality of situations extractable from the progress status of the video game progressed by the game apparatus.

19. An information processing system including a game apparatus that executes a video game, the system comprising:

one or more memories for storing instructions; and one or more processors communicatively connected to the
one or more memories and that execute the instructions
to:

acquire progression status information indicative of a
progress status of the video game;

generate, based on the acquired progression status infor-
mation, modifiable replaying information indicative of
a specific situation extracted from the progress status of
the video game progressed by the game apparatus, the
modifiable replaying information enabling, in a termi-
nal apparatus, a modifiable replaying of a game, of the
video game in which a user of the terminal apparatus
plays the video game under the specific situation; and present a plurality of situations extractable from the
progress status of the video game progressed by the
game apparatus.

\* \* \* \* \*